US012736787B2

(12) United States Patent
Chen et al.

(10) Patent No.: US 12,736,787 B2
(45) Date of Patent: Sep. 15, 2026

(54) OPTICAL IMAGE CAPTURING SYSTEM

(71) Applicant: ABILITY OPTO-ELECTRONICS TECHNOLOGY CO., LTD., Taichung City (TW)

(72) Inventors: Ying-Jung Chen, Taichung City (TW); Kuo-Yu Liao, Taichung City (TW); Chien-Hsun Lai, Taichung City (TW)

(73) Assignee: ABILITY OPTO-ELECTRONICS TECHNOLOGY CO., LTD., Taichung City (TW)

( * ) Notice: Subject to any disclaimer, the term of this patent is extended or adjusted under 35 U.S.C. 154(b) by 268 days.

(21) Appl. No.: 18/603,778

(22) Filed: Mar. 13, 2024

(65) Prior Publication Data

US 2025/0110314 A1 Apr. 3, 2025

Related U.S. Application Data

(60) Provisional application No. 63/586,193, filed on Sep. 28, 2023.

(30) Foreign Application Priority Data

Dec. 20, 2023 (TW) ................................ 112149869

(51) Int. Cl.
*G02B 5/20* (2006.01)
*G02B 5/00* (2006.01)
(Continued)

(52) U.S. Cl.
CPC ............... *G02B 9/12* (2013.01); *G02B 5/003* (2013.01); *G02B 5/208* (2013.01); *G02B 13/008* (2013.01); *G02B 13/14* (2013.01)

(58) Field of Classification Search
None
See application file for complete search history.

(56) References Cited

U.S. PATENT DOCUMENTS 9,341,815 B1 * 5/2016 Hsueh .................... H04N 23/54
2010/0271482 A1 * 10/2010 Otsuki .................. G02B 5/285
348/148

(Continued)

FOREIGN PATENT DOCUMENTS

CN 113820824 A 12/2021
JP 2023-133060 A 9/2023
TW I418839 B 12/2013

OTHER PUBLICATIONS

Taiwanese Search Report for Taiwanese Application No. 112149869, dated Nov. 27, 2024, with English translation.

*Primary Examiner* — Darryl J Collins
(74) *Attorney, Agent, or Firm* — Birch, Stewart, Kolasch & Birch, LLP

(57) ABSTRACT

An optical image capturing system, along an optical axis from an object side to an image side, includes a lens and an optical filter. The lens has refractive power. The optical filter is adjacent to the lens. The lens and/or the optical filter include or includes at least one visible light absorbing ingredient, absorb or absorbs a visible light with a wavelength range from 400 nm to 700 nm, and allows a light with a wavelength range greater than 800 nm to pass correspondingly. In another embodiment, a plurality of lenses is provided. At least one of the lenses is a filter lens. The filter lens includes the at least one visible light absorbing ingredient, so that the optical image capturing system could absorb the visible light and has a high transmittance of the infrared, thereby improving a light receiving efficiency and a working quality.

37 Claims, 28 Drawing Sheets

(51) Int. Cl.

| | |
|---|---|
| ***G02B 9/12*** | (2006.01) |
| ***G02B 13/00*** | (2006.01) |
| ***G02B 13/14*** | (2006.01) |

(56) References Cited

U.S. PATENT DOCUMENTS

| | | | | |
|---|---|---|---|---|
| 2011/0069378 | A1* | 3/2011 | Lin | G02B 13/14 359/356 |
| 2015/0370039 | A1* | 12/2015 | Bone | G02B 13/14 359/715 |
| 2017/0227742 | A1* | 8/2017 | Hsieh | G02B 27/027 |
| 2018/0210170 | A1* | 7/2018 | Lee | G02B 13/008 |
| 2018/0231739 | A1* | 8/2018 | Bone | G02B 5/281 |
| 2020/0041761 | A1* | 2/2020 | Seo | G02B 13/14 |
| 2020/0150387 | A1* | 5/2020 | Kim | G06V 40/10 |
| 2020/0341240 | A1* | 10/2020 | Chang | G02B 7/008 |
| 2021/0191075 | A1* | 6/2021 | Wang | G02B 13/004 |
| 2021/0278577 | A1* | 9/2021 | Zieba | G02B 1/11 |
| 2022/0086318 | A1 | 3/2022 | Kim | |

* cited by examiner

OPTICAL IMAGE CAPTURING SYSTEM

BACKGROUND OF THE INVENTION

Technical Field

The present invention relates generally to an optical image capturing system, and more particularly to an optical image capturing system, which is applied to an electronic product and has a high transmittance of an infrared and a low transmittance of a visible light.

Description of Related Art

In recent years, with the rise of portable electronic devices having camera functionalities, the demand for an optical image capturing system is gradually raised. An image sensing device of the optical image capturing system is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system directs towards the field of high pixels. Therefore, the requirement for high imaging quality is rapidly raised.

However, with a diverse development in recent years, it is hard for a traditional optical lens to satisfy a demand for a high optical quality of electronic devices, especially a lens specifically allowing an infrared to pass through the lens. It is known that a conventional optical technique is to coat a surface of the lens with a surface coating material, so that the lens could reflect and block a visible light. However, in different conditions of an incident angle of a light, an effect of the surface coating material of the lens reflecting and blocking the visible light generates a sensitive deviation phenomenon, so that a gradually strict market demand for the optical quality could not be satisfied.

Therefore, how to provide an improved optical image capturing system which could effectively absorb the visible light and have a high transmittance of an infrared and thereby improve a light receiving efficiency of the optical image capturing system and a working quality of the optical image capturing system, is a problem needed to be solved.

BRIEF SUMMARY OF THE INVENTION

In view of the above, the primary objective of the present invention is to provide an optical image capturing system, which could effectively provide an effect of absorbing a visible light and an effect of a high transmittance of an infrared.

The present invention provides an optical image capturing system. The optical image capturing system, along an optical axis from an object side to an image side, includes at least one lens and an optical filter, wherein the at least one lens has refractive power. At least one of an object-side surface, which faces the object side, of the at least one lens and an image-side surface, which faces the image side, of the at least one lens is aspheric. The at least one lens includes at least one visible light absorbing ingredient; at least one lens correspondingly absorbs a visible light with a wavelength range from 400 nm to 700 nm and allows a light with a wavelength range greater than 800 nm to correspondingly pass through the at least one lens. The optical filter is adjacent to the at least one lens.

The present invention further provides an optical image capturing system. The optical image capturing system, along an optical axis from an object side to an image side, includes at least one lens and an optical filter, wherein the optical filter is adjacent to the at least one lens, includes at least one visible light absorbing ingredient, correspondingly absorbs a visible light with a wavelength range from 400 nm to 700 nm, and allows a light with a wavelength range greater than 800 nm to correspondingly pass through.

The present invention further provides an optical image capturing system. The optical image capturing system, along an optical axis from an object side to an image side, includes a plurality of lenses, wherein the lenses respectively have refractive power. At least one of the lenses is a filter lens, wherein the filter lens includes at least one visible light absorbing ingredient; the filter lens correspondingly absorbs a visible light with a wavelength range from 400 nm to 700 nm and allows a light with a wavelength range greater than 800 nm to correspondingly pass through.

With the aforementioned design, at least one of the lenses of the optical image capturing system has the at least one visible light absorbing ingredient and the optical filter, which is in a plane shape, could also have the at least one visible light absorbing ingredient. The optical image capturing system could directly perform wavefront modulation and imaging specifically for the infrared. In this way, the optical image capturing system has a character of effectively absorbing the visible light and a character of a high transmittance of the infrared and could be applied to different kinds of infrared optical systems, thereby improving a light receiving efficiency and a working quality of the optical image capturing system.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
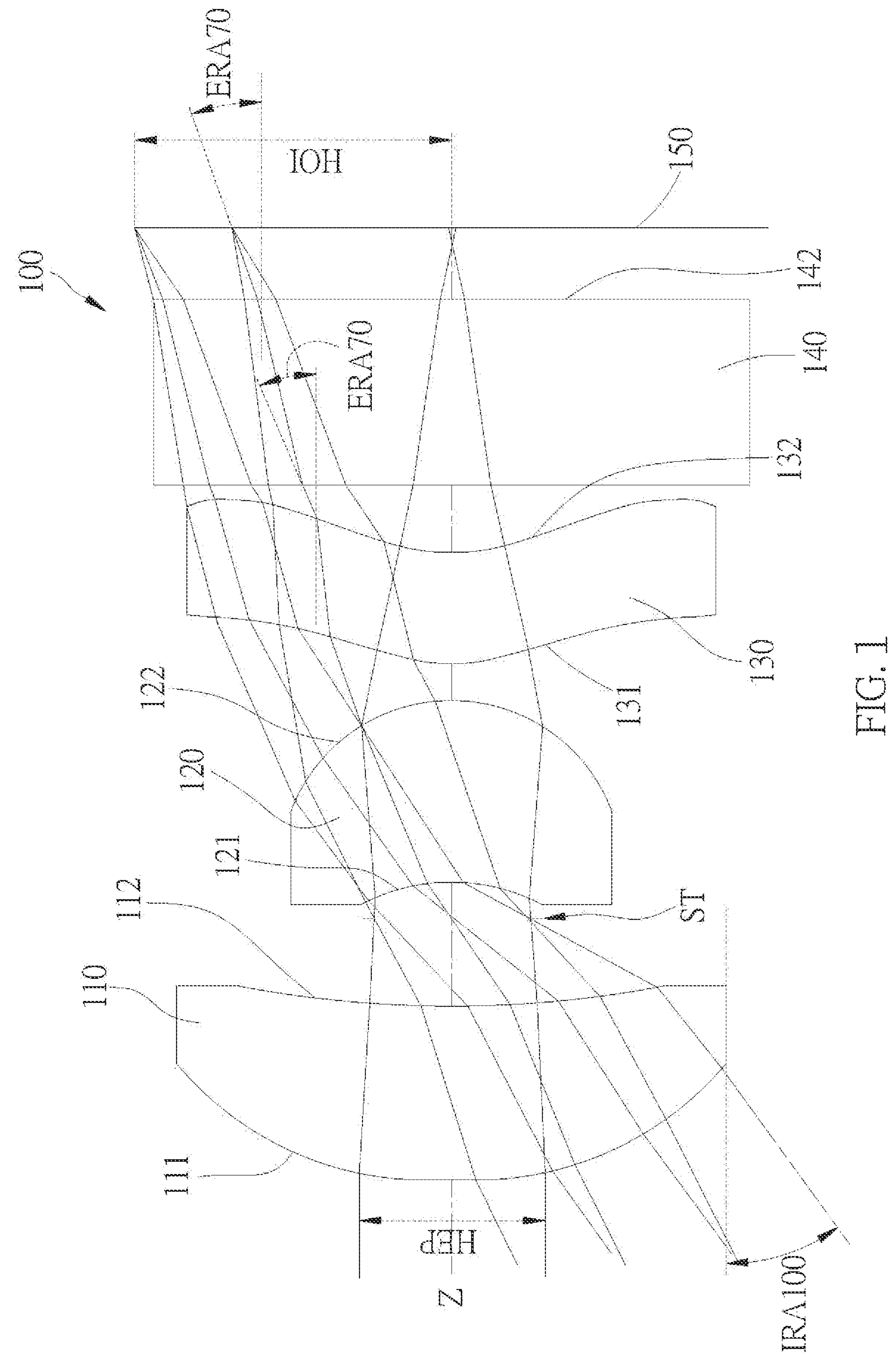
FIG. 1 is a schematic view of a lens arrangement of the optical image capturing system according to a first embodiment of the present invention.
Figure 7:
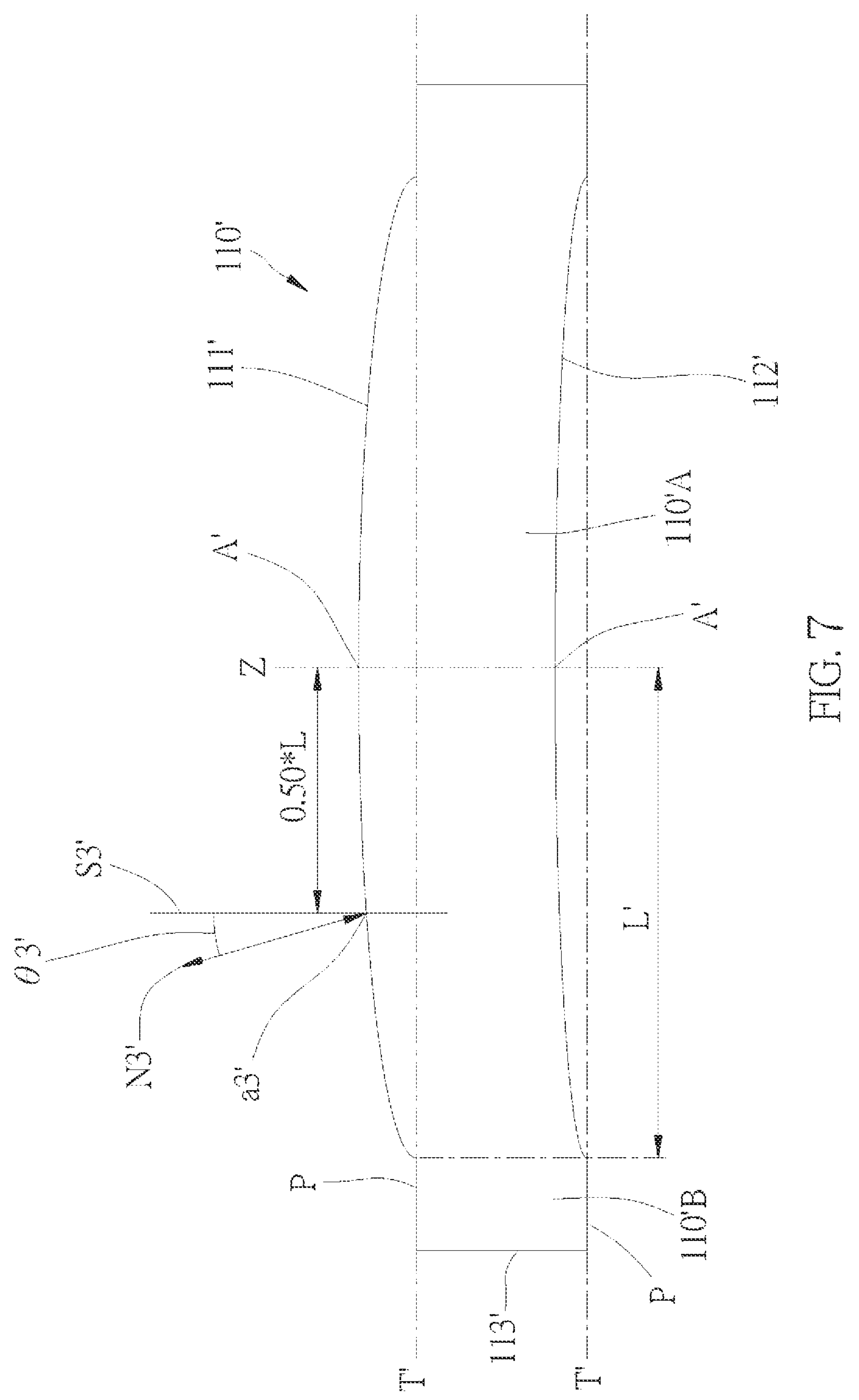
FIG. 7 is a schematic view of the optical image capturing system, showing that θ3' is defined by using the first lens with another structure according to the first embodiment of the present invention.
Figure 8:
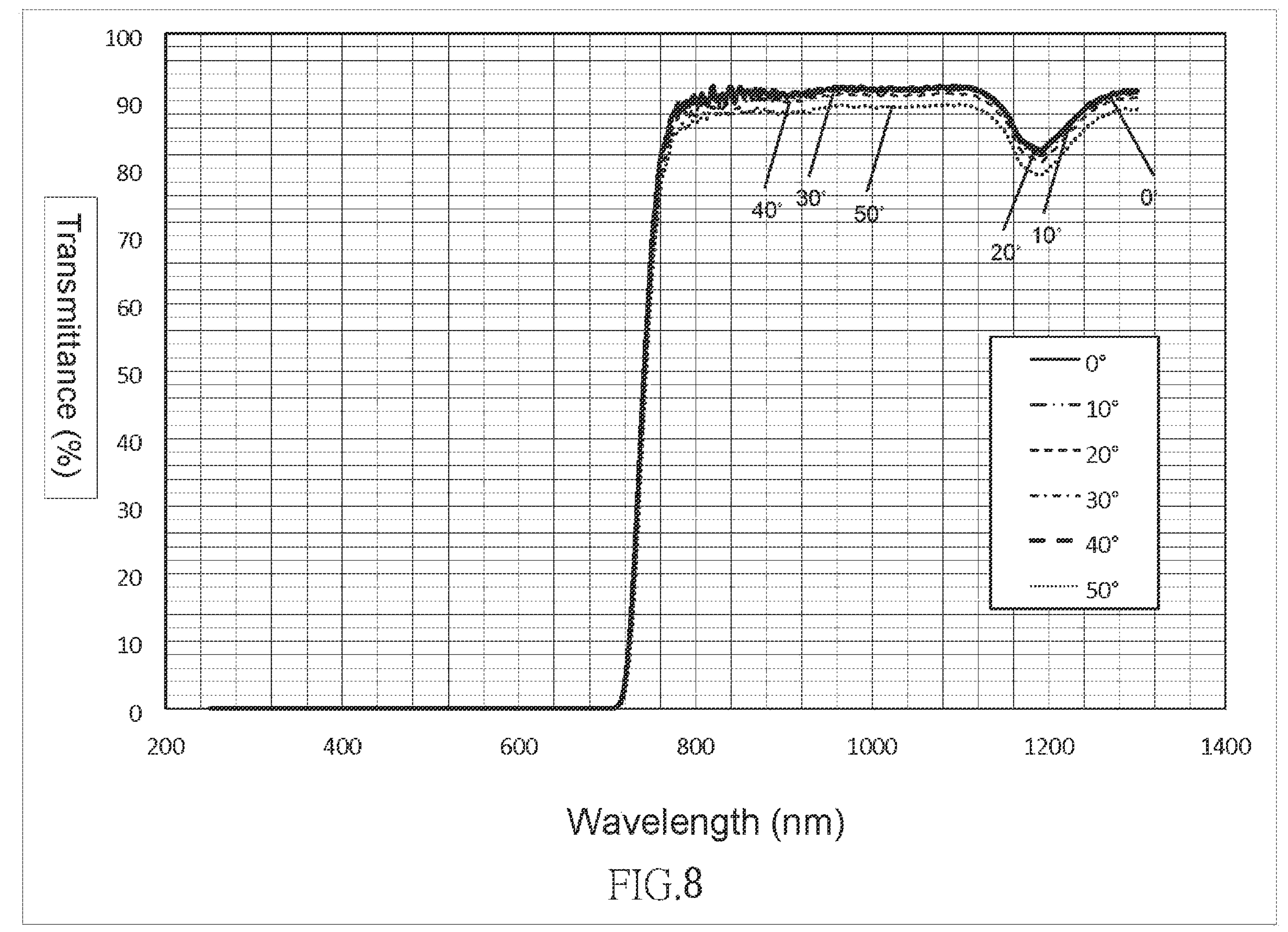
FIG. 8 is a curve diagram of a transmittance of a light with incident angles of 0, 10, 20, 30, 40, and 50 degrees when the light with the wavelength range greater than 800 nm passes through the lens.
Figure 9:
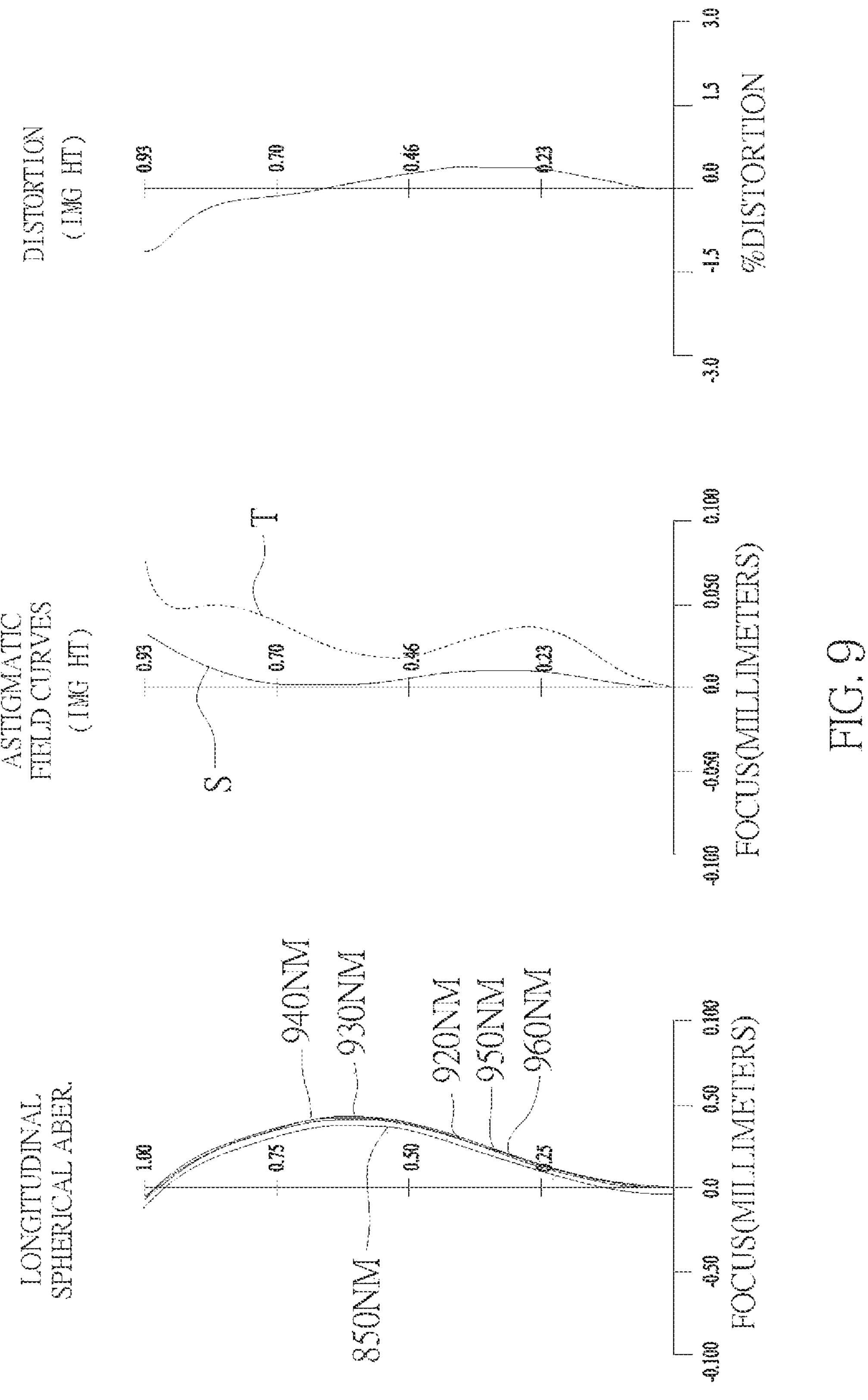
FIG. 9 shows curve diagrams of a longitudinal spherical aberration, an astigmatic field, and an optical distortion of the optical image capturing system in the order from left to right according to the first embodiment of the present invention.
Figure 10:
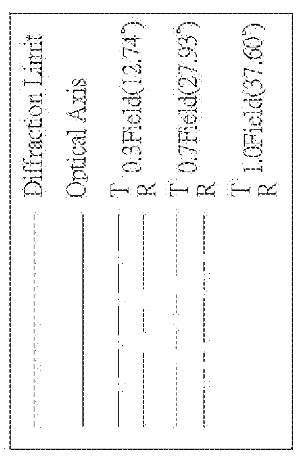
FIG. 10 shows a feature map of modulation transformation of the optical image capturing system according to the first embodiment of the present invention in infrared spectrum.
Figure 10:
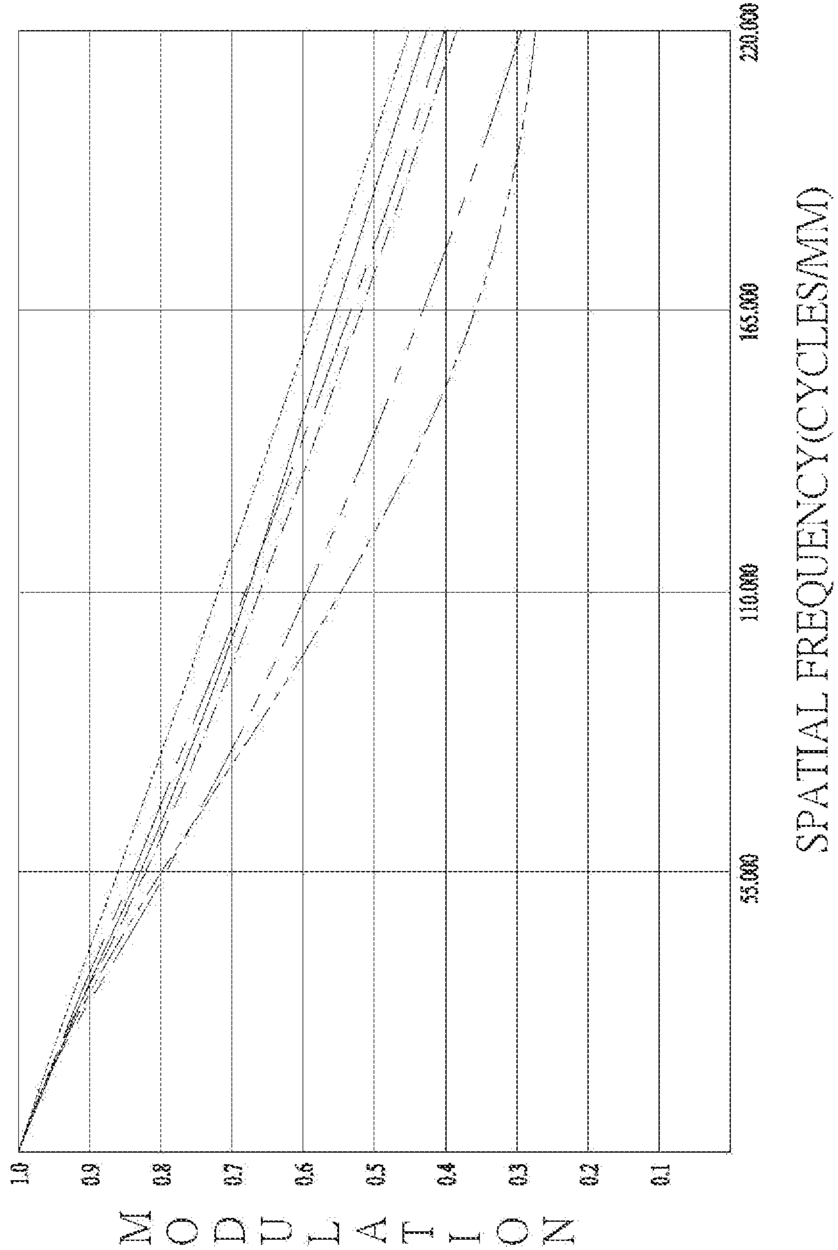

An optical image capturing system 100 according to a first embodiment of the present invention is illustrated in FIG. 1 to FIG. 10. FIG. 1 is a schematic view of a lens arrangement of the optical image capturing system 100 according to the first embodiment of the present invention. FIG. 9 shows curve diagrams of a longitudinal spherical aberration, an astigmatic field, and an optical distortion of the optical image capturing system 100 in an order from left to right according to the first embodiment of the present invention. FIG. 10 shows a feature map of modulation transformation of the optical image capturing system 100 according to the first embodiment of the present invention in infrared spectrum.

Referring to FIG. 1, the optical image capturing system 100 according to the first embodiment of the present invention includes, along an optical axis Z from an object side to an image side, a first lens 110, an aperture ST, a second lens 120, a third lens 130, an optical filter 140, and an image plane 150.

The first lens 110 is a convex-concave lens with positive refractive power, wherein an object-side surface 111, which faces the object side, of the first lens 110 is a convex surface and an image-side surface 112, which faces the image side, of the first lens 110 is a concave surface. At least one of the object-side surface 111 of the first lens 110 and the image-side surface 112 of the first lens 110 is aspheric. In the first embodiment, the object-side surface 111 of the first lens 110 and the image-side surface 112 of the first lens 110 are both aspheric. The first lens 110 is a filter lens made of plastic and includes at least one visible light absorbing ingredient, wherein the at least one visible light absorbing ingredient could be an azo dye or a porphyrin dye. Through an addition of the at least one visible light absorbing ingredient to the first lens 110, the first lens 110 could be changed to effectively absorb a particular wavelength, so that the first lens 110 correspondingly absorbs a visible light with a wavelength range from 400 nm to 700 nm, and a light with a wavelength range greater than 800 nm could correspondingly pass through the first lens 110, thereby maintaining a high transmittance of an infrared.

The second lens 120 is a concave-convex lens with positive refractive power, wherein an object-side surface 121, which faces the object side, of the second lens 120 is a concave surface and an image-side surface 122, which faces the image side, of the second lens 120 is a convex surface. At least one of the object-side surface 121 of the second lens 120 and the image-side surface 122 of the second lens 120 is aspheric. In the first embodiment, the object-side surface 121 of the second lens 120 and the image-side surface 122 of the second lens 120 are both aspheric. The second lens 120 is a filter lens made of plastic and includes the at least one visible light absorbing ingredient, so that the second lens 120 could correspondingly absorb the visible light with the wavelength range from 400 nm to 700 nm and could allow the light with the wavelength range greater than 800 nm to pass through the second lens 120 correspondingly.

The third lens 130 is a convex-concave lens with positive refractive power, wherein an object-side surface 131, which faces the object side, of the third lens 130 is a convex surface and an image-side surface 132, which faces the image side, of the third lens 130 is a concave surface. At least one of the object-side surface 131 of the third lens 130 and the image-side surface 132 of the third lens 130 is aspheric. In the first embodiment, the object-side surface 131 of the third lens 130 and the image-side surface 132 of the third lens 130 are both aspheric. The third lens 130 is a filter lens made of plastic and includes the at least one visible light absorbing ingredient, so that the third lens 130 could correspondingly absorb the visible light with the wavelength range from 400 nm to 700 nm and allow the light with the wavelength range greater than 800 nm to pass through the third lens 130 correspondingly.

Additionally, the object-side surface 111 of the first lens 110, the object-side surface 121 of the second lens 120, the object-side surface 131 of the third lens 130, the image-side surface 112 of the first lens 110, the image-side surface 122 of the second lens 120, and the image-side surface 132 of the third lens 130 are all aspheric that could obtain more control parameters to reduce aberration. The number of the lenses could be less than the conventional spherical glass lenses, which is helpful for reduction of the height of the optical image capturing system 100.

An equation of aspheric surfaces is:

$$z = ch^2/\left[1 + \left[1 - (k+1)c^2h^2\right]^{0.5}\right] + A4h^4 + A6h^6 + A8h^8 + A10h^{10} + A12h^{12} + A14h^{14} + A16h^{16} + A18h^{18} + A20h^{20} + \ldots \quad (1)$$

where z is a position value along the optical axis Z at a height h with a surface vertex as a reference point; k is a conic constant; c is a reciprocal of a radius of curvature, and A4, A6, A8, A10, A12, A14, A16, A18, and A20 are high-order aspheric coefficients.

Furthermore, in the optical image capturing system 100 of the present invention, when the lens has a convex surface, the surface is convex around a position, through which the optical axis Z passes. When the lens has a concave surface, the surface is concave around a position, through which the optical axis Z passes.

Figure 2:
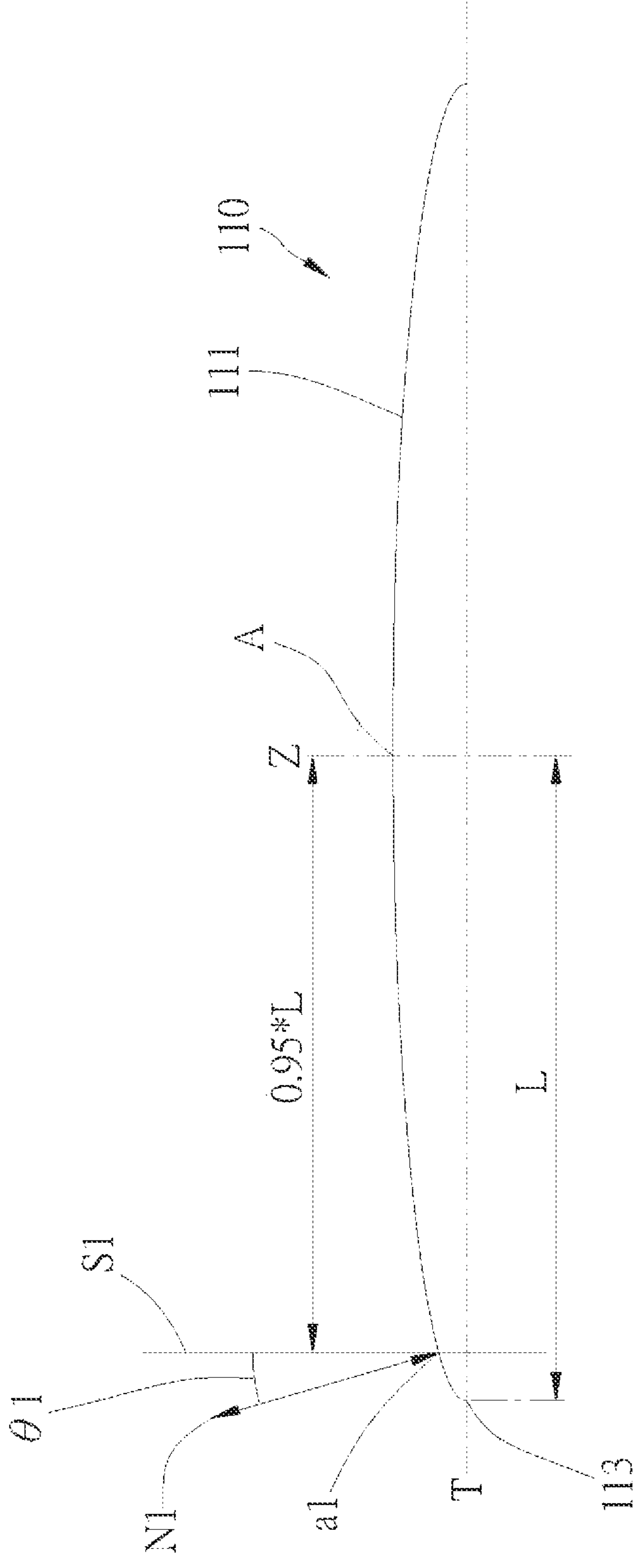
FIG. 2 is a schematic view of the optical image capturing system, showing that θ1 is defined by using the first lens according to the first embodiment of the present invention.

In the first embodiment, the first lens 110, the second lens 120, and the third lens 130 respectively satisfy: $|\theta 1| \leq 62°$, wherein a definition of $|\theta 1|$ is illustrated by a structure of the first lens 110 as an example. Referring to FIG. 2, a definition of a maximum effective half diameter of the first lens 110 is exemplified by using the object-side surface 111. The optical axis Z intersects with the object-side surface 111 of the first lens 110 to form an intersection point A. A vertical height L is defined as a distance from the intersection point A to a maximum effective half diameter position in a direction perpendicular to the optical axis Z. Two sides of the first lens 110 respectively have an outer peripheral surface 113. The first lens 110 defines an imaginary line T being perpendicular to the optical axis Z and passing through two endpoints of the two outer peripheral surfaces 113. The imaginary line T correspondingly meets two maximum boundary points of the object-side surface 111 of the first lens 110, so that the maximum effective half diameter position is defined as an intersection of the imaginary line T and one of the maximum boundary points of the object-side surface 111. An a1 point on the object-side surface 111 is defined as a position where a distance between the a1 point and the intersection point A in the direction perpendicular to the optical axis Z is 0.95 times the vertical height L. The a1 point has a reference line S1 and a normal line vector N1, wherein the reference line S1 passes through the a1 point and is correspondingly parallel to the optical axis Z. The normal line vector N1 passes through the a1 point and is correspondingly perpendicular to the object-side surface 111. θ1 is an intersecting angle formed between the reference line N1 and the normal line vector S1.

In other words, the definition of the maximum effective half diameter of the first lens 110 could be also applied to the image-side surface 112 of the first lens 110 (not shown in FIG. 2). The optical axis Z also intersects with the image-side surface 112 of the first lens to form the intersection point A. The vertical height L is defined as the distance from the intersection point A to the maximum effective half diameter position in the direction perpendicular to the optical axis Z. The imaginary line T correspondingly meets two maximum boundary points of the image-side surface 112 of the first lens 110, so that the maximum effective half diameter position is defined as an intersection of the imaginary line T and one of the maximum boundary points of the image-side surface 112 of the first lens 110. An a1 point (not shown) is also defined on the image-side surface 112. A position of the a1 point of the image-side surface 112 is defined in a way the same as a way in which the position of the a1 point of the object-side surface 111 is defined. The a1 point on the image-side surface 112 is defined as a position where a distance between the a1 point and the intersection point A in the direction perpendicular to the optical axis Z is 0.95 times the vertical height L. The a1 point of the image-side surface 112 has a reference line S1 and a normal line vector N1. The reference line S1 passes through the a1 point and is correspondingly parallel to the optical axis Z. The normal line vector N1 passes through the a1 point and is correspondingly perpendicular to the image-side surface 112. θ1 (not shown in FIG. 2) is an intersecting angle formed between the normal line vector S1 and the reference line N1.

Figure 3:
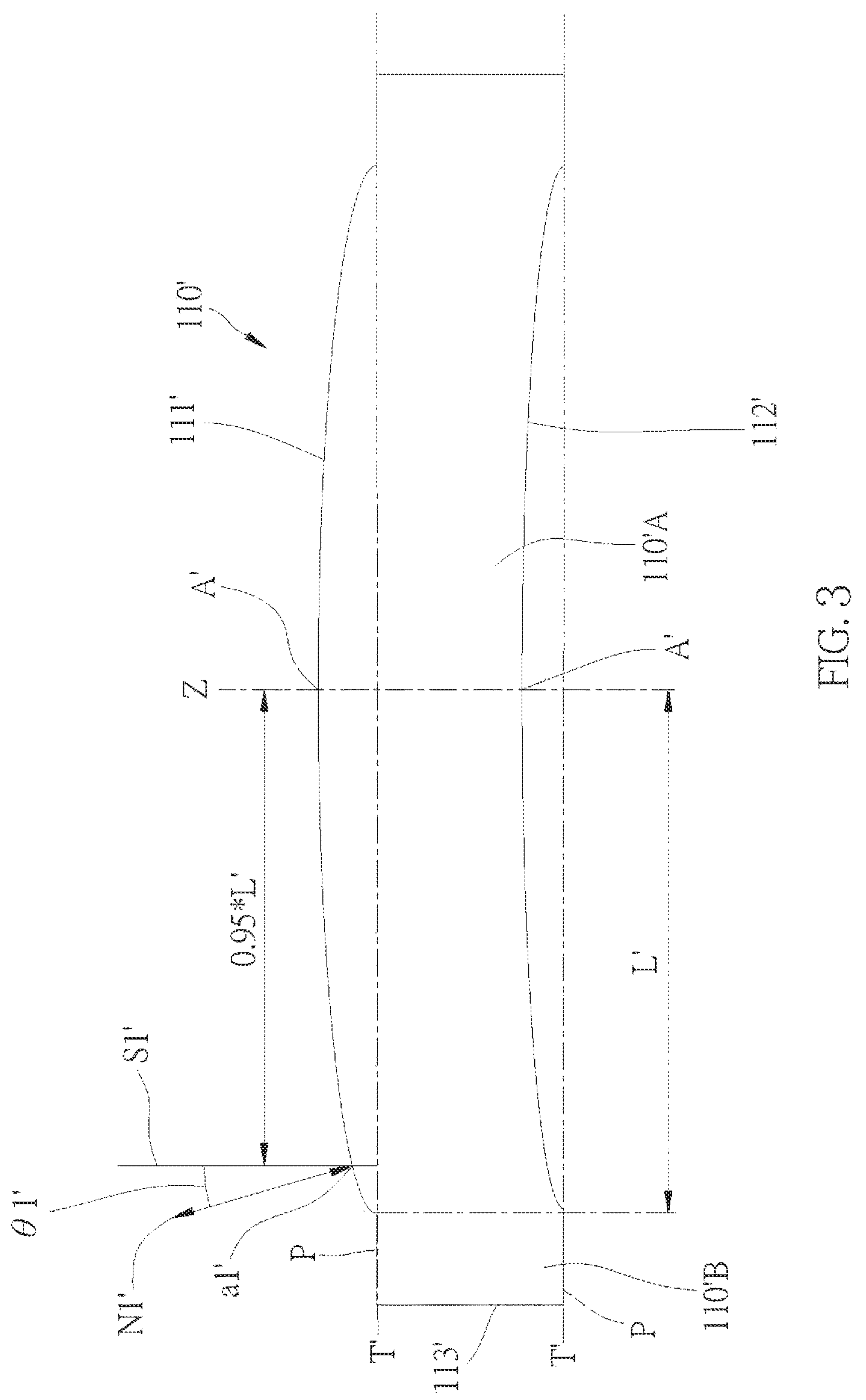
FIG. 3 is a schematic view of the optical image capturing system, showing 01' is defined by using the first lens with another structure according to the first embodiment of the present invention.

In another embodiment, the first lens 110 is replaced with a lens with other structures. Another structure of a first lens 110' is illustrated in FIG. 3. A maximum effective half diameter of the first lens 110' is exemplified by using an object-side surface 111', which faces the object side, of the first lens 110'. The optical axis Z intersects with the object-side surface 111' of the first lens 110' to form an intersection point A', wherein a vertical height L' is defined as a distance from the intersection point A' to a maximum effective half diameter position of the first lens 110' in a direction perpendicular to the optical axis Z. Two sides of the first lens 110' respectively has an outer peripheral surface 113'. The first lens 110' defines an imaginary line T' being perpendicular to the optical axis Z and passing through two endpoints of the two outer peripheral surfaces 113'. The imaginary line T' correspondingly meets two maximum boundary points of the object-side surface 111'.

More specifically, the first lens 110' has two horizontal contour surfaces P corresponding to a periphery of the object-side surface 111', wherein the two horizontal contour surfaces P corresponding to the periphery of the object-side surface 111' are respectively connected to the two endpoints of the two outer peripheral surfaces 113' and the two maximum boundary points of the object-side surface 111'. The imaginary line T' overlaps with each of the horizontal contour surfaces P corresponding to the periphery of the object-side surface 111' and passes through the two outer peripheral surfaces 113', so that the maximum effective half diameter position is defined as an intersection of the imaginary line T' and one of the maximum boundary points of the object-side surface 111'. An a1' point on the object-side surface 111' is defined as a position where a distance between the a1' point and the intersection point A' in the direction perpendicular to the optical axis Z is 0.95 times the vertical height L'. The a1' point has a reference line S1' and a normal line vector N1', wherein the reference line S1' passes through the a1' point and is correspondingly parallel to the optical axis Z. The normal line vector N1' passes through the a1' point and is correspondingly perpendicular to the object-side surface 111'. θ1' is an intersecting angle formed between the reference line S1' and the normal line vector N1'.

In other words, the definition of the maximum effective half diameter of the first lens 110' could be also applied to an image-side surface 112', which faces the image side, of the first lens 110'. Referring to FIG. 3, the optical axis Z also intersects with the image-side 112' of the first lens 110' to form the intersection point A'. The vertical height L' is defined as the distance from the intersection point A' to the maximum effective half diameter position in the direction perpendicular to the optical axis Z. The way in which the maximum effective half diameter position of the image-side surface 112' defines the vertical height L' is the same as the way in which the maximum effective half diameter position of the object-side surface 111' defines the vertical height L'. The imaginary line T' correspondingly meets two maximum boundary points of the image-side surface 112'. The first lens 110' has two horizontal contour surfaces P corresponding to a periphery of the image-side surface 112', wherein the two horizontal contour surfaces P corresponding to the periphery of the image-side surface 112' are respectively connected to the two endpoints of the two outer peripheral surfaces 113' and the two maximum boundary points of the image-side surface 112'. The imaginary line T' overlaps with each of the horizontal contour surfaces P corresponding to the periphery of the image-side surface 112' and passes through the two outer peripheral surfaces 113', so that the maximum effective half diameter position is defined as an intersection of the imaginary line T' and one of the maximum boundary points of the image-side surface 112'. An a1' point (not shown) is also defined on the image-side surface 112'. A position of the a1' point of the image-side surface 112' is defined in a way the same as a way in which the position of the a1' point of the object-side surface 111' is defined.

In other embodiments, the first lens 110' could be modified to other structures upon the required demand, i.e., the vertical height L' of the image-side surface 112' is greater than the vertical height L' of the object-side surface 111' or the vertical height L' of the image-side surface 112' is less than the vertical height L' of the object-side surface 111'.

Additionally, the first lens 110' could be defined in other ways according to the structure of the first lens 110'. For example, the first lens 110' is illustrated in FIG. 3 and has an optical effective area 110'A and an optical ineffective area 110'B, wherein the optical effective area 110'A is provided for the optical axis Z to pass through the first lens 110'. The optical ineffective area 110'B surrounds a periphery of the optical effective area 110'. The maximum effective half diameter position of the first lens 110' is defined as a very edge of the optical effective area 110'A being in contact with the optical ineffective area 110'B.

Figure 4:
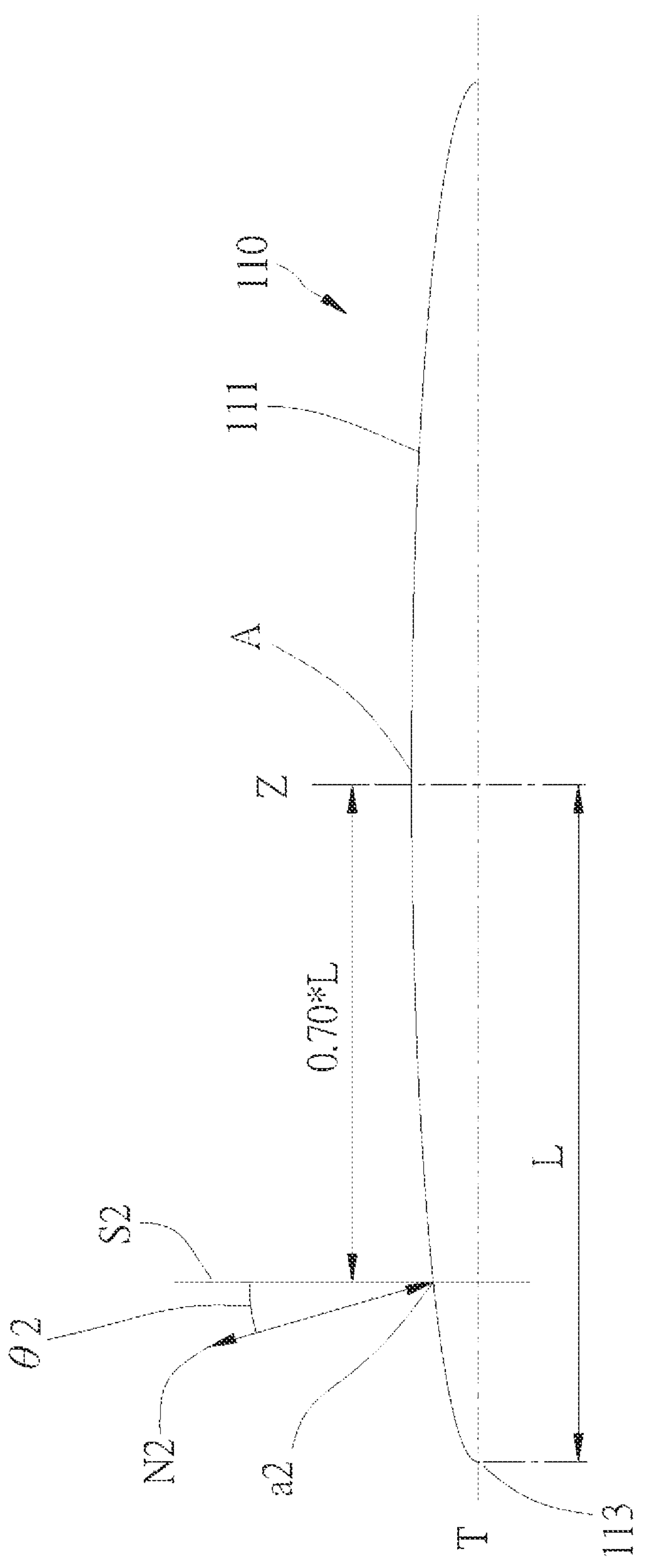
FIG. 4 is a schematic view of the optical image capturing system, showing that θ2 is defined by using the first lens according to the first embodiment of the present invention.

In an embodiment, the first lens 110, the second lens 120, and the third lens 130 respectively satisfy: $|\theta2| \leq 52°$, wherein a definition of $|\theta2|$ is illustrated by the structure of the first lens 110 as an example. Referring to FIG. 4, the definition of the maximum effective half diameter of the first lens 110 is exemplified by using the object-side surface 111. The optical axis Z intersects with the object-side surface 111 of the first lens 110 to form the intersection point A. The vertical height L is defined as the distance from the intersection point A to the maximum effective half diameter position in the direction perpendicular to the optical axis Z. An a2 point on the object-side surface 111 is defined as a position where a distance between the a2 point and the intersection point A in the direction perpendicular to the optical axis Z is 0.70 times the vertical height L. The a2 point has a reference line S2 and a normal line vector N2, wherein the reference line S2 passes through the a2 point and is correspondingly parallel to the optical axis Z. The normal line vector N2 passes through the a2 point and is correspondingly perpendicular to the object-side surface 111. θ2 is an intersecting angle formed between the normal line vector S2 and the reference line N2.

In other words, the definition of the maximum effective half diameter of the first lens 110 could be also applied to the image-side surface 112 (not shown in FIG. 4). The optical axis Z also intersects with the image-side surface 112 of the first lens 110 to form the intersection point A. The vertical height L is defined as the distance from the intersection point A to the maximum effective half diameter position in the direction perpendicular to the optical axis Z. An a2 point (not shown) is also defined on the image-side surface 112. A position of the a2 point of the image-side surface 112 is defined in a way the same as a way in which the position of the a2 point of the object-side surface 111 is defined.

Figure 5:
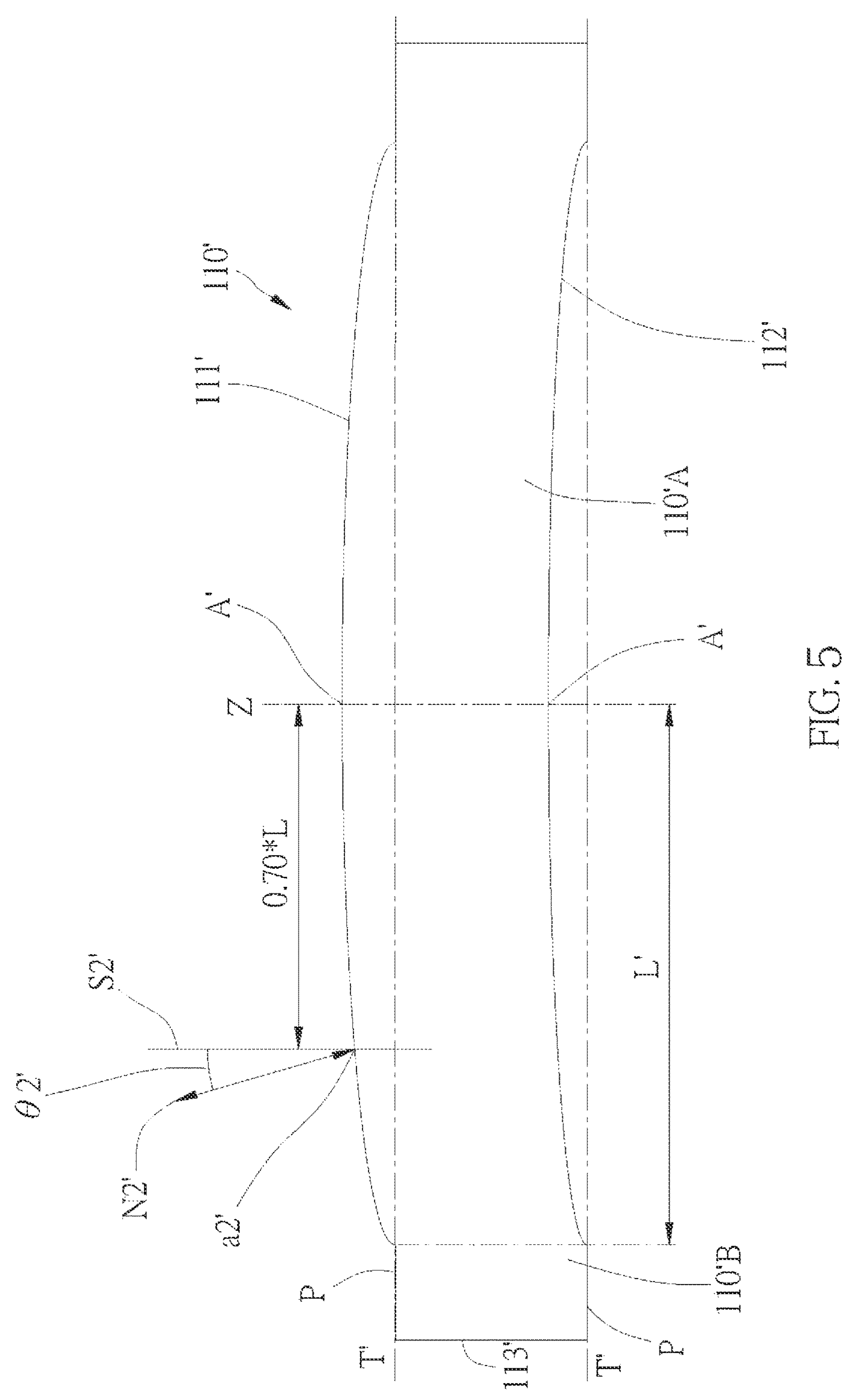
FIG. 5 is a schematic view of the optical image capturing system, showing that θ2' is defined by using the first lens with another structure according to the first embodiment of the present invention.

In another embodiment, another structure of the first lens 110' is illustrated in FIG. 5. The maximum effective half diameter of the first lens 110' is exemplified by using the object-side surface 111'. The optical axis Z intersects with the object-side surface 111' of the first lens 110' to form the intersection point A', wherein the vertical height L' is defined as the distance from the intersection point A' to the maximum effective half diameter position in the direction perpendicular to the optical axis Z. The imaginary line T' of the first lens 110' is perpendicular to the optical axis Z and passes through the two endpoints of the two outer peripheral surfaces 113'. The imaginary line T' correspondingly meets the two maximum boundary points of the object-side surface 111'. More specifically, the first lens 110' has the two horizontal contour surfaces P corresponding to the periphery of the object-side surface 111', wherein the two horizontal contour surfaces P corresponding to the periphery of the object-side surface 111' are respectively connected to the two endpoints of the two outer peripheral surfaces 113' and the two maximum boundary points of the object-side surface 111'. The imaginary line T' overlaps with each of the horizontal contour surfaces P corresponding to the periphery of the object-side surface 111' and passes through the two outer peripheral surfaces 113', so that the maximum effective half diameter position is defined as the intersection of the imaginary line T' and one of the maximum boundary points of the object-side surface 111'.

An a2' point on the object-side surface 111 is defined as a position where a distance between the a2' point and the intersection point A' in the direction perpendicular to the optical axis Z is 0.70 times the vertical height L'. The a2' point has a reference line S2' and a normal line vector N2', wherein the reference line S2' passes through the a2' point and is correspondingly parallel to the optical axis Z. The normal line vector N2' passes through the a2' point and is correspondingly perpendicular to the object-side surface 111'. θ2' is an intersecting angle formed between the normal line vector S2' and the reference line N2'.

In other words, the definition of the maximum effective half diameter of the first lens 110' could be also applied to the image-side surface 112' of the first lens 110'. Referring to FIG. 5, the optical axis Z also intersects with the image-side 112' of the first lens 110' to form the intersection point A'. The vertical height L' is defined as the distance from the intersection point A' to the maximum effective half diameter position in the direction perpendicular to the optical axis Z. An a2' point (not shown) is also defined on the image-side surface 112'. A position of the a2' point of the image-side surface 112' is defined in a way the same as a way in which the position of the a2' point of the object-side surface 111' is defined.

Additionally, the first lens 110' could be defined in other ways according to the structure of the first lens 110'. For example, the first lens 110' is illustrated in FIG. 5 and has an optical effective area 110'A and an optical ineffective area 110'B, wherein the optical effective area 110'A is provided for the optical axis Z to pass through the first lens 110'. The optical ineffective area 110'B surrounds a periphery of the optical effective area 110'. The maximum effective half diameter position of the first lens 110' is defined as a very edge of the optical effective area 110'A being in contact with the optical ineffective area 110'B.

Figure 6:
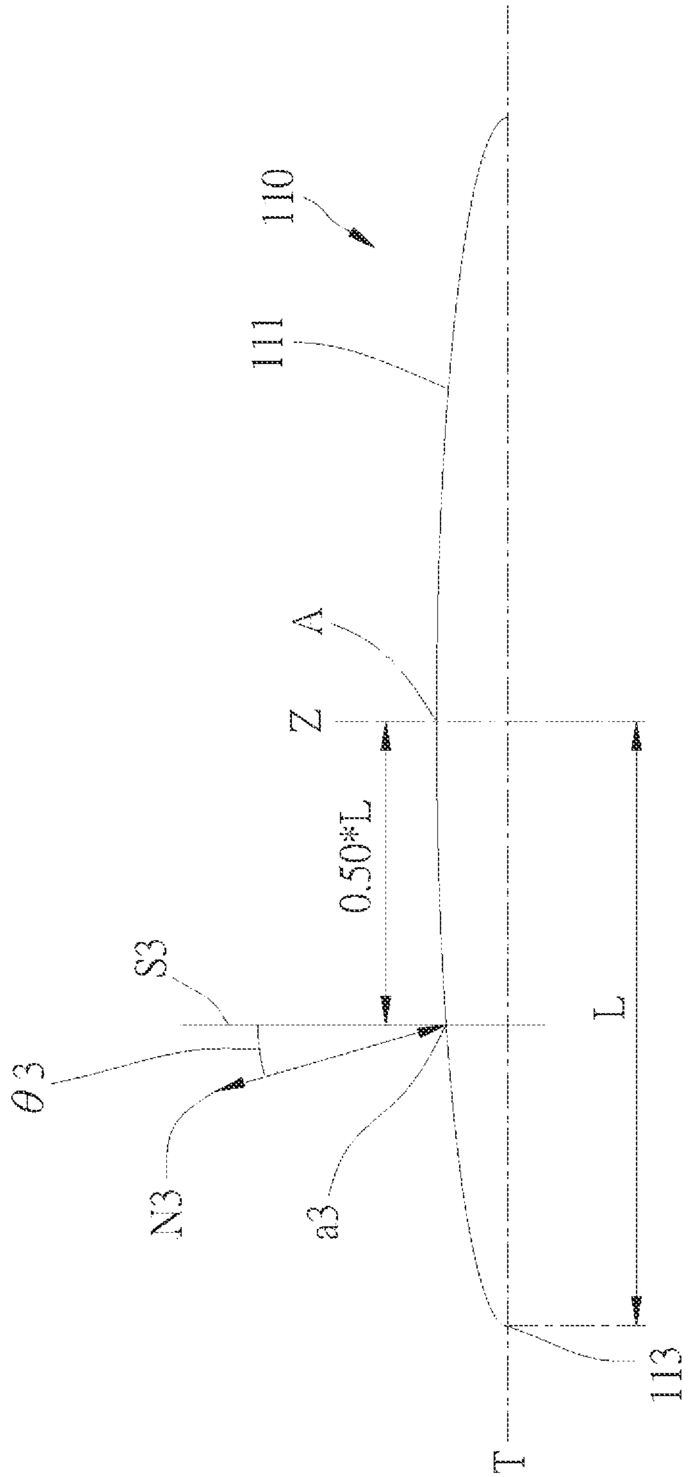
FIG. 6 is a schematic view of the optical image capturing system, showing that θ3 is defined by using the first lens according to the first embodiment of the present invention.

In an embodiment, the first lens 110, the second lens 120, and the third lens 130 respectively satisfy: $|\theta 3| \leq 42°$, wherein a definition of $|\theta 3|$ is illustrated by the structure of the first lens 110 as an example. Referring to FIG. 6, the definition of the maximum effective half diameter of the first lens 110 is exemplified by using the object-side surface 111. The optical axis Z intersects with the object-side surface 111 of the first lens 110 to form the intersection point A. The vertical height L is defined as the distance from the intersection point A to the maximum effective half diameter position in the direction perpendicular to the optical axis Z. An a3 point on the object-side surface 111 is defined as a position wherein a distance between the a3 point and the intersection point A in the direction perpendicular to the optical axis Z is 0.50 times the vertical height L. The a3 point has a reference line S3 and a normal line vector N3, wherein the reference line S3 passes through the a3 point and is correspondingly parallel to the optical axis Z. The normal line vector N3 passes through the a3 point and is correspondingly perpendicular to the object-side surface 111. θ3 is an intersecting angle formed between the normal line vector S3 and the reference line N3.

In other words, the definition of the maximum effective half diameter of the first lens 110 could be also applied to the image-side surface 112 (not shown in FIG. 6). The optical axis Z also intersects with the image-side 112 of the first lens 110 to form the intersection point A. The vertical height L is defined as the distance from the intersection point A to the maximum effective half diameter position in the direction perpendicular to the optical axis Z. An a3 point (not shown) is also defined on the image-side surface 112. A position of the a3 point of the image-side surface 112 is defined in a way the same as a way in which the position of the a3 point of the object-side surface 111 is defined.

In another embodiment, another structure of the first lens 110' is illustrated in FIG. 7. The maximum effective half diameter of the first lens 110' is exemplified by using the object-side surface 111'. The optical axis Z intersects with the object-side surface 111' of the first lens 110' to form the intersection point A', wherein the vertical height L' is defined as the distance from the intersection point A' to the maximum effective half diameter position in the direction perpendicular to the optical axis Z. The imaginary line T' of the first lens 110' is perpendicular to the optical axis Z and passes through two endpoints of the two outer peripheral surfaces 113'. The imaginary line T' correspondingly meets the two maximum boundary points of the object-side surface 111'. More specifically, the first lens 110' has the two horizontal contour surfaces P corresponding to the periphery of the object-side surface 111', wherein the two horizontal contour surfaces P corresponding to the periphery of the object-side surface 111' are respectively connected to the two endpoints of the two outer peripheral surfaces 113' and the two maximum boundary points of the object-side surface 111'. The imaginary line T' overlaps with each of the horizontal contour surfaces P corresponding to the periphery of the object-side surface 111' and passes through the two outer peripheral surfaces 113', so that the maximum effective half diameter position is defined as the intersection of the imaginary line T' and one of the maximum boundary points of the object-side surface 111'.

An a3' point on the object-side surface 111' is defined as a position where a distance between the a3' point and the intersection point A' in the direction perpendicular to the optical axis Z is 0.50 times the vertical height L'. The a3 point has a reference line S3' and a normal line vector N3', wherein the reference line S3' passes through the a3' point and is correspondingly parallel to the optical axis Z. The normal line vector N3' passes through the a3' point and is correspondingly perpendicular to the object-side surface 111'. θ3' is an intersecting angle formed between the normal line vector S3' and the reference line N3'.

In other words, the definition of the maximum effective half diameter of the first lens 110' could be also applied to the image-side surface 112' of the first lens 110'. Referring to FIG. 7, the optical axis Z also intersects with the image-side 112' of the first lens 110' to form the intersection point A'. The vertical height L' is defined as the distance from the intersection point A' to the maximum effective half diameter position in the direction perpendicular to the optical axis Z. An a3' point (not shown) is also defined on the image-side surface 112'. A position of the a3' point of the image-side surface 112' is defined in a way the same as a way in which the position of the a3' point of the object-side surface 111' is defined.

Additionally, the first lens 110' could be defined in other ways according to the structure of the first lens 110'. For example, the first lens 110' is illustrated in FIG. 7 and has an optical effective area 110'A and an optical ineffective area 110'B, wherein the optical effective area 110'A is provided for the optical axis Z to pass through the first lens 110'. The optical ineffective area 110'B surrounds the periphery of the optical effective area 110'. The maximum effective half diameter position of the first lens 110' is defined as a very edge of the optical effective area 110'A being in contact with the optical ineffective area 110'B.

Additionally, the first lens 110, the second lens 120, and the third lens 130 respectively satisfy: TWL50−TWL40≤30 nm, wherein TWL40 is a light wavelength with a transmittance of 40% as presented in a transmission curve of the first lens 110, in a transmittance curve of the second lens 120, and in a transmittance curve of the third lens 130 and TWL50 is a light wavelength with a transmittance of 50% as presented in a transmission curve of the first lens 110, in a transmittance curve of the second lens 120, and in a transmittance curve of the third lens 130. In an embodiment, the first lens 110, the second lens 120, and the third lens 130 respectively satisfy TWL50−TWL40≤20 nm. In another embodiment, the first lens 110, the second lens 120, and the third lens 130 respectively satisfy TWL50−TWL40≤10 nm. In the current embodiment, the first lens 110, the second lens 120, and the third lens 130 all use the same at least one visible light absorbing ingredient, so that the first lens 110 in reality is selected to be tested for a spectral transmission wavelength and the transmittance. A test result of the spectrum transmission wavelength of the first lens 110 and the transmittance of the first lens 110 is shown in Table 1.

TABLE 1

Test result of spectrum transmission wavelength and spectrum transmittance of the first lens

| Spectrum wavelength (nm) | Spectrum transmittance (%) |
|---|---|
| 868 | 39.1 |
| 869 | 40.8 |
| 870 | 41.7 |
| 871 | 42.5 |
| 872 | 44.3 |
| 873 | 45.8 |
| 874 | 47.8 |
| 875 | 49.4 |
| 876 | 51.1 |
| 877 | 52.8 |

According to data as shown in Table 1, the light wavelength with the spectrum transmittance of 40% of the first lens 110 is 869 nm and the light wavelength with the spectrum transmittance of 50% of the first lens 110 is 875 nm, so that the first lens 110 satisfies TWL50−TWL40=6 nm, which satisfies TWL50-TWL40≤10 nm.

Additionally, FIG. 8 is a curve diagram of a transmittance of a light at incident angles of 0, 10, 20, 30, 40, and 50 degrees when the light with a wavelength range greater than 800 nm passes through a lens. The lens satisfies: |TA50−TA0|≤10%, wherein when the light with the wavelength range greater than 800 nm passes through the lens, TA50 is a transmittance of the light at the incident angle of 50 degrees and TA0 is a transmittance of the light at the incident angle of 0 degree.

Additionally, in the first embodiment, the first lens 110 satisfies: 28°≤IRA100≤90°, wherein HOI is a maximum height for image formation of the image plane 150 and IRA100 is an angle at which a lower light of the light enters the object-side surface 111 and corresponds to a position of 1.0*HOI on the image plane 150. The third lens 130 satisfies: 13°≤ERA70≤27°, wherein HOI is a maximum height for image formation of the image plane 150 and ERA70 is an angle at which a main light of the light exits the image-side surface 132 and corresponds to a position of 0.70*HOI on the image plane 150.

The first lens 110, the second lens 120, and the third lens 130 respectively satisfy: 0.1 mm≤CT≤1.0 mm, wherein CT is a central thickness of the lens.

Additionally, the first lens 110, the second lens 120, and the third lens 130 respectively have an anti-reflective coating, wherein the anti-reflective coating allows the light with the wavelength range greater than 800 nm to pass correspondingly through the first lens 110, the second lens 120, and the third lens 130. A material of the anti-reflective coating includes magnesium fluoride ($MgF_2$), silicon dioxide ($SiO_2$), zinc sulfide (ZnS), titanium dioxide ($TiO_2$), aluminum oxide ($Al_2O_3$), and silicon nitride ($Si_3N_4$). The material of the anti-reflective coating is selected for interfering a light wave being reflected from a surface of the lens, thereby reducing a reflection and raising a light transmittance.

The optical filter 140 is adjacent to the third lens 130. In an embodiment, the optical filter 140 has the at least one visible light absorbing ingredient, so that the optical filter 140 correspondingly absorbs the visible light with the wavelength range from 400 nm to 700 nm likewise and allows the light with the wavelength range greater than 800 nm to pass correspondingly through the optical filter 140.

In the first embodiment, the first lens 110, the second lens 120, and the third lens 130 respectively have a light filtering coating and/or the optical filter 140 has the light filtering coating, wherein the light filtering coating correspondingly absorbs a light with a wavelength range greater than 900 nm.

The optical filter 140 satisfies: |TA50−TA0|≤10%, wherein when the light with the wavelength range greater than 800 nm passes through the optical filter 140, TA50 is a transmittance of the light at the incident angle of 50 degrees and TA0 is a transmittance of the light at the incident angle of 0 degree.

The optical filter 140 satisfies: 13°≤ERA70≤27°, wherein HOI is a maximum height for image formation of the image plane 150 and ERA70 is an angle at which a main light of the light exits the image-side surface 141 of the optical filter 140 and corresponds to a position of 0.70*HOI on the image plane 150.

In addition, the optical filter 140 satisfies: 0.1 mm≤CT≤1.0 mm, wherein CT is a central thickness of the optical filter 140.

In an embodiment, the optical filter 140 has the anti-reflective coating, wherein the anti-reflective coating allows the light with the wavelength range greater than 800 nm to pass through the optical filter 140 correspondingly.

The parameters of the lenses of the first embodiment are listed in Table 2 and Table 3.

TABLE 2

| f = 1.175 mm; f/HEP = 2.10; HAF = 37.98 deg; HOI = 0.93 mm | | | | | | | |
|---|---|---|---|---|---|---|---|
| Surface | Element | Radius of curvature (mm) | Thickness (mm) | Refractive index | Abbe number | Focal length (mm) | Maximum effective half diameter L |
| 0 | Object | ∞ | 600 | | | | |
| 1 | 1st lens | 1.67559960 | 0.479 | 1.5440 | 55.9604 | 3.5911 | 0.810 |
| 2 | | 10.38465900 | 0.234 | | | | 0.631 |
| 3 | Aperture | | 0.098 | | | | |
| 4 | 2nd lens | −0.86418390 | 0.503 | 1.5440 | 55.9604 | 2.5828 | 0.273 |
| 5 | | −0.64586640 | 0.098 | | | | 0.472 |
| 6 | 3rd lens | 0.52093950 | 0.302 | 1.5440 | 55.9604 | 3.4464 | 0.702 |
| 7 | | 0.57288930 | 0.186 | | | | 0.776 |
| 8 | Optical filter | ∞ | 0.507 | 1.5168 | 64.1600 | | |
| 9 | | ∞ | 0.166 | | | | |
| 10 | Image plane | ∞ | 0 | | | | |

TABLE 3

| Aspheric coefficients of the first embodiment | | | | | | |
|---|---|---|---|---|---|---|
| Surface | 1 | 2 | 3 | 4 | 6 | 8 |
| k | −5.566990E−01 | 1.003370E+02 | 4.669630E−01 | −6.452540E−01 | −6.757640E+00 | −2.453150E+00 |
| A4 | 2.505604E−01 | 8.546703E−01 | −1.083349E+00 | −4.924120E+00 | −1.222922E+00 | −1.535599E+00 |
| A6 | 7.158349E−02 | −3.345722E+00 | −6.345010E+01 | 2.978029E+01 | 5.046714E+00 | 3.867967E+00 |
| A8 | 1.291130E−01 | 5.624340E+00 | 1.915553E+03 | −1.216367E+02 | −1.253826E+01 | −6.203597E+00 |
| A10 | −2.649578E−01 | −3.682339E+00 | −3.098397E+04 | 1.565518E+02 | 1.466423E+01 | 3.956853E+00 |
| A12 | 0.000000E+00 | 0.000000E+00 | 1.826935E+05 | 0.000000E+00 | −5.955008E+00 | −3.651093E−01 |
| A14 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

The detailed parameters of the first embodiment shown in FIG. 1 are listed in Table 2, wherein units for the radius of curvature, the thickness, a distance, the focal length, and the maximum effective half diameter are millimeters (mm). Surfaces 0-10 represent the surfaces of all elements in the system in sequence from the object side to the image side. Table 3 is the list of coefficients of the aspheric surfaces of the first embodiment, wherein k represents the conic constant in the equation of the aspheric surfaces, and A4-A20 represent the aspheric coefficients from the fourth order to the twentieth order of each aspheric surface.

According to the data as shown in Table 2, data of the intersecting angles between the optical axis Z and the normal line vectors of the object sides of the lenses including the first lens 110, the second lens 120, and the third lens 130 respectively located at control points of 0.50*L, 0.70*L, and 0.95*L and data of the intersecting angles between the optical axis Z and the normal line vectors of the image sides of the lenses including the first lens 110, the second lens 120, and the third lens 130 respectively located at control points of 0.50*L, 0.70*L, and 0.95*L are further obtained as shown in Table 4; the angle at which the lower light of the light enters the object-side surface 111 of the first lens 110 and corresponds to the position of 1.0*HOI on the image plane 150 and the angles at which the main lights of the lights exit the image-side surface 132 of the third lens 130 and the optical filter 140 correspond to the position of 0.70*HOI on the image plane 150 are obtained as shown in Table 5. Additionally, the optical image capturing system 100 further includes an image sensing module (not shown), wherein the image sensing module is located on the image plane 150, so that the light could pass through the first lens 110, the second lens 120, the third lens 130, and the optical filter 140 and could be projected on the image sensing module. When the image sensing module detects the light and then converts the light into an electric signal, the image sensing module passes the electric signal to other external devices for subsequent processing.

TABLE 4

| The parameters of θ1, θ2, and θ3 of the object-side surfaces of the lenses including the first lens 110, the second lens 120, and the third lens 130 and the parameters of θ1, θ2, and θ3 of the image-side surfaces of the lenses including the first lens 110, the second lens 120, and the third lens 130 | | | | | | |
|---|---|---|---|---|---|---|
| | 1st lens | | 2nd lens | | 3rd lens | |
| Surface | 1 | 2 | 4 | 5 | 6 | 7 |
| Maximum effective half | 0.810 | 0.631 | 0.273 | 0.472 | 0.702 | 0.776 |

TABLE 4-continued

The parameters of θ1, θ2, and θ3 of the object-side surfaces of the lenses including the first lens 110, the second lens 120, and the third lens 130 and the parameters of θ1, θ2, and θ3 of the image-side surfaces of the lenses including the first lens 110, the second lens 120, and the third lens 130

| | $1^{st}$ lens | | $2^{nd}$ lens | | $3^{rd}$ lens | |
|---|---|---|---|---|---|---|
| Surface | 1 | 2 | 4 | 5 | 6 | 7 |
| diameter (mm) | | | | | | |
| L length % | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface |
| 0.50*L(θ3) | 17.610° | 5.108° | 10.250° | 28.330° | 14.013° | 17.327° |
| 0.70*L(θ2) | 29.204° | 7.305° | 16.286° | 41.663° | 10.796° | 11.448° |
| 0.95*L(θ1) | 44.121° | 7.798° | 26.421° | 59.562° | 2.982° | 10.843° |

TABLE 5

IRA100 of the first lens 110, ERA70 of the third lens 130, and ERA70 of the optical filter 140

| Item | Parameter | |
|---|---|---|
| HOI | 0.930 mm | |
| IRA100 | 37.978° | Object-side surface of the first lens |
| ERA70 | 22.890° | Image-side surface of the third lens |
| ERA70 | 22.890° | Optical filter |

Second Embodiment

Figure 11:
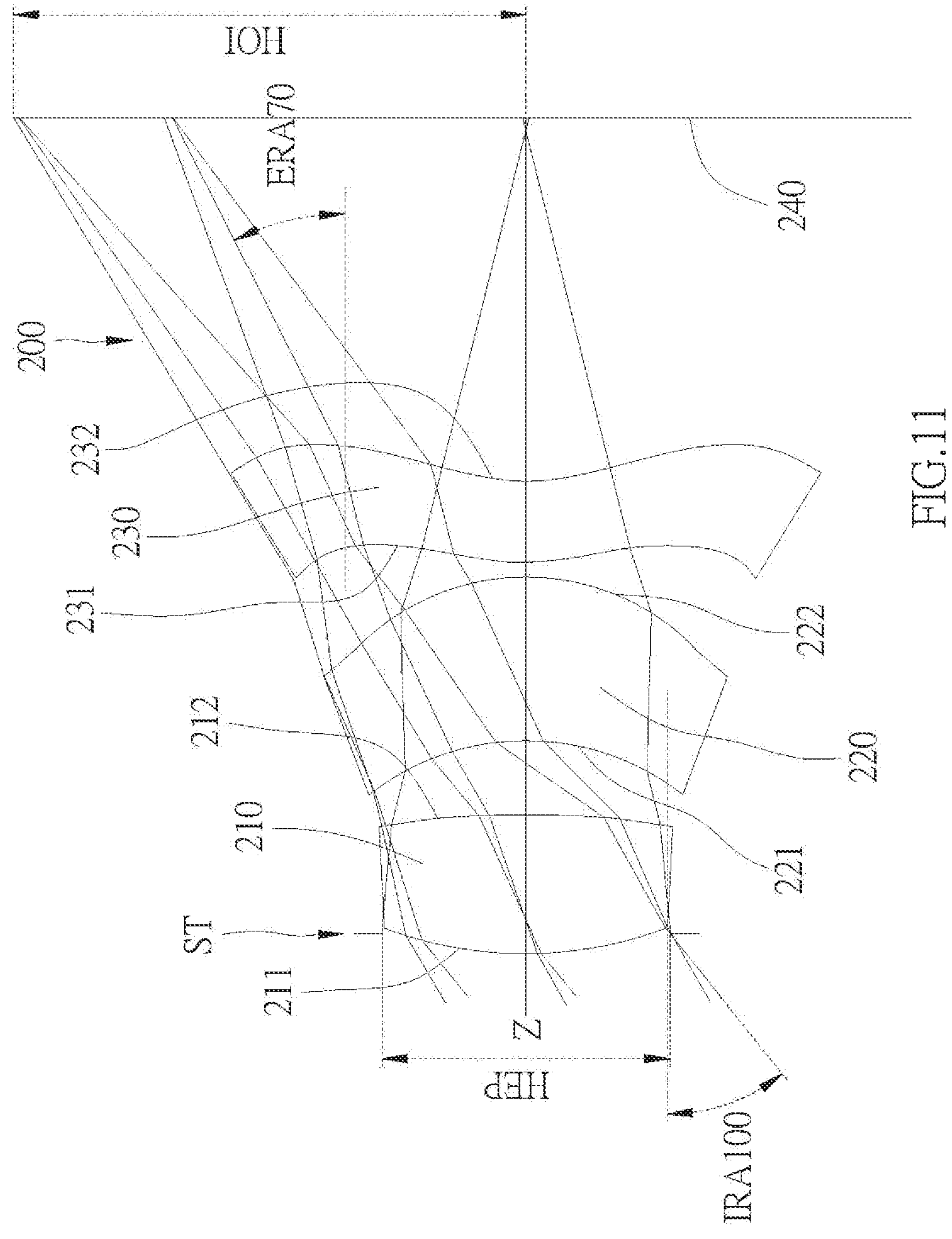
FIG. 11 is a schematic view of a lens arrangement of the optical image capturing system according to a second embodiment of the present invention.
Figure 12:
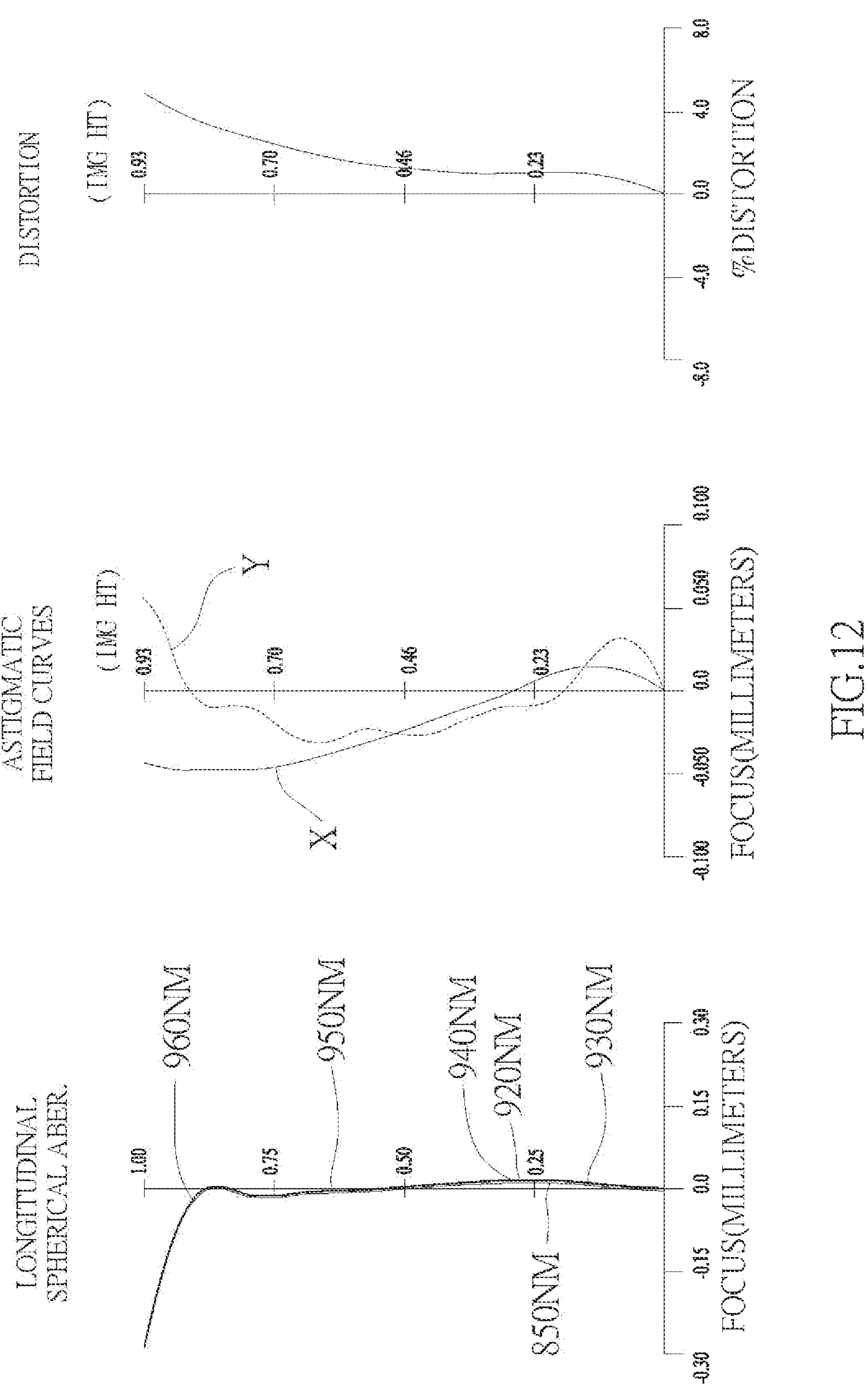
FIG. 12 shows curve diagrams of a longitudinal spherical aberration, an astigmatic field, and an optical distortion of the optical image capturing system in the order from left to right according to the second embodiment of the present invention.
Figure 13:
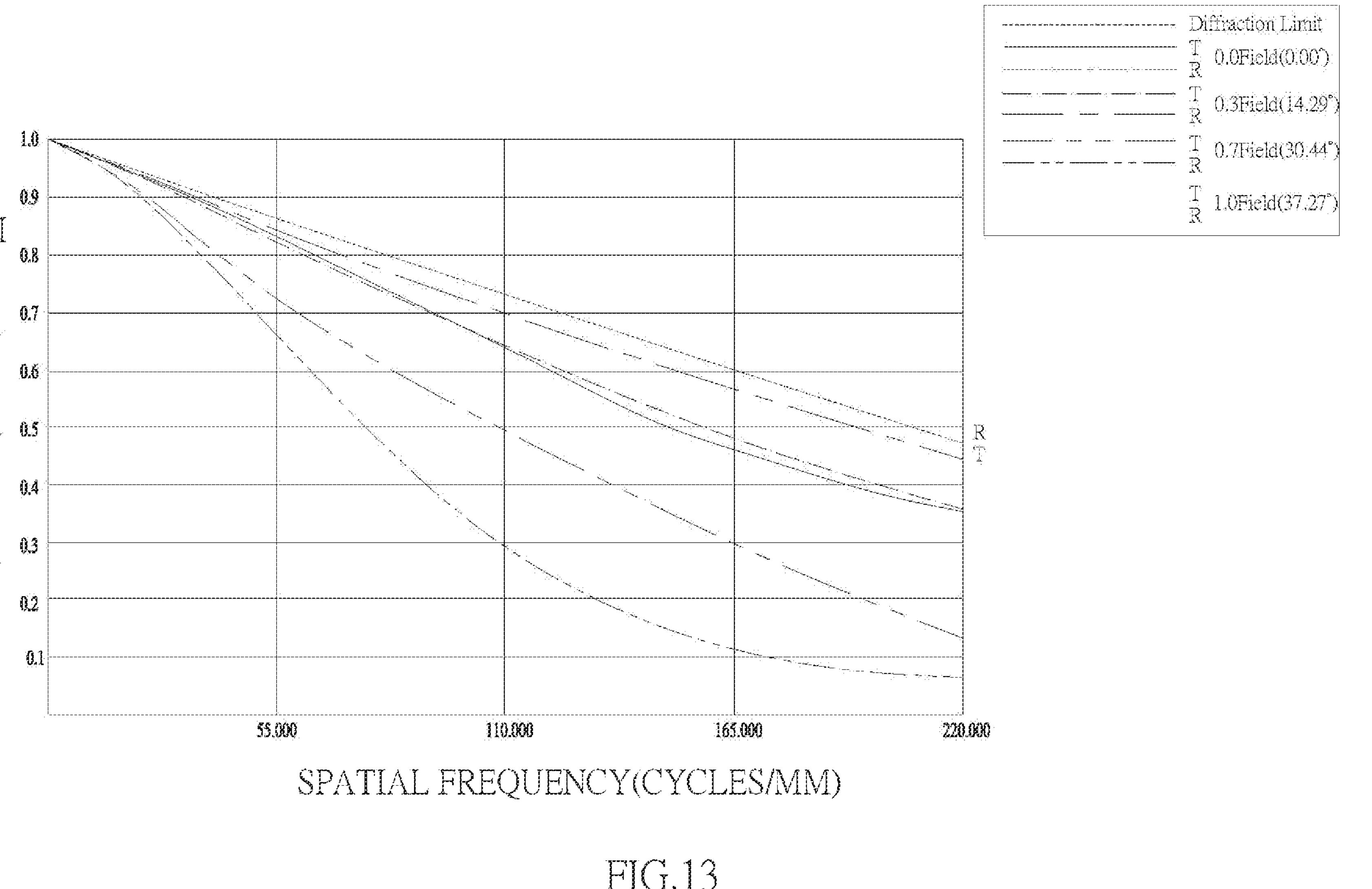
FIG. 13 shows a feature map of modulation transformation of the optical image capturing system according to the second embodiment of the present invention in infrared spectrum.

An optical image capturing system 200 according to a second embodiment of the present invention is illustrated in FIG. 11 to FIG. 13. FIG. 11 is a schematic view of a lens arrangement of the optical image capturing system 200 according to the second embodiment of the present invention. FIG. 12 shows curve diagrams of a longitudinal spherical aberration, an astigmatic field, and an optical distortion of the optical image capturing system 200 in an order from left to right according to the second embodiment of the present invention. FIG. 13 shows a feature map of modulation transformation of the optical image capturing system 200 according to the second embodiment of the present invention in infrared spectrum. Referring to FIG. 11, the optical image capturing system 200 according to the second embodiment of the present invention includes, along an optical axis Z in an order from an object side to an image side, an aperture ST, a first lens 210, a second lens 220, a third lens 230, and an image plane 240.

The first lens 210 is a double convex lens with positive refractive power, wherein an object-side surface 211, which faces the object side, of the first lens 210 and an image-side surface 212, which faces the image side, of the first lens 210 are both convex surfaces. At least one of the object-side surface 211 of the first lens 210 and the image-side surface 212 of the first lens 210 is aspheric. In the second embodiment, the object-side surface 211 of the first lens 210 and the image-side surface 212 of the first lens 210 are both aspheric. The first lens 210 is a filter lens made of plastic and includes at least one visible light absorbing ingredient, wherein the at least one visible light absorbing ingredient could be an azo dye or a porphyrin dye. Through an addition of the at least one visible light absorbing ingredient to the first lens 210, the first lens 210 could be effectively changed to absorb a particular wavelength, so that the first lens 210 correspondingly absorbs a visible light with a wavelength range from 400 nm to 700 nm, and a light with a wavelength range greater than 800 nm could correspondingly pass through the first lens 210, thereby maintaining a high transmittance of an infrared.

The second lens 220 is a concave-convex lens with negative refractive power, wherein an object-side surface 221, which faces the object side, of the second lens 220 is a concave surface and an image-side surface 222, which faces the image side, of the second lens 220 is a convex surface. At least one of the object-side surface 221 of the second lens 220 and the image-side surface 222 of the second lens 220 is aspheric. In the second embodiment, the object-side surface 221 of the second lens 220 and the image-side surface 222 of the second lens 220 are both aspheric. The second lens 220 is a filter lens made of plastic and includes the at least one visible light absorbing ingredient, so that the second lens 220 could correspondingly absorb the visible light with the wavelength range from 400 nm to 700 nm and could allow the light with the wavelength range greater than 800 nm to pass through the second lens 220 correspondingly.

The third lens 230 is a convex-concave lens with positive refractive power, wherein an object-side surface 231, which faces the object side, of the third lens 230 is a convex surface and an image-side surface 232, which faces the image side, of the third lens 230 is a concave surface. At least one of the object-side surface 231 of the third lens 230 and the image-side surface 232 of the third lens 230 is aspheric. In the second embodiment, the object-side surface 231 of the third lens 230 and the image-side surface 232 of the third lens 230 are both aspheric. The third lens 230 is a filter lens made of plastic and includes the at least one visible light absorbing ingredient, so that the third lens 230 could correspondingly absorb the visible light with the wavelength range from 400 nm to 700 nm and could allow the light with the wavelength range greater than 800 nm to pass through the third lens 230 correspondingly.

An equation of aspheric surfaces is:

$$z = ch^2/\left[1+\left[1-(k+1)c^2h^2\right]^{0.5}\right] + A4h^4 + A6h^6 + A8h^8 + \quad (1)$$

-continued $$A10h^{10}+A12h^{12}+A14h^{14}+A16h^{16}+A18h^{18}+A20h^{20}+\ldots$$

where z is a position value along the optical axis Z at a height h with a surface vertex as a reference point; k is a conic constant; c is a reciprocal of a radius of curvature, and A4, A6, A8, A10, A12, A14, A16, A18, and A20 are high-order aspheric coefficients.

In the second embodiment, the first lens 210, the second lens 220, and the third lens 230 respectively satisfy: $|\theta 1|\leq 62°$, $|\theta 2|\leq 52°$, and $|\theta 3|\leq 42°$, wherein a definition of $|\theta 1|$, a definition of $|\theta 2|$, and a definition of $|\theta 3|$ are the same as the definition of $|\theta 1|$, the definition of $|\theta 2|$, and the definition of $|\theta 3|$ according to the first embodiment of the present invention and are not repeated here.

Additionally, the first lens 210, the second lens 220, and the third lens 230 respectively satisfy: TWL50−TWL40≤30 nm. In an embodiment, the first lens 210, the second lens 220, and the third lens 230 respectively satisfy TWL50−TWL40≤20 nm. In another embodiment, the first lens 210, the second lens 220, and the third lens 230 respectively satisfy TWL50−TWL40≤10 nm. A definition of TWL50 and a definition of TWL40 are the same as a definition of TWL50 and a definition of TWL40 according to the first embodiment of the present invention and are not repeated here.

Additionally, the first lens 210, the second lens 220, and the third lens 230 respectively satisfy: |TA50−TA0|≤10%, wherein when the light with the wavelength range greater than 800 nm passes through the lens, TA50 is a transmittance of the light at an incident angle of 50 degrees and TA0 is a transmittance of the light at an incident angle of 0 degree.

Additionally, in the second embodiment, the first lens 210 satisfies: 28°≤IRA100≤90°, wherein HOI is a maximum height for image formation of the image plane 240 and IRA100 is an angle at which a lower light of the light enters the object-side surface 211 of the first lens 210 and corresponds to a position of 1.0*HOI on the image plane 240. The third lens 230 satisfies: 13°≤ERA70≤27°, wherein HOI is a maximum height for image formation of the image plane 240 and ERA70 is an angle at which a main light of the light exits the image-side surface 232 of the third lens 230 and corresponds to a position of 0.70*HOI on the image plane 240.

The first lens 210, the second lens 220, and the third lens 230 respectively satisfy: 0.1 mm≤CT≤1.0 mm, wherein CT is a central thickness of the lens.

Additionally, the first lens 210, the second lens 220, and the third lens 230 respectively have an anti-reflective coating, wherein the anti-reflective coating allows the light with the wavelength range greater than 800 nm to pass through the first lens 210, the second lens 220, and the third lens 230 correspondingly. A material of the anti-reflective coating includes magnesium fluoride ($MgF_2$), silicon dioxide ($SiO_2$), zinc sulfide (ZnS), titanium dioxide ($TiO_2$), aluminum oxide ($Al_2O_3$), and silicon nitride ($Si_3N_4$). The material of the anti-reflective coating is selected for interfering a light wave being reflected from a surface of the lens, thereby reducing a reflection and raising a light transmittance.

The parameters of the lenses of the second embodiment are listed in Table 6 and Table 7.

TABLE 6 f = 1.037 mm; f/HEP = 2.005; HAF = 40.68 deg; HOI = 0.93 mm

| Surface | Element | Radius of curvature (mm) | Thickness (mm) | Refractive index | Abbe number | Focal length (mm) | Maximum effective half diameter L |
|---|---|---|---|---|---|---|---|
| 0 | Object | ∞ | 600 | | | | |
| 1 | Aperture | ∞ | −0.032 | | | | |
| 2 | 1st lens | 0.75145285 | 0.234 | 1.5440 | 55.9604 | 1.2099 | 0.259 |
| 3 | | −4.84620455 | 0.127 | | | | 0.269 |
| 4 | 2nd lens | −0.48632932 | 0.272 | 1.5440 | 55.9604 | −12.01 | 0.287 |
| 5 | | −0.62939258 | 0.025 | | | | 0.369 |
| 6 | 3rd lens | 0.40972703 | 0.150 | 1.6613 | 20.3729 | 3.2191 | 0.421 |
| 7 | | 0.43214745 | 0.694 | | | | 0.540 |
| 8 | Image plane | ∞ | 0.000 | | | | |

TABLE 7

Aspheric coefficients of the second embodiment

| Surface | 2 | 3 | 4 | 5 | 6 | 7 |
|---|---|---|---|---|---|---|
| k | −1.088240E+01 | 2.722223E+02 | −1.427661E+01 | −2.770845E+00 | −2.123870E+01 | −3.196690E+00 |
| A4 | 1.544355E+00 | −2.916006E+00 | −1.346509E+01 | −2.978364E+01 | −1.669836E+00 | −7.128461E+00 |
| A6 | 1.111396E+02 | 2.126933E+02 | 1.800939E+02 | 1.056582E+03 | −1.104054E+02 | 5.956791E+01 |
| A8 | −8.657218E+03 | −1.572666E+04 | 4.306189E+02 | −2.719373E+04 | 4.648233E+03 | −3.968012E+02 |
| A10 | 2.664285E+05 | 6.880928E+05 | −1.981507E+05 | 4.884297E+05 | −1.069069E+05 | 1.650206E+03 |
| A12 | −2.113056E+06 | −1.922589E+07 | 7.675816E+06 | −6.013333E+06 | 1.498021E+06 | −2.141208E+03 |
| A14 | −9.332098E+07 | 3.426172E+08 | −1.547818E+08 | 4.938007E+07 | −1.306840E+07 | −2.045229E+04 |
| A16 | 2.856171E+09 | −3.736413E+09 | 1.800148E+09 | −2.567866E+08 | 6.903518E+07 | 1.345699E+05 |
| A18 | −3.138850E+10 | 2.256512E+10 | −1.135845E+10 | 7.611092E+08 | −2.018127E+08 | −3.402561E+05 |
| A20 | 1.263957E+11 | −5.722554E+10 | 3.013419E+10 | −9.744764E+08 | 2.499173E+08 | 3.261618E+05 |

The detailed parameters of the second embodiment shown in FIG. 11 are listed in Table 6, wherein units for the radius of curvature, the thickness, a distance, the focal length, and the maximum effective half diameter are millimeters (mm). Surfaces 0-8 represent the surfaces of all elements in the system in sequence from the object side to the image side. Table 7 is the list of coefficients of the aspheric surfaces of the second embodiment, wherein k represents the conic constant in the equation of the aspheric surfaces, and A4-A20 represent the aspheric coefficients from the fourth order to the twentieth order of each aspheric surface.

According to the data as shown in Table 6, data of intersecting angles between the optical axis Z and normal line vectors of the object sides of the lenses including the first lens 210, the second lens 220, and the third lens 230 respectively located at control points of 0.50*L, 0.70*L, and 0.95*L and data of intersecting angles between the optical axis Z and normal line vectors of the image sides of the lenses including the first lens 210, the second lens 220, and the third lens 230 respectively located at control points of 0.50*L, 0.70*L, and 0.95*L are further obtained as shown in Table 8; an angle at which the lower light of the light enters the object-side surface 211 of the first lens 210 and corresponds to the position of 1.0*HOI on the image plane 240 and the angles at which the main light of the light exits the image-side surface 232 of the third lens 230 and corresponds to the position of 0.70*HOI on the image plane 240 are obtained as shown in Table 9.

Figure 14:
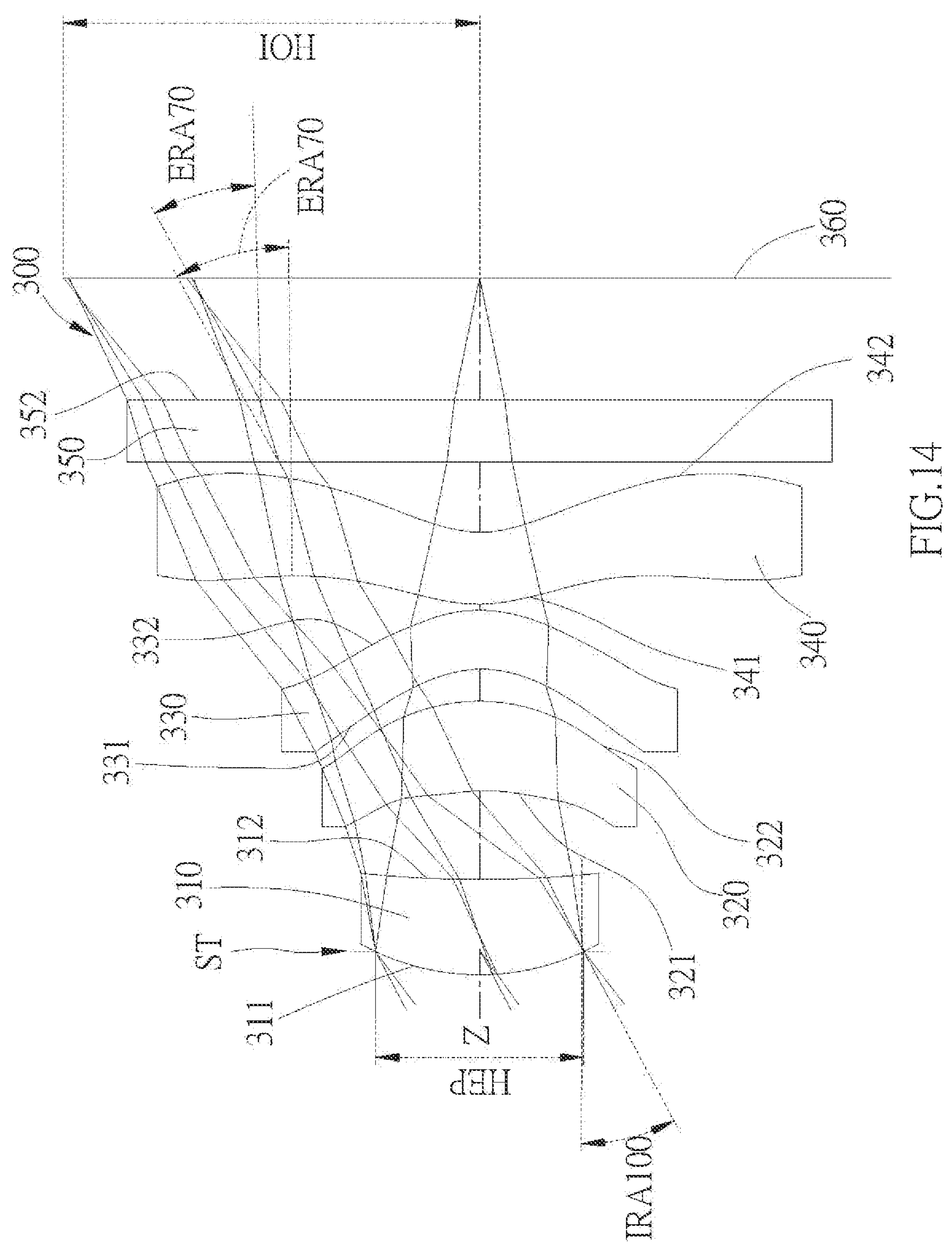
FIG. 14 is a schematic view of a lens arrangement of the optical image capturing system according to a third embodiment of the present invention.
Figure 15:
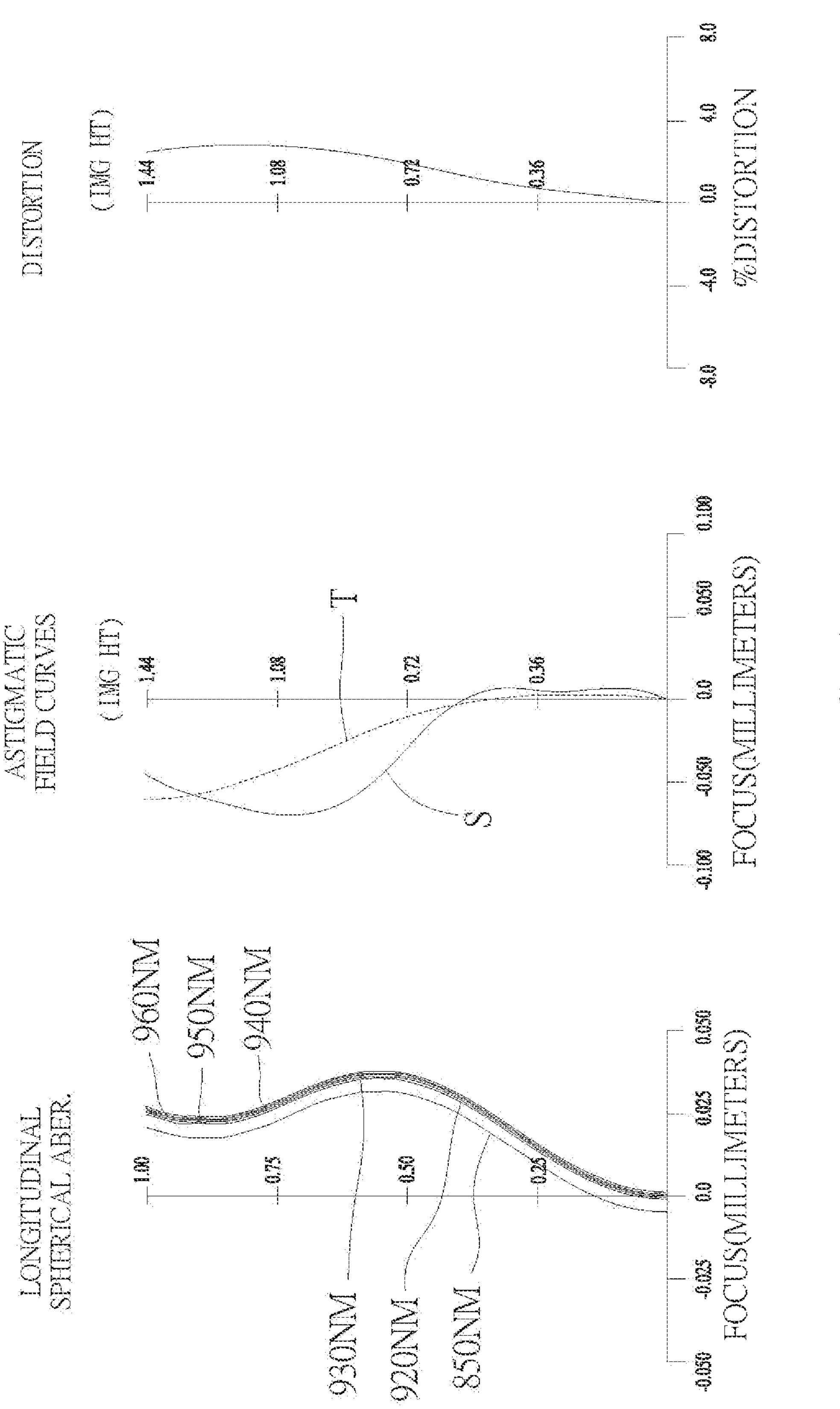
FIG. 15 shows curve diagrams of a longitudinal spherical aberration, an astigmatic field, and an optical distortion of the optical image capturing system in the order from left to right according to the third embodiment of the present invention.
Figure 16:
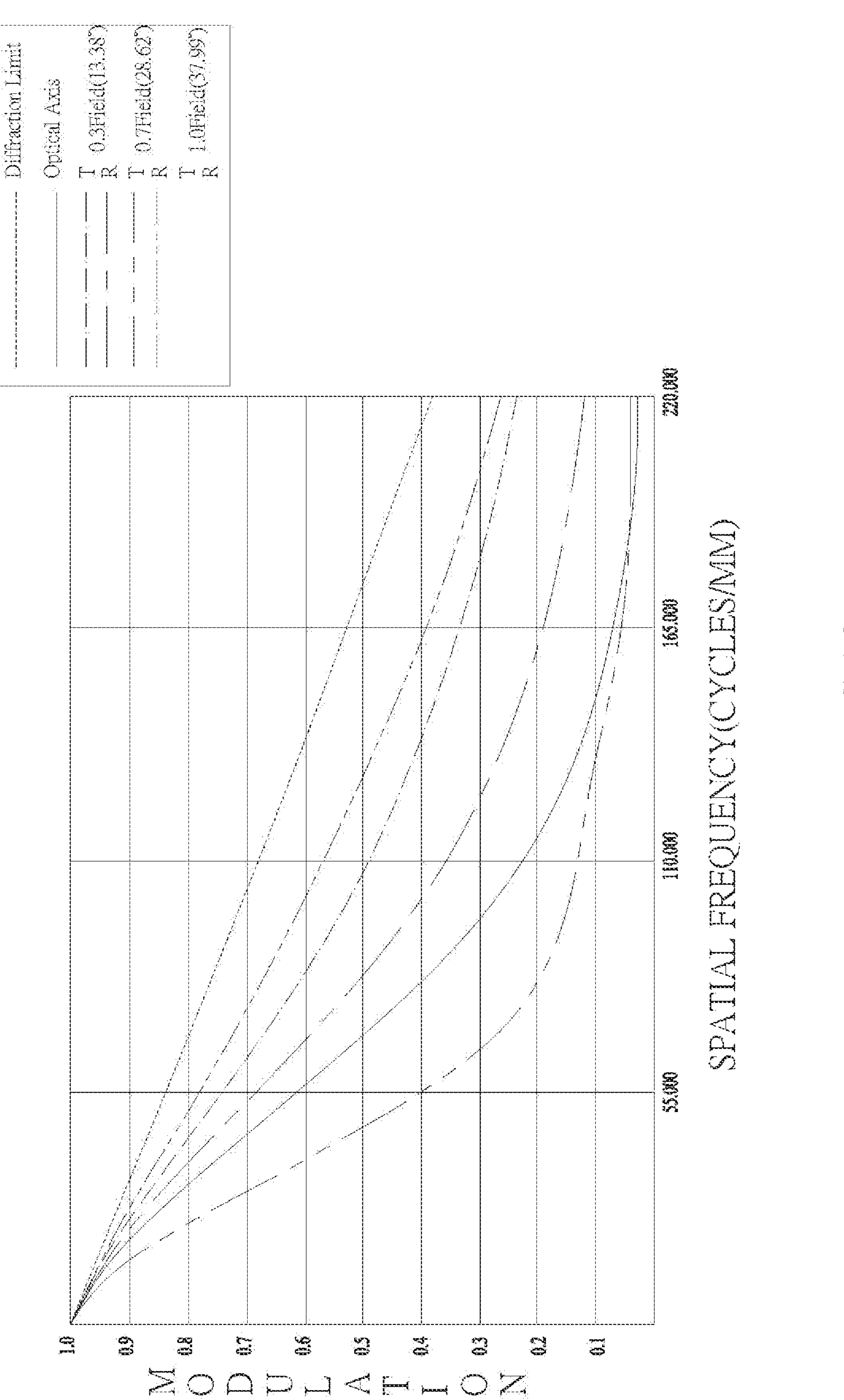
FIG. 16 shows a feature map of modulation transformation of the optical image capturing system according to the third embodiment of the present invention in infrared spectrum.

FIG. 15 shows curve diagrams of a longitudinal spherical aberration, an astigmatic field, and an optical distortion of the optical image capturing system 300 in an order from left to right according to the third embodiment of the present invention. FIG. 16 shows a feature map of modulation transformation of the optical image capturing system 300 according to the third embodiment of the present invention in infrared spectrum. Referring to FIG. 14, the optical image capturing system 300 according to the third embodiment of the present invention includes, along an optical axis Z in an order from an object side to an image side, an aperture ST, a first lens 310, a second lens 320, a third lens 330, a fourth lens 340, an optical filter 350, and an image plane 360.

The first lens 310 is a convex-concave lens with positive refractive power, wherein an object-side surface 311, which faces the object side, of the first lens 310 is a convex surface and an image-side surface 312, which faces the image side, of the first lens 310 are a concave surface. At least one of the object-side surface 311 of the first lens 310 and the image-side surface 312 of the first lens 310 is aspheric. In the third embodiment, the object-side surface 311 of the first lens 310 and the image-side surface 312 of the first lens 310 are both aspheric. The first lens 310 is made of plastic and does not include at least one visible light absorbing ingredient, which represents that the first lens 310 does not absorb a visible light, so that the first lens 310 allows the visible light to pass through the first lens 310 correspondingly.

TABLE 8

The parameters of θ1, θ2, and θ3 of the object-side surfaces of the lenses including the first lens 210, the second lens 220, and the third lens 230 and the parameters of θ1, θ2, and θ3 of the image-side surfaces of the lenses including the first lens 210, the second lens 220, and the third lens 230

| | 1st lens | | 2nd lens | | 3rd lens | |
|---|---|---|---|---|---|---|
| Surface | 2 | 3 | 4 | 5 | 6 | 7 |
| Maximum effective half diameter (mm) | 0.259 | 0.269 | 0.287 | 0.369 | 0.421 | 0.540 |
| L length % | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface |
| 0.50*L(θ3) | 8.619° | 1.790° | 11.365° | 15.248° | 11.517° | 24.714° |
| 0.70*L(θ2) | 10.883° | 2.904° | 12.869° | 19.733° | 11.954° | 28.336° |
| 0.95*L(θ1) | 12.852° | 6.154° | 13.821° | 23.923° | 12.139° | 30.937° |

TABLE 9

IRA100 of the first lens 210 and ERA70 of the third lens 230

| Item | Parameter | |
|---|---|---|
| HOI | 0.930 mm | |
| IRA100 | 40.680° | Object-side surface of the first lens |
| ERA70 | 22.870° | Image-side surface of the third lens |

Third Embodiment

An optical image capturing system 300 according to a third embodiment of the present invention is illustrated in FIG. 14 to FIG. 16. FIG. 14 is a schematic view of a lens arrangement of the optical image capturing system 300 according to the third embodiment of the present invention.

The second lens 320 is a concave-convex lens with positive refractive power, wherein an object-side surface 321, which faces the object side, of the second lens 320 is a concave surface and an image-side surface 322, which faces the image side, of the second lens 320 is a convex surface. At least one of the object-side surface 321 of the second lens 320 and the image-side surface 322 of the second lens 320 is aspheric. In the third embodiment, the object-side surface 321 of the second lens 320 and the image-side surface 322 of the second lens 320 are both aspheric. The second lens 320 is a filter lens made of plastic and includes the at least one visible light absorbing ingredient, so that the second lens 320 could correspondingly absorb the visible light with a wavelength range from 400 nm to 700 nm and could allow a light with a wavelength range greater than 800 nm to pass through the second lens 320 correspondingly.

The third lens 330 is a concave-convex lens with positive refractive power, wherein an object-side surface 331, which faces the object side, of the third lens 330 is a concave surface and an image-side surface 332, which faces the image side, of the third lens 330 is a convex surface. At least one of the object-side surface 331 of the third lens 330 and the image-side surface 332 of the third lens 330 is aspheric. In the third embodiment, the object-side surface 331 of the third lens 330 and the image-side surface 332 of the third lens 330 are both aspheric. The third lens 330 is made of plastic and does not include the at least one visible light absorbing ingredient.

The fourth lens 340 is a convex-concave lens with negative refractive power, wherein an object-side surface 341, which faces the object side, of the fourth lens 340 is a convex surface and an image-side surface 342, which faces the image side, of the fourth lens 340 is a concave surface. At least one of the object-side surface 341 of the fourth lens 340 and the image-side surface 342 of the fourth lens 340 is aspheric. In the third embodiment, the object-side surface 341 of the fourth lens 340 and the image-side surface 342 of the fourth lens 340 are both aspheric. The fourth lens 340 is made of plastic and does not include the at least one visible light absorbing ingredient.

An equation of aspheric surfaces is:

$$z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots \quad (1)$$

where z is a position value along the optical axis Z at a height h with a surface vertex as a reference point; k is a conic constant; c is a reciprocal of a radius of curvature, and A4, A6, A8, A10, A12, A14, A16, A18, and A20 are high-order aspheric coefficients.

In the third embodiment, the second lens 320 satisfies: $|\theta1|\leq62°$, $|\theta2|\leq52°$, $|\theta3|\leq42°$, wherein a definition of $|\theta1|$, a definition of $|\theta2|$, and a definition of $|\theta3|$ are respectively the same as the definition of $|\theta1|$, the definition of $|\theta2|$, and the definition of |θ3 according to the first embodiment of the present invention and are not repeated here.

In addition, the second lens 320 satisfies: TWL50–TWL40≤30 nm. In an embodiment, the second lens 320 satisfies TWL50–TWL40≤20 nm. In another embodiment, the second lens 320 satisfies TWL50–TWL40≤10 nm. A definition of TWL50 and a definition of TWL40 are the same as the definition of TWL50 and the definition of TWL40 according to the first embodiment of the present invention and are not repeated here.

Additionally, the second lens 320 satisfies: |TA50–TA0|≤10%, wherein when the light with a wavelength range greater than 800 nm passes through the lens, TA50 is a transmittance of the light at an incident angle of 50 degrees and TA0 is a transmittance of the light at an incident angle of 0 degree.

Additionally, in the third embodiment, the first lens 310 satisfies: 28°≤IRA100≤90°, wherein HOI is a maximum height for image formation of the image plane 360 and IRA100 is an angle at which a lower light of the light enters the object-side surface 311 of the first lens 310 and corresponds to a position of 1.0*HOI on the image plane 360. The fourth lens 340 satisfies: 13°≤ERA70≤27°, wherein HOI is a maximum height for image formation of the image plane 360 and ERA70 is an angle at which a main light of the light exits the image-side surface 342 of the fourth lens 340 and corresponds to a position of 0.70*HOI on the image plane 360.

The first lens 310, the second lens 320, the third lens 330, and the fourth lens 340 respectively satisfy: 0.1 mm≤CT≤1.0 mm, wherein CT is a central thickness of the lens.

Additionally, the second lens 320 has an anti-reflective coating, wherein the anti-reflective coating allows the light with the wavelength range greater than 800 nm to pass through the second lens 320 correspondingly. A material of the anti-reflective coating includes magnesium fluoride ($MgF_2$), silicon dioxide ($SiO_2$), zinc sulfide (ZnS), titanium dioxide ($TiO_2$), aluminum oxide ($Al_2O_3$), and silicon nitride ($Si_3N_4$). The material of the anti-reflective coating is selected for interfering a light wave being reflected from a surface of the lens, thereby reducing a reflection and raising a light transmittance.

The optical filter 350 is adjacent to the fourth lens 340. In an embodiment, the optical filter 350 has the at least one visible light absorbing ingredient, so that the optical filter 350 correspondingly absorbs the visible light with the wavelength range from 400 nm to 700 nm likewise and allows the light with the wavelength range greater than 800 nm to pass through the optical filter 350 correspondingly.

In the third embodiment, the second lens 320 and/or the optical filter 350 respectively have/has a light filtering coating, wherein the light filtering coating correspondingly absorbs a light with a wavelength range greater than 900 nm.

The optical filter 350 satisfies: |TA50–TA0|≤10%, wherein when the light with the wavelength range greater than 800 nm passes through the optical filter 350, TA50 is a transmittance of the light at the incident angle of 50 degrees and TA0 is a transmittance of the light at the incident angle of 0 degree.

The optical filter 350 satisfies: 13°≤ERA70≤27°, wherein HOI is a maximum height for image formation of the image plane 360 and ERA70 is an angle at which the main light of the light exits an image-side surface 352, which faces the image side, of the optical filter 350 and corresponds to a position of 0.70*HOI on the image plane 360.

Additionally, the optical filter 350 satisfies: 0.1 mm≤CT≤1.0 mm, wherein CT is a central thickness of the optical filter 350.

In an embodiment, the optical filter 350 has the anti-reflective coating, wherein the anti-reflective coating allows the light with the wavelength range greater than 800 nm to pass through the optical filter 350 correspondingly.

The parameters of the lenses of the third embodiment are listed in Table 10 and Table 11.

TABLE 10

| f = 1.7459 mm; f/HEP = 2.4; HAF = 40.09 deg; HOI = 1.438 mm | | | | | | | | |
|---|---|---|---|---|---|---|---|---|
| Surface | Element | Radius of curvature (mm) | Thickness (mm) | Refractive index | Abbe number | Focal length (mm) | Maximum effective half diameter L |
| 0 | Object | ∞ | 600 | | | | |
| 1 | Aperture | ∞ | −0.080 | | | | |
| 2 | 1st lens | 0.85721249 | 0.323 | 1.5346 | 56.0492 | 2.001 | 0.365 |
| 3 | | 3.69910610 | 0.294 | | | | 0.414 |
| 4 | 2nd lens | −1.51243823 | 0.300 | 1.5440 | 55.9604 | 2.1509 | 0.466 |
| 5 | | −0.70718613 | 0.112 | | | | 0.549 |
| 6 | 3rd lens | −0.36839036 | 0.196 | 1.6355 | 23.8900 | −13.12 | 0.574 |
| 7 | | −0.46538088 | 0.022 | | | | 0.690 |
| 8 | 4th lens | 0.62480935 | 0.239 | 1.5346 | 56.0492 | −4.626 | 0.990 |
| 9 | | 0.43237110 | 0.235 | | | | 1.124 |
| 10 | Optical filter | ∞ | 0.210 | 1.5168 | 64.1600 | | |
| 11 | | ∞ | 0.406 | | | | |
| 12 | Image plane | ∞ | 0.000 | | | | |

TABLE 11

| Aspheric coefficients of the third embodiment | | | | | | |
|---|---|---|---|---|---|---|
| Surface | 2 | 3 | 4 | 5 | 6 | 7 |
| k | −1.373037E−01 | 3.273210E+01 | 4.306858E+00 | −2.967085E+00 | −4.596229E+00 | −3.447903E+00 |
| A4 | −1.794194E−01 | −1.401749E−01 | −9.155642E−01 | −7.291824E−01 | −2.388551E+00 | −2.998345E−01 |
| A6 | 1.517697E+00 | 3.181925E−01 | 6.836492E+00 | −7.059419E+00 | 1.030547E+01 | 3.757369E−01 |
| A8 | 1.161586E+01 | −1.415416E+01 | −1.007413E+02 | 6.715672E+01 | −1.355787E+01 | 4.823671E+00 |
| A10 | −2.199593E+02 | 1.324685E+02 | 6.593257E+02 | −2.959545E+02 | −5.787644E+00 | −1.346244E+01 |
| A12 | 1.174618E+03 | −7.327301E+02 | −2.165615E+03 | 8.308777E+02 | −2.933531E+01 | 9.682357E+00 |
| A14 | −2.658779E+03 | 1.978687E+03 | 3.863619E+03 | −1.465799E+03 | 1.865409E+02 | 1.232695E+01 |
| A16 | 2.031885E+03 | −2.234526E+03 | −2.947611E+03 | 1.439195E+03 | −2.143538E+02 | −1.737875E+01 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| Surface | 8 | 9 |
|---|---|---|
| k | −8.838530E+00 | −5.086952E+00 |
| A4 | −4.835360E−01 | −3.998442E−01 |
| A6 | −3.085365E−01 | 2.586855E−01 |
| A8 | 1.939939E+00 | −2.166081E−02 |
| A10 | −2.492644E+00 | −1.413879E−01 |
| A12 | 1.598265E+00 | 1.336611E−01 |
| A14 | −5.334001E−01 | −5.631317E−02 |
| A16 | 7.412827E−02 | 1.009516E−02 |
| A18 | 0.000000E+00 | 0.000000E+00 |
| A20 | 0.000000E+00 | 0.000000E+00 |

The detailed parameters of the third embodiment shown in FIG. 14 are listed in Table 10, wherein units for the radius of curvature, the thickness, a distance, the focal length, and the maximum effective half diameter are millimeters (mm). Surfaces 0-12 represent the surfaces of all elements in the system, in sequence from the object side to the image side. Table 11 is the list of coefficients of the aspheric surfaces of the third embodiment, wherein k represents the conic constant in the equation of the aspheric surfaces, and A4-A20 represent the aspheric coefficients from the fourth order to the twentieth order of each aspheric surface.

According to the data as shown in Table 10, data of intersecting angles between the optical axis Z and normal line vectors of the object side of the second lens 320 respectively located at control points of 0.50*L, 0.70*L, and 0.95*L and data of intersecting angles between the optical axis Z and normal line vectors of the image side of the second lens 320 respectively located at control points of 0.50*L, 0.70*L, and 0.95*L are further obtained as shown in Table 12; the angle at which the lower light of the light enters the object-side surface 311 of the first lens 310 and corresponds to the position of 1.0*HOI on the image plane 360 and the angles at which the main light of the light exits the image-side surface 342 of the fourth lens 340 and corresponds to the position of 0.70*HOI on the image plane 360 are obtained as shown in Table 13.

TABLE 12

| The parameters of θ1, θ2, and θ3 of the object-side surface of the second lens 320 and the parameters of θ1, θ2, and θ3 of the image-side surface of the second lens 320 | | |
|---|---|---|
| | 2nd lens | |
| Surface | 4 | 5 |
| Maximum effective half diameter (mm) | 0.466 | 0.549 |

TABLE 12-continued

The parameters of θ1, θ2, and θ3 of the object-side surface of the second lens 320 and the parameters of θ1, θ2, and θ3 of the image-side surface of the second lens 320

| L length % | Intersecting angle θ between the normal line vector and the reference line Object-side surface | Intersecting angle θ between the normal line vector and the reference line Image-side surface |
|---|---|---|
| 0.50*L(θ3) | 11.613° | 23.352° |
| 0.70*L(θ2) | 20.041° | 32.495° |
| 0.95*L(θ1) | 31.153° | 31.010° |

TABLE 13

IRA100 of the first lens 310, ERA70 of the fourth lens 340, and ERA70 of the optical filter 350

| Item | Parameter | |
|---|---|---|
| HOI | 1.438 mm | |
| IRA100 | 40.090° | Object-side surface of the first lens |
| ERA70 | 30.080° | Image-side surface of the fourth lens |
| ERA70 | 30.080° | Optical filter |

Fourth Embodiment

Figure 17:
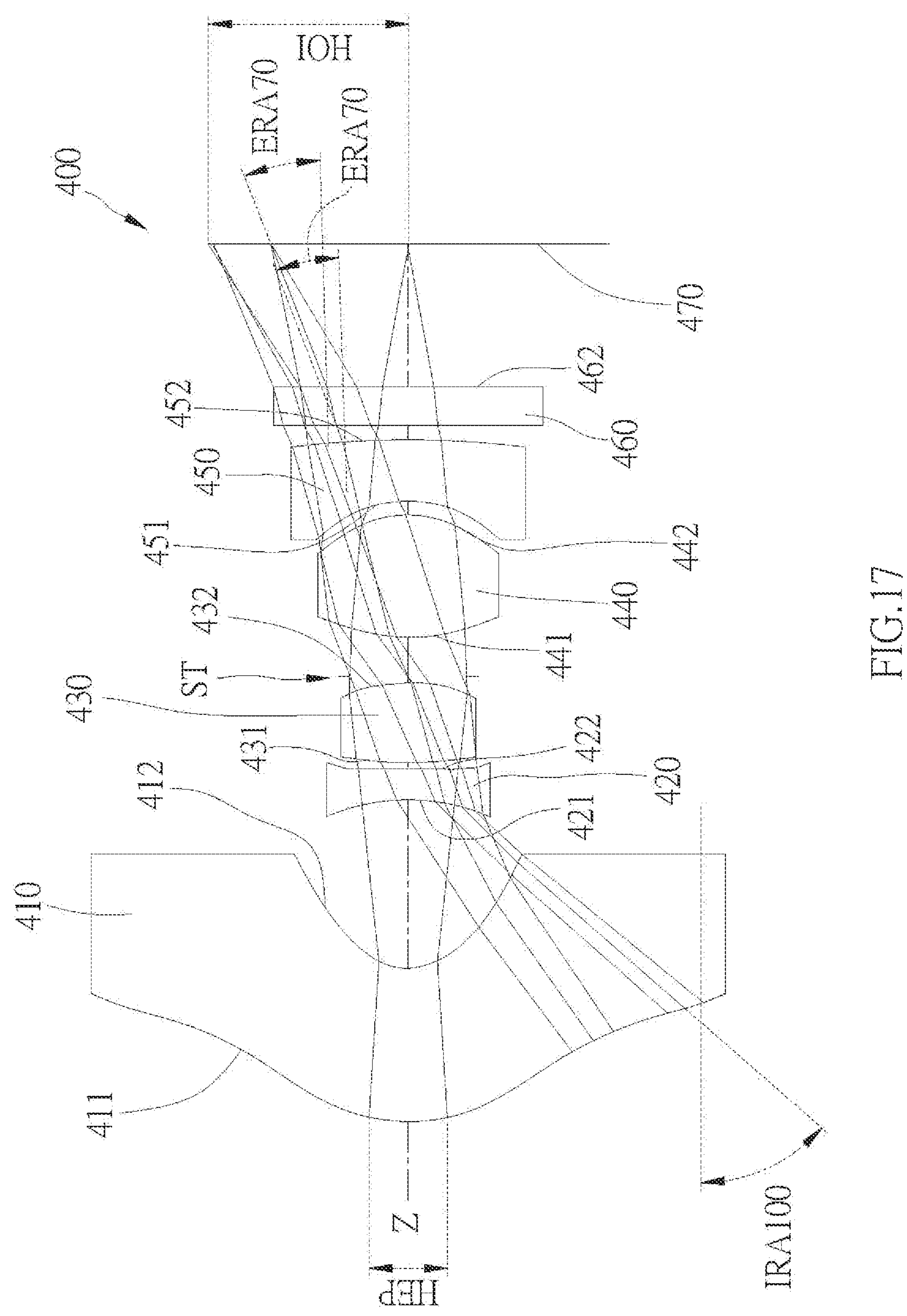
FIG. 17 is a schematic view of a lens arrangement of the optical image capturing system according to a fourth embodiment of the present invention.
Figure 18:
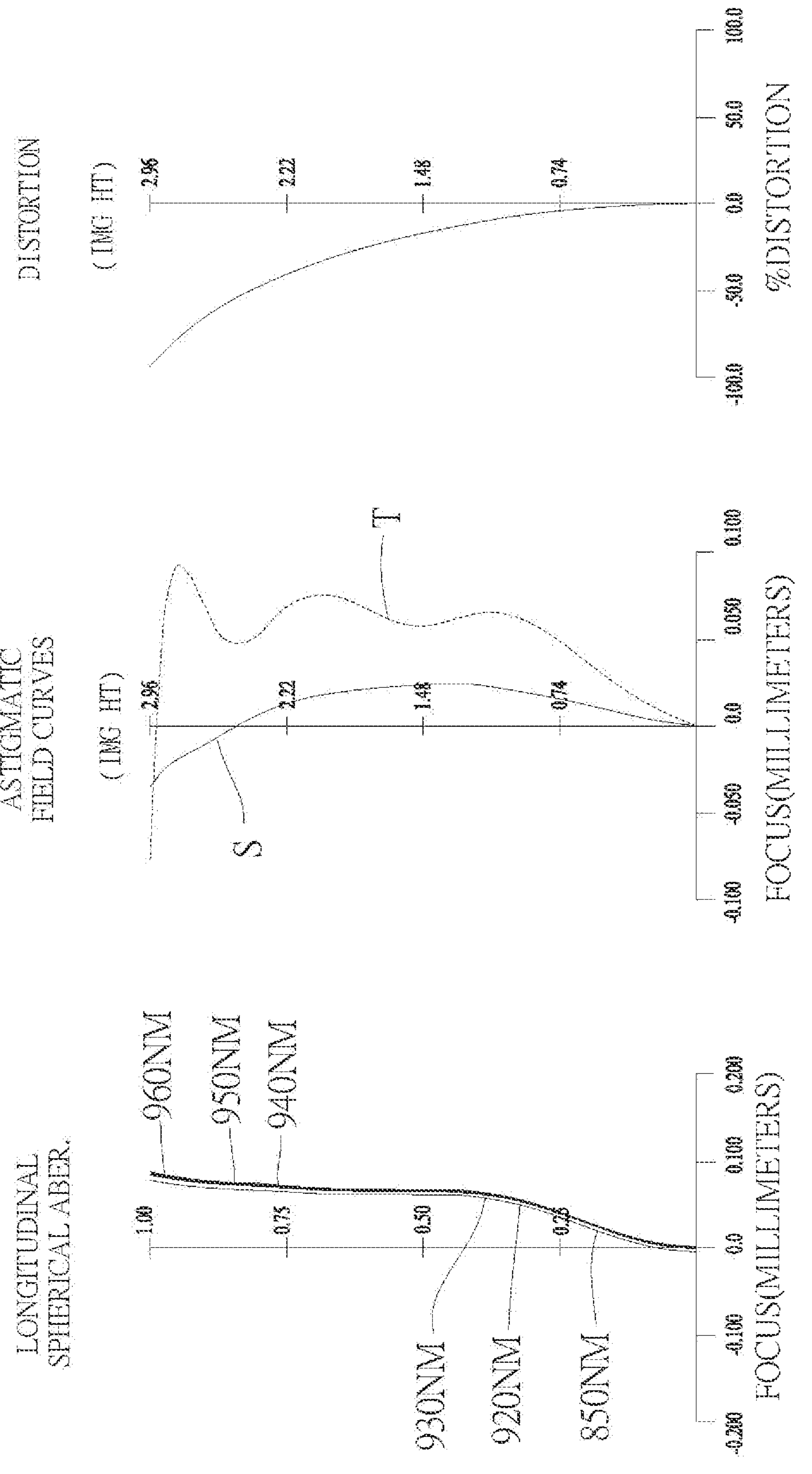
FIG. 18 shows curve diagrams of a longitudinal spherical aberration, an astigmatic field, and an optical distortion of the optical image capturing system in the order from left to right according to the fourth embodiment of the present invention.
Figure 19:
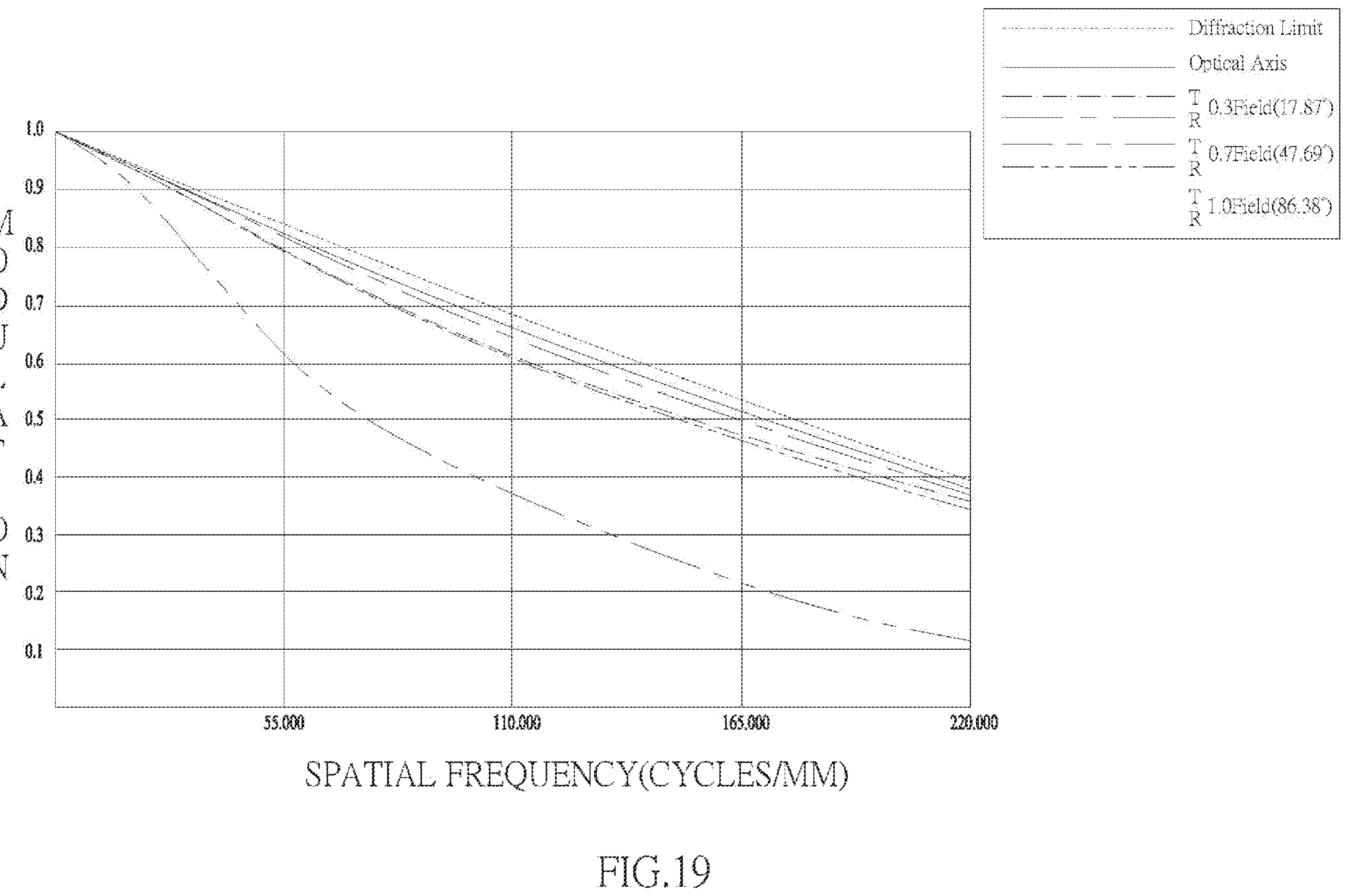
FIG. 19 shows a feature map of modulation transformation of the optical image capturing system according to the fourth embodiment of the present invention in infrared spectrum.

An optical image capturing system 400 according to a fourth embodiment of the present invention is illustrated in FIG. 17 to FIG. 19. FIG. 17 is a schematic view of a lens arrangement of the optical image capturing system 400 according to the fourth embodiment of the present invention. FIG. 18 shows curve diagrams of a longitudinal spherical aberration, an astigmatic field, and an optical distortion of the optical image capturing system 400 in an order from left to right according to the fourth embodiment of the present invention. FIG. 19 shows a feature map of modulation transformation of the optical image capturing system 400 according to the fourth embodiment of the present invention in infrared spectrum. Referring to FIG. 17, the optical image capturing system 400 according to the fourth embodiment of the present invention includes, along an optical axis Z in an order from an object side to an image side, a first lens 410, a second lens 420, a third lens 430, an aperture ST, a fourth lens 440, a fifth lens 450, an optical filter 460, and an image plane 470.

The first lens 410 is a convex-concave lens with negative refractive power, wherein an object-side surface 411, which faces the object side, of the first lens 410 is a convex surface and an image-side surface 412, which faces the image side, of the first lens 410 is a concave surface. At least one of the object-side surface 411 of the first lens 410 and the image-side surface 412 of the first lens 410 is aspheric. In the fourth embodiment, the object-side surface 411 of the first lens 410 and the image-side surface 412 of the first lens 410 are both aspheric. The first lens 410 is a filter lens made of plastic and includes at least one visible light absorbing ingredient, so that the first lens 410 could correspondingly absorb a visible light with a wavelength range from 400 nm to 700 nm and could allow a light with a wavelength range greater than 800 nm to pass through the first lens 410 correspondingly.

The second lens 420 is a double concave lens with negative refractive power, wherein an object-side surface 421, which faces the object side, of the second lens 420 and an image-side surface 422, which faces the image side, of the second lens 420 are both concave surfaces. At least one of the object-side surface 421 of the second lens 420 and the image-side surface 422 of the second lens 420 is aspheric. In the fourth embodiment, the object-side surface 421 of the second lens 420 and the image-side surface 422 of the second lens 420 are both aspheric. The second lens 420 is a filter lens made of plastic and includes the at least one visible light absorbing ingredient, so that the second lens 420 could correspondingly absorb the visible light with the wavelength range from 400 nm to 700 nm and could allow the light with the wavelength range greater than 800 nm to pass through the second lens 420 correspondingly.

The third lens 430 is a double convex lens with positive refractive power, wherein an object-side surface 431, which faces the object side, of the third lens 430 and an image-side surface 432, which faces the image side, of the third lens 430 are both convex surfaces. At least one of the object-side surface 431 of the third lens 430 and the image-side surface 432 of the third lens 430 is aspheric. In the fourth embodiment, the object-side surface 431 of the third lens 430 and the image-side surface 432 of the third lens 430 are both aspheric. The third lens 430 is a filter lens made of plastic and includes the at least one visible light absorbing ingredient, so that the third lens 430 could correspondingly absorb the visible light with the wavelength range from 400 nm to 700 nm and could allow the light with the wavelength range greater than 800 nm to pass through the third lens 430 correspondingly.

The fourth lens 440 is a double convex lens with positive refractive power, wherein an object-side surface 441, which faces the object side, of the fourth lens 440 and an image-side surface 442, which faces the image side, of the fourth lens 440 are both convex surfaces. At least one of the object-side surface 441 of the fourth lens 440 and the image-side surface 442 of the fourth lens 340 is aspheric. In the fourth embodiment, the object-side surface 441 of the fourth lens 440 and the image-side surface 442 of the fourth lens 440 are both aspheric. The fourth lens 440 is a filter lens made of plastic and includes the at least one visible light absorbing ingredient, so that the fourth lens 440 could correspondingly absorb the visible light with the wavelength range from 400 nm to 700 nm and could allow the light with the wavelength range greater than 800 nm to pass through the fourth lens 440 correspondingly.

The fifth lens 450 is a concave-convex lens with positive refractive power, wherein an object-side surface 451, which faces the object side, of the fifth lens 450 is a concave surface and an image-side surface 452, which faces the image side, of the fifth lens 450 is a convex surface. At least one of the object-side surface 451 of the fifth lens 450 and the image-side surface 452 of the fifth lens 450 is aspheric. In the fourth embodiment, the object-side surface 451 of the fifth lens 450 and the image-side surface 452 of the fifth lens 450 are both aspheric. The fifth lens 450 is made of plastic and does not include the at least one visible light absorbing ingredient.

An equation of aspheric surfaces is:

$$z = ch^2/\left[1 + \left[1 - (k+1)c^2h^2\right]^{0.5}\right] + A4h^4 + A6h^6 + A8h^8 + A10h^{10} + A12h^{12} + A14h^{14} + A16h^{16} + A18h^{18} + A20h^{20} + \ldots \quad (1)$$

where z is a position value along the optical axis Z at a height h with a surface vertex as a reference point; k is a conic constant; c is a reciprocal of a radius of curvature, and A4, A6, A8, A10, A12, A14, A16, A18, and A20 are high-order aspheric coefficients.

In the fourth embodiment, the first lens 410, the second lens 420, the third lens 430, and the fourth lens 440 respectively satisfy: $|\theta 1| \leq 62°$, $|\theta 2| \leq 52°$, $|\theta 3| \leq 42°$, wherein a definition of $|\theta 1|$, a definition of $|\theta 2|$, and a definition of $|\theta 3|$ are respectively the same as the definition of $|\theta 1|$, the definition of $|\theta 2|$, and the definition of $|\theta 3|$ according to the first embodiment of the present invention and are not repeated here.

Additionally, the first lens 410, the second lens 420, the third lens 430, and the fourth lens 440 respectively satisfy: TWL50−TWL40≤30 nm. In an embodiment, the first lens 410, the second lens 420, the third lens 430, and the fourth lens 440 respectively satisfy TWL50−TWL40≤20 nm. In another embodiment, the first lens 410, the second lens 420, the third lens 430, and the fourth lens 440 respectively satisfy TWL50−TWL40≤10 nm. A definition of TWL50 and a definition of TWL40 are the same as the definition of TWL50 and the definition of TWL40 according to the first embodiment of the present invention and are not repeated here.

Additionally, the first lens 410, the second lens 420, the third lens 430, and the fourth lens 440 respectively satisfy: |TA50−TA0|≤10%, wherein when the light with a wavelength range greater than 800 nm passes through the lens, TA50 is a transmittance of the light at an incident angle of 50 degrees and TA0 is a transmittance of the light at an incident angle of 0 degree.

Additionally, in the fourth embodiment, the first lens 410 satisfies: 28°≤IRA100≤90°, wherein HOI is a maximum height for image formation of the image plane 470 and IRA100 is an angle at which a lower light of the light enters the object-side surface 411 of the first lens 410 and corresponds to a position of 1.0*HOI on the image plane 470. The fifth lens 450 satisfies: 13°≤ERA70≤27°, wherein HOI is a maximum height for image formation of the image plane 470 and ERA70 is an angle at which a main light of the light exits the image-side surface 452 of the fifth lens 450 and corresponds to a position of 0.70*HOI on the image plane 470.

The first lens 410, the second lens 420, the third lens 430, the fourth lens 440, and the fifth lens 450 respectively satisfy: 0.1 mm≤CT≤1.0 mm, wherein CT is a central thickness of the lens.

Additionally, the first lens 410, the second lens 420, the third lens 430, and the fourth lens 440 respectively have an anti-reflective coating, wherein the anti-reflective coating allows the light with the wavelength range greater than 800 nm to pass through the first lens 410, the second lens 420, the third lens 430, and the fourth lens 440 correspondingly. A material of the anti-reflective coating includes magnesium fluoride ($MgF_2$), silicon dioxide ($SiO_2$), zinc sulfide (ZnS), titanium dioxide ($TiO_2$), aluminum oxide ($Al_2O_3$), and silicon nitride ($Si_3N_4$). The material of the anti-reflective coating is selected for interfering a light wave being reflected from a surface of the lens, thereby reducing a reflection and raising a light transmittance.

The optical filter 460 is adjacent to the fifth lens 450. In an embodiment, the optical filter 460 has the at least one visible light absorbing ingredient, so that the optical filter 460 correspondingly absorbs the visible light with the wavelength range from 400 nm to 700 nm likewise and allows the light with the wavelength range greater than 800 nm to pass through the optical filter 460 correspondingly.

In the fourth embodiment, the first lens 410, the second lens 420, the third lens 430, and the fourth lens 440 respectively have a light filtering coating and/or the optical filter 460 has a light filtering coating, wherein the light filtering coating correspondingly absorbs a light with a wavelength range greater than 900 nm.

The optical filter 460 satisfies: |TA50−TA0|≤10%, wherein when the light with a wavelength range greater than 800 nm passes through the optical filter 460, TA50 is a transmittance of the light at the incident angle of 50 degrees and TA0 is a transmittance of the light at the incident angle of 0 degree.

The optical filter 460 satisfies: 13°≤ERA70≤27°, wherein HOI is a maximum height for image formation of the image plane 470 and ERA70 is an angle at which the main light of the light exits an image-side surface 462, which faces the image side, of the optical filter 460 and corresponds to a position of 0.70*HOI on the image plane 470.

Additionally, the optical filter 460 satisfies: 0.1 mm≤CT≤1.0 mm, wherein CT is a central thickness of the optical filter 460.

In an embodiment, the optical filter 460 has the anti-reflective coating, wherein the anti-reflective coating allows the light with the wavelength range greater than 800 nm to pass through the optical filter 460 correspondingly.

The parameters of the lenses of the fourth embodiment are listed in Table 14 and Table 15.

TABLE 14 f = 2.8589 mm; f/HEP = 2.4; HAF = 89.96 deg; HOI = 2.9663 mm

| Surface | Element | Radius of curvature (mm) | Thickness (mm) | Refractive index | Abbe number | Focal length (mm) | Maximum effective half diameter L |
|---|---|---|---|---|---|---|---|
| 0 | Object | ∞ | 600 | | | | |
| 1 | $1^{st}$ lens | 2.83810875 | 2.005 | 1.5440 | 55.9604 | −5.346 | 4.800 |
| 2 | | 1.07988593 | 2.194 | | | | 1.761 |
| 3 | $2^{nd}$ lens | −3.34317499 | 0.422 | 1.5440 | 55.9604 | −8.378 | 1.238 |
| 4 | | −12.99447837 | 0.072 | | | | 1.055 |
| 5 | $3^{rd}$ lens | 4.62118551 | 1.045 | 1.5440 | 55.9604 | 4.2464 | 1.025 |
| 6 | | −4.27672340 | 0.084 | | | | 0.977 |
| 7 | Aperture | ∞ | 0.508 | | | | |
| 8 | $4^{th}$ lens | 2.61906963 | 1.598 | 1.5440 | 55.9604 | 2.155 | 1.191 |
| 9 | | −1.67435855 | 0.183 | | | | 1.376 |
| 10 | $5^{th}$ lens | −1.92496193 | 0.799 | 1.6420 | 22.4561 | −3.283 | 1.384 |
| 11 | | −23.58611652 | 0.191 | | | | 1.773 |
| 12 | Optical filter | ∞ | 0.502 | 1.5168 | 64.1600 | | |

TABLE 14-continued

| f = 2.8589 mm; f/HEP = 2.4; HAF = 89.96 deg; HOI = 2.9663 mm | | | | | | | |
|---|---|---|---|---|---|---|---|
| Surface | Element | Radius of curvature (mm) | Thickness (mm) | Refractive index | Abbe number | Focal length (mm) | Maximum effective half diameter L |
| 13 | | ∞ | 13.939 | | | | |
| 14 | Image plane | ∞ | 0 | | | | |

TABLE 15

| Aspheric coefficients of the fourth embodiment | | | | | | |
|---|---|---|---|---|---|---|
| Surface | 1 | 2 | 3 | 4 | 5 | 6 |
| k | −1.004793E+00 | −7.576441E−01 | −8.969281E+00 | 0.000000E+00 | −6.635742E+00 | −1.886675E+01 |
| A4 | −1.415956E−03 | 2.652174E−03 | −3.860855E−03 | 3.358520E−02 | −3.255999E−02 | −8.779588E−02 |
| A6 | 1.264756E−04 | −3.260381E−03 | −4.891617E−03 | 1.308358E−02 | 8.273343E−05 | −8.729847E−02 |
| A8 | −3.291875E−04 | −7.523231E−03 | −1.435010E−03 | −1.411160E−02 | 1.743475E−03 | 3.627660E−01 |
| A10 | 5.897394E−05 | 3.033819E−03 | 9.050440E−04 | 9.481879E−03 | −5.875037E−03 | −6.984876E−01 |
| A12 | −4.970313E−06 | −3.933719E−04 | −7.555297E−05 | 0.000000E+00 | 5.747199E−04 | 7.756824E−01 |
| A14 | 2.379439E−07 | 3.611280E−23 | 3.612211E−23 | 0.000000E+00 | 3.612127E−23 | −5.022925E−01 |
| A16 | −6.632181E−09 | 4.247210E−25 | 4.247210E−25 | 0.000000E+00 | 4.247210E−25 | 1.745135E−01 |
| A18 | 1.004097E−10 | 0.000000E+00 | 0.000000E+00 | 0.000000E+00 | 0.000000E+00 | −2.500296E−02 |
| A20 | −6.389607E−13 | 0.000000E+00 | 0.000000E+00 | 0.000000E+00 | 0.000000E+00 | 0.000000E+00 |

| Surface | 8 | 9 | 10 | 11 |
|---|---|---|---|---|
| k | 3.265645E−01 | −1.291167E+00 | 1.937584E−01 | −2.073512E+01 |
| A4 | −6.244587E−02 | 3.828043E−02 | 4.414466E−02 | 4.801575E−03 |
| A6 | 7.054369E−02 | −2.444592E−02 | −1.710682E−02 | −2.444821E−02 |
| A8 | −1.364929E−01 | 6.793588E−03 | 7.125050E−03 | 3.388633E−02 |
| A10 | 1.825690E−01 | −9.864030E−04 | −6.796000E−04 | −2.643701E−02 |
| A12 | −1.554172E−01 | 1.214752E−05 | −4.221785E−05 | 1.264987E−02 |
| A14 | 7.984313E−02 | 1.035660E−14 | 3.611953E−23 | −3.655345E−03 |
| A16 | −2.248702E−02 | −9.697431E−16 | 4.247197E−25 | 5.849299E−04 |
| A18 | 2.660464E−03 | 0.000000E+00 | 0.000000E+00 | −4.111609E−05 |
| A20 | 0.000000E+00 | 0.000000E+00 | 0.000000E+00 | 3.241679E−07 |

The detailed parameters of the fourth embodiment shown in FIG. 17 are listed in Table 14, wherein units for the radius of curvature, the thickness, a distance, a focal length, and the maximum effective half diameter are millimeters (mm). Surfaces 0-14 represent the surfaces of all elements in the system in sequence from the object side to the image side. Table 15 is the list of coefficients of the aspheric surfaces of the fourth embodiment, wherein k represents the conic constant in the equation of the aspheric surfaces, and A4-A20 represent the aspheric coefficients from the fourth order to the twentieth order of each aspheric surface.

According to the data as shown in Table 14, data of intersecting angles between the optical axis Z and normal line vectors of the object sides of the lenses including the first lens 410, the second lens 420, the third lens 430, and the fourth lens 440 respectively located at control points of 0.50*L, 0.70*L, and 0.95*L and data of the intersecting angles between the optical axis Z and the normal line vectors of the image sides of the lenses including the first lens 410, the second lens 420, the third lens 430, and the fourth lens 440 respectively located at control points of 0.50*L, 0.70*L, and 0.95*L are further obtained as shown in Table 16; the angle at which the lower light of the light enters the object-side surface 411 of the first lens 410 and corresponds to the position of 1.0*HOI on the image plane 470 and the angles at which a main light of the light exits the image-side surface 452 of the fifth lens 450 and the optical filter 460 and corresponds to the position of 0.70*HOI on the image plane 470 are obtained as shown in Table 17.

TABLE 16

| The parameters of θ1, θ2, and θ3 of the object-side surfaces of the lenses including the first lens 410, the second lens 420, the third lens 430, and the fourth lens 440 and the parameters of θ1, θ2, and θ3 of the image-side surfaces of the lenses including the first lens 410, the second lens 420, the third lens 430, and the fourth lens 440 | | | | |
|---|---|---|---|---|
| | $1^{st}$ lens | | $2^{nd}$ lens | |
| Surface | 1 | 2 | 3 | 4 |
| Maximum effective half diameter (mm) | 4.800 | 1.761 | 1.238 | 1.055 |

TABLE 16-continued

The parameters of θ1, θ2, and θ3 of the object-side surfaces of the lenses including the first lens 410, the second lens 420, the third lens 430, and the fourth lens 440 and the parameters of θ1, θ2, and θ3 of the image-side surfaces of the lenses including the first lens 410, the second lens 420, the third lens 430, and the fourth lens 440

| L length % | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface |
|---|---|---|---|---|
| 0.50*L(θ3) | 24.226° | 42.119° | 10.986° | 2.841° |
| 0.70*L(θ2) | 14.881° | 52.021° | 15.407° | 3.979° |
| 0.95*L(θ1) | 24.742° | 61.211° | 22.819° | 5.404° |
| | $3^{rd}$ lens | | $4^{th}$ lens | |
| Surface | 5 | 6 | 8 | 9 |
| Maximum effective half diameter (mm) | 1.025 | 0.977 | 1.191 | 1.376 |
| L length % | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface |
| 0.50*L(θ3) | 5.540° | 13.400° | 13.035° | 22.502° |
| 0.70*L(θ2) | 4.071° | 23.706° | 15.510° | 22.502° |
| 0.95*L(θ1) | 12.390° | 41.312° | 17.299° | 39.676° |

TABLE 17

IRA100 of the first lens 410, ERA70 of the fifth lens 450, and ERA70 of the optical filter 460

| Item | Parameter | |
|---|---|---|
| HOI | 2.996 mm | |
| IRA100 | 89.960° | Object-side surface of the first lens |
| ERA70 | 24.360° | Image-side surface of the fifth lens |
| ERA70 | 24.360° | Optical filter |

Fifth Embodiment

Figure 20:
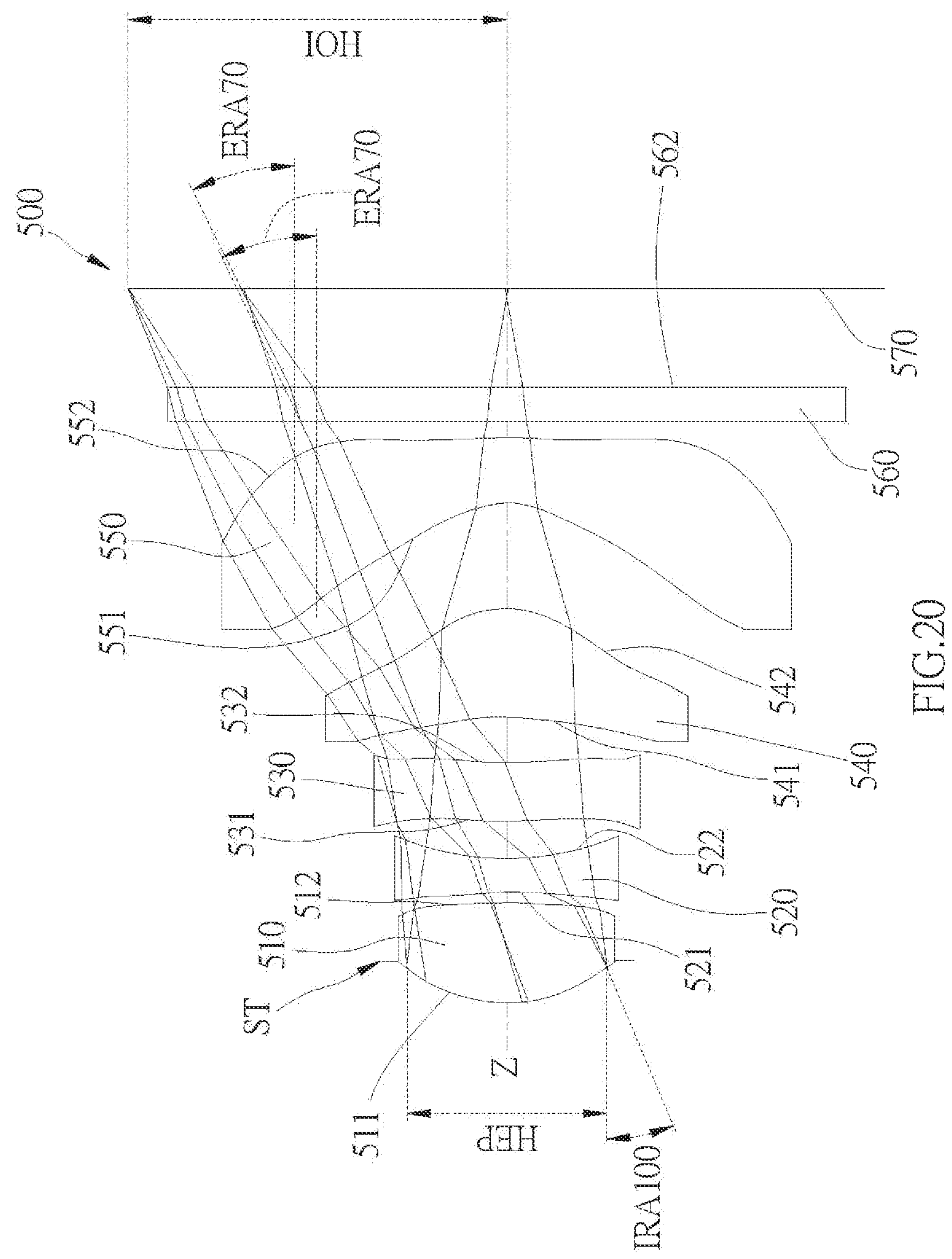
FIG. 20 is a schematic view of a lens arrangement of the optical image capturing system according to a fifth embodiment of the present invention.
Figure 21:
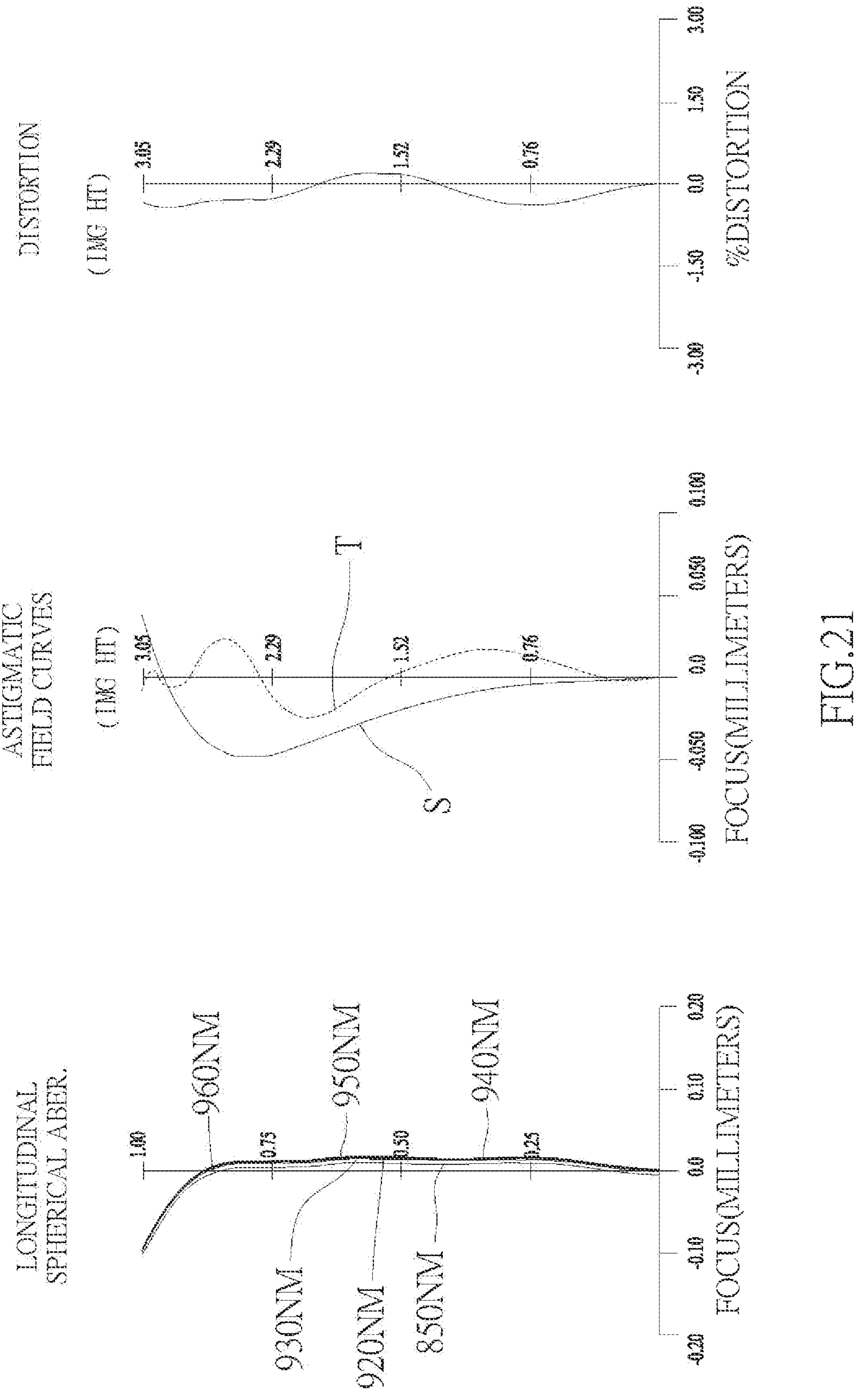
FIG. 21 shows curve diagrams of a longitudinal spherical aberration, an astigmatic field, and an optical distortion of the optical image capturing system in the order from left to right according to the fifth embodiment of the present invention.
Figure 22:
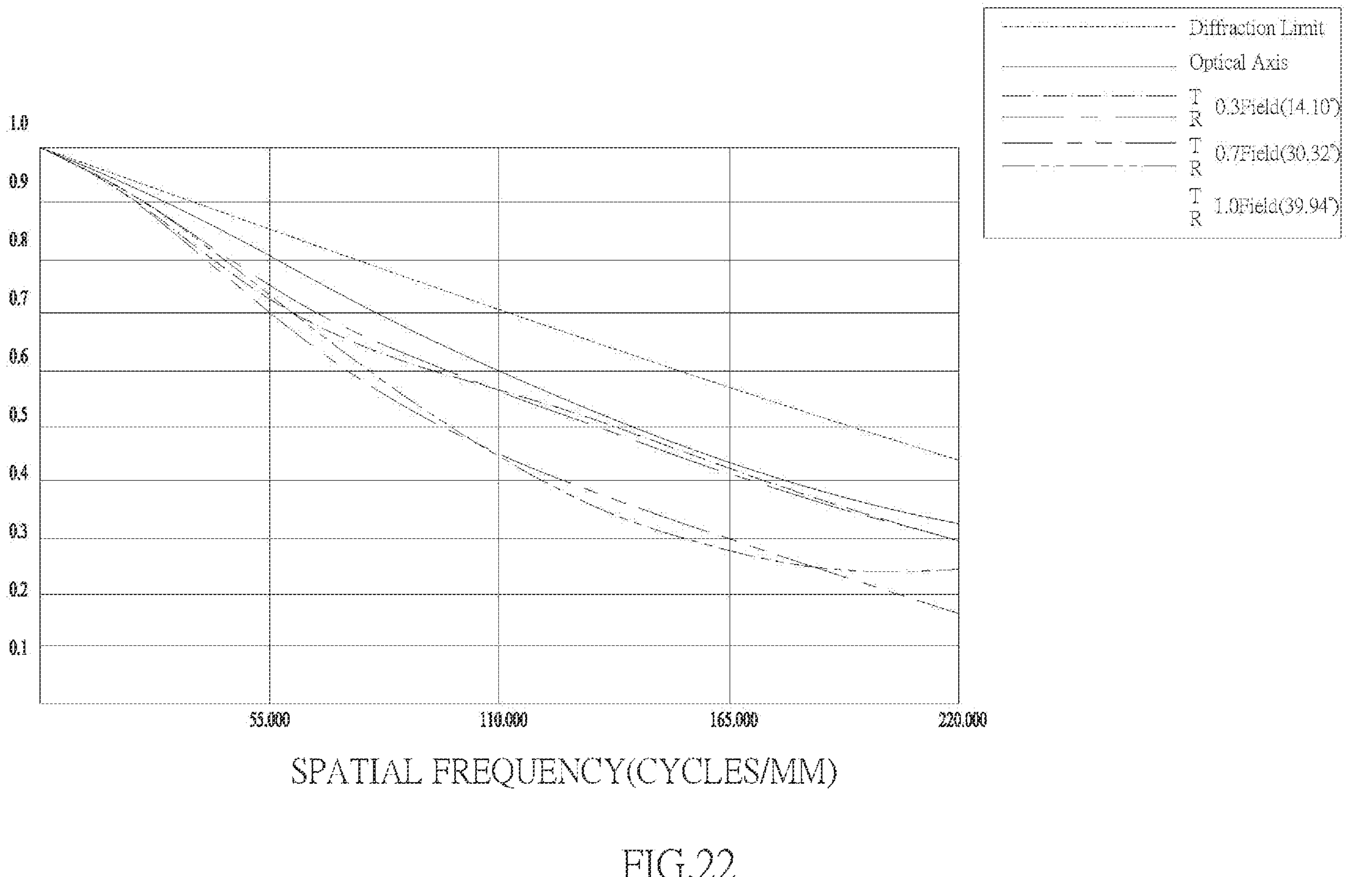
FIG. 22 shows a feature map of modulation transformation of the optical image capturing system according to the fifth embodiment of the present invention in infrared spectrum.

An optical image capturing system 500 according to a fifth embodiment of the present invention is illustrated in FIG. 20 to FIG. 22. FIG. 20 is a schematic view of a lens arrangement of the optical image capturing system 500 according to the fifth embodiment of the present invention. FIG. 21 shows curve diagrams of a longitudinal spherical aberration, an astigmatic field, and an optical distortion of the optical image capturing system 500 in an order from left to right according to the fifth embodiment of the present invention. FIG. 22 shows a feature map of modulation transformation of the optical image capturing system 500 according to the fifth embodiment of the present invention in infrared spectrum. Referring to FIG. 20, the optical image capturing system 500 according to the fifth embodiment of the present invention includes, along an optical axis Z in an order from an object side to an image side, an aperture ST, a first lens 510, a second lens 520, a third lens 530, a fourth lens 540, a fifth lens 550, an optical filter 560, and an image plane 570.

The first lens 510 is a double convex lens with positive refractive power, wherein an object-side surface 511, which faces the object side, of the first lens 510 and an image-side surface 512, which faces the image side, of the first lens 510 are both convex surfaces. At least one of the object-side surface 511 of the first lens 510 and the image-side surface 512 of the first lens 510 is aspheric. In the fifth embodiment, the object-side surface 511 of the first lens 510 and the image-side surface 512 of the first lens 510 are both aspheric. The first lens 510 is a filter lens made of plastic and includes at least one visible light absorbing ingredient, so that the first lens 510 could correspondingly absorb a visible light with a wavelength range from 400 nm to 700 nm and could allow a light with a wavelength range greater than 800 nm to pass through the first lens 510 correspondingly.

The second lens 520 is a double concave lens with negative refractive power, wherein an object-side surface 521, which faces the object side, of the second lens 520 and an image-side surface 522, which faces the image side, of the second lens 520 are both convex surfaces. At least one of the object-side surface 521 of the second lens 520 and the image-side surface 522 of the second lens 520 is aspheric. In the fifth embodiment, the object-side surface 521 of the second lens 520 and the image-side surface 522 of the second lens 520 are both aspheric. The second lens 520 is made of plastic and does not include the at least one visible light absorbing ingredient.

The third lens 530 is a convex-concave lens with positive refractive power, wherein an object-side surface 531 which faces the object side, of the third lens 530 is a convex surface and an image-side surface 532, which faces the image side, of the third lens 530 is a concave surface. At least one of the object-side surface 531 of the third lens 530 and the image-side surface 532 of the third lens 530 is aspheric. In the fifth embodiment, the object-side surface 531 of the third lens 530 and the image-side surface 532 of the third lens 530 are both aspheric. The third lens 530 is made of plastic and does not include the at least one visible light absorbing ingredient.

The fourth lens 540 is a concave-convex lens with positive refractive power, wherein an object-side surface 541, which faces the object side, of the fourth lens 540 is a concave surface and an image-side surface 542, which faces the image side, of the fourth lens 540 is a convex surface. At least one of the object-side surface 541 of the fourth lens 540 and the image-side surface 542 of the fourth lens 540 is aspheric. In the fifth embodiment, the object-side surface 541 of the fourth lens 540 and the image-side surface 542 of the fourth lens 540 are both aspheric. The fourth lens 540 is a filter lens made of plastic and includes the at least one visible light absorbing ingredient, so that the fourth lens 540 could correspondingly absorb the visible light with the wavelength range from 400 nm to 700 nm and could allow the light with the wavelength range greater than 800 nm to pass through the fourth lens 540 correspondingly.

The fifth lens 550 is a concave-convex lens with negative refractive power, wherein an object-side surface 551, which faces the object side, of the fifth lens 550 is a concave surface and an image-side surface 552, which faces the image side, of the fifth lens 550 is a convex surface. At least one of the object-side surface 551 of the fifth lens 550 and the image-side surface 552 of the fifth lens 550 is aspheric. In the fifth embodiment, the object-side surface 551 of the fifth lens 550 and the image-side surface 552 of the fifth lens 550 are both aspheric. The fifth lens 550 is a filter lens made of plastic and includes the at least one visible light absorbing ingredient, so that the fifth lens 550 could correspondingly absorb the visible light with the wavelength range from 400 nm to 700 nm and could allow the light with the wavelength range greater than 800 nm to pass through the fifth lens 550 correspondingly.

An equation of aspheric surfaces is:

$$z = ch^2/\left[1 + \left[1 - (k+1)c^2h^2\right]^{0.5}\right] + A4h^4 + A6h^6 + A8h^8 + A10h^{10} + A12h^{12} + A14h^{14} + A16h^{16} + A18h^{18} + A20h^{20} + \ldots \quad (1)$$

where z is a position value along the optical axis Z at a height h with a surface vertex as a reference point; k is a conic constant; c is a reciprocal of a radius of curvature, and A4, A6, A8, A10, A12, A14, A16, A18, and A20 are high-order aspheric coefficients.

In the fifth embodiment, the first lens 510, the fourth lens 540, and the fifth lens 550 satisfy: $|\theta 1| \leq 62°$, $|\theta 2| \leq 52°$, $|\theta 3| \leq 42°$, wherein a definition of $|\theta 1|$, a definition of $|\theta 2|$, and a definition of $|\theta 3|$ are respectively the same as the definition of $|\theta 1|$, the definition of $|\theta 2|$, and the definition of $|\theta 3|$ according to the first embodiment of the present invention and are not repeated here.

In addition, the first lens 510, the fourth lens 540, and the fifth lens 550 satisfy: TWL50–TWL40≤30 nm. In an embodiment, the first lens 510, the fourth lens 540, and the fifth lens 550 satisfy TWL50–TWL40≤20 nm. In another embodiment, the first lens 510, the fourth lens 540, and the fifth lens 550 satisfy TWL50–TWL40≤10 nm. A definition of TWL50 and a definition of TWL40 are the same as the definition of TWL50 and the definition of TWL40 according to the first embodiment of the present invention and are not repeated here.

Additionally, the first lens 510, the fourth lens 540, and the fifth lens 550 satisfy: |TA50–TA0|≤10%, wherein when the light with the wavelength range greater than 800 nm passes through the lens, TA50 is a transmittance of the light at an incident angle of 50 degrees and TA0 is a transmittance of the light at an incident angle of 0 degree.

Additionally, in the fifth embodiment, the first lens 510 satisfies: 28°≤IRA100≤90°, wherein HOI is a maximum height for image formation of the image plane 570 and IRA100 is an angle at which a lower light of the light enters the object-side surface 511 of the first lens 510 and corresponds to a position of 1.0*HOI on the image plane 570. The fifth lens 550 satisfies: 13°≤ERA70≤27°, wherein HOI is a maximum height for image formation of the image plane 570 and ERA70 is an angle at which a main light of the light exits the image-side surface 552 of the fifth lens 550 and corresponds to a position of 0.70*HOI on the image plane 570.

The first lens 510, the second lens 520, the third lens 530, the fourth lens 540, and the fifth lens 550 respectively satisfy: 0.1 mm≤CT≤1.0 mm, wherein CT is a central thickness of the lens.

Additionally, the first lens 510, the fourth lens 540, and the fifth lens 550 respectively have an anti-reflective coating, wherein the anti-reflective coating allows the light with the wavelength range greater than 800 nm to pass through the first lens 510, the fourth lens 540, and the fifth lens 550 correspondingly. A material of the anti-reflective coating includes magnesium fluoride ($MgF_2$), silicon dioxide ($SiO_2$), zinc sulfide (ZnS), titanium dioxide ($TiO_2$), aluminum oxide ($Al_2O_3$), and silicon nitride ($Si_3N_4$). The material of the anti-reflective coating is selected for interfering a light wave being reflected from a surface of the lens, thereby reducing a reflection and raising a light transmittance.

The optical filter 560 is adjacent to the fifth lens 550. In an embodiment, the optical filter 560 has the at least one visible light absorbing ingredient, so that the optical filter 560 correspondingly absorbs the visible light with the wavelength range from 400 nm to 700 nm likewise and allows the light with the wavelength range greater than 800 nm to pass through the optical filter 560 correspondingly.

In the fifth embodiment, the first lens 510, the second lens 520, the third lens 530, and the fourth lens 540 respectively have a light filtering coating and/or the optical filter 560 has the light filtering coating, wherein the light filtering coating correspondingly absorbs a light with a wavelength range greater than 900 nm.

The optical filter 560 satisfies: |TA50–TA0|≤10%, wherein when the light with the wavelength range greater than 800 nm passes through the optical filter 560, TA50 is a transmittance of the light at the incident angle of 50 degrees and TA0 is a transmittance of the light at the incident angle of 0 degree.

The optical filter 560 satisfies: 13°≤ERA70≤27°, wherein HOI is a maximum height for image formation of the image plane 570 and ERA70 is an angle at which the main light of the light exits an image-side surface 562, which faces the image side, of the optical filter 560 and corresponds to a position of 0.70*HOI on the image plane 570.

Additionally, the optical filter 560 satisfies: 0.1 mm≤CT≤1.0 mm, wherein CT is a central thickness of the optical filter 560.

In an embodiment, the optical filter 560 has the anti-reflective coating, wherein the anti-reflective coating allows the light with the wavelength range greater than 800 nm to pass through the optical filter 560 correspondingly.

The parameters of the lenses of the fifth embodiment are listed in Table 18 and Table 19.

TABLE 18

| f = 3.5912 mm; f/HEP = 2.2; HAF = 40.05 deg; HOI = 3.05 mm | | | | | | | |
|---|---|---|---|---|---|---|---|
| Surface | Element | Radius of curvature (mm) | Thickness (mm) | Refractive index | Abbe number | Focal length (mm) | Maximum effective half diameter L |
| 0 | Object | ∞ | 600 | | | | |
| 1 | Aperture | ∞ | −0.218 | | | | |
| 2 | $1^{st}$ lens | 1.56327364 | 0.620 | 1.5440 | 55.9604 | 2.1729 | 0.814 |
| 3 | | −4.22824198 | 0.061 | | | | 0.870 |
| 4 | $2^{nd}$ lens | −3.64423522 | 0.214 | 1.6355 | 23.8900 | −2.887 | 0.874 |
| 5 | | 3.83608615 | 0.224 | | | | 0.899 |
| 6 | $3^{rd}$ lens | 3.76334784 | 0.362 | 1.6355 | 23.8900 | 20.646 | 0.936 |
| 7 | | 5.06382454 | 0.280 | | | | 1.073 |
| 8 | $4^{th}$ lens | −3.08386542 | 0.669 | 1.5440 | 55.9604 | 2.3971 | 1.215 |
| 9 | | −0.98910249 | 0.649 | | | | 1.460 |
| 10 | $5^{th}$ lens | −0.87712484 | 0.403 | 1.5138 | 56.7800 | −2.101 | 1.909 |
| 11 | | −5.33661784 | 0.100 | | | | 2.292 |
| 12 | Optical filter | ∞ | 0.210 | 1.5168 | 64.1600 | | |
| 13 | | ∞ | 0.589 | | | | |
| 14 | Image plane | ∞ | 0.000 | | | | |

TABLE 19

Aspheric coefficients of the fifth embodiment

| Surface | 2 | 3 | 4 | 5 | 6 | 7 |
|---|---|---|---|---|---|---|
| k | 2.127253E+00 | 0.000000E+00 | 5.149044E+00 | 0.000000E+00 | 0.000000E+00 | 0.000000E+00 |
| A4 | −8.976015E−02 | 2.440828E−01 | 3.789966E−01 | 9.107241E−02 | −2.774022E−01 | −1.446233E−01 |
| A6 | 2.476955E−01 | −3.143143E−01 | −5.109291E−01 | −4.425704E−01 | 4.036266E−01 | 3.304192E−01 |
| A8 | −2.678935E+00 | −7.450140E−01 | −3.685933E−01 | 1.898373E+00 | −1.801455E+00 | −1.085692E+00 |
| A10 | 1.068596E+01 | 5.004874E+00 | 5.050184E+00 | −4.040459E+00 | 4.494432E+00 | 1.862773E+00 |
| A12 | −2.334797E+01 | −1.292188E+01 | −1.451976E+01 | 4.326419E+00 | −5.556583E+00 | −1.815722E+00 |
| A14 | 2.573769E+01 | 1.476689E+01 | 1.723675E+01 | −2.215511E+00 | 3.553915E+00 | 1.049140E+00 |
| A16 | −1.171960E+01 | −6.194759E+00 | −7.266677E+00 | 4.532430E−01 | −9.721683E−01 | −2.670243E−01 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

| Surface | 8 | 9 | 10 | 11 |
|---|---|---|---|---|
| k | −8.756950E+01 | −6.120375E−01 | −2.447001E+00 | 0.000000E+00 |
| A4 | −3.498948E−01 | 1.544765E−01 | 2.664415E−01 | 2.028593E−01 |
| A6 | 1.094730E+00 | −4.591261E−02 | −2.552737E−01 | −1.860226E−01 |
| A8 | −1.580855E+00 | 2.987238E−01 | 1.085226E−01 | 9.227018E−02 |
| A10 | 1.293022E+00 | −3.289089E−01 | −1.841012E−02 | −2.950861E−02 |
| A12 | −6.490782E−01 | 1.605353E−01 | −1.466728E−03 | 5.886721E−03 |
| A14 | 1.903018E−01 | −3.806476E−02 | 9.845152E−04 | −6.627959E−04 |
| A16 | −2.470925E−02 | 3.773410E−03 | −1.010518E−04 | 3.186075E−05 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

The detailed parameters of the fifth embodiment shown in FIG. 20 are listed in Table 18, wherein units for the radius of curvature, the thickness, a distance, the focal length, and the maximum effective half diameter are millimeters (mm). Surfaces 0-14 represent the surfaces of all elements in the system in sequence from the object side to the image side. Table 19 is the list of coefficients of the aspheric surfaces of the fifth embodiment, wherein k represents the conic constant in the equation of the aspheric surfaces, and A4-A20 represent the aspheric coefficients from the fourth order to the twentieth order of each aspheric surface.

According to the data as shown in Table 18, data of intersecting angles between the optical axis Z and normal line vectors of the object sides of the lenses including the first lens 510, the fourth lens 540, and the fifth lens 550 respectively located at control points of 0.50*L, 0.70*L, and 0.95*L and data of the intersecting angles between the optical axis Z and normal line vectors of the image sides of the lenses including the first lens 510, the fourth lens 540, and the fifth lens 550 respectively located at control points of 0.50*L, 0.70*L, and 0.95*L are further obtained as shown in Table 20; an angle at which the lower light of the light enters the object-side surface 511 of the first lens 510 and corresponds to the position of 1.0*HOI on the image plane 570 and the angles at which the main light of the light exits the image-side surface 552 of the fifth lens 550 and on the optical filter 560 and corresponds to the position of 0.70*HOI on the image plane 570.

TABLE 20

The parameters of θ1, θ2, and θ3 of the object-side surfaces of the lenses including the first lens 510, the fourth lens 540, and the fifth lens 550 and the parameters of θ1, θ2, and θ3 of the image-side surfaces of the lenses including the first lens 510, the fourth lens 540, and the fifth lens 550

| | $1^{st}$ lens | | $4^{th}$ lens | | $5^{th}$ lens | |
|---|---|---|---|---|---|---|
| Surface | 2 | 3 | 8 | 9 | 10 | 11 |
| Maximum effective half diameter (mm) | 0.814 | 0.870 | 1.215 | 1.460 | 1.909 | 2.292 |
| L length % | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface |
| 0.50*L(θ3) | 14.975° | 3.131° | 7.614° | 27.715° | 24.013° | 1.657° |
| 0.70*L(θ2) | 20.925° | 4.844° | 6.872° | 21.369° | 29.399° | 18.033° |
| 0.95*L(θ1) | 26.460° | 18.051° | 13.323° | 23.112° | 20.038° | 52.259° |

TABLE 21

IRA100 of the first lens 510, ERA70 of the fifth lens 550, and ERA70 of the optical filter 560

| Item | Parameter | |
|---|---|---|
| HOI | 3.050 mm | |
| IRA100 | 40.050° | Object-side surface of the first lens |
| ERA70 | 32.790° | Image-side surface of the fifth lens |
| ERA70 | 32.790° | Optical filter |

Sixth Embodiment

Figure 23:
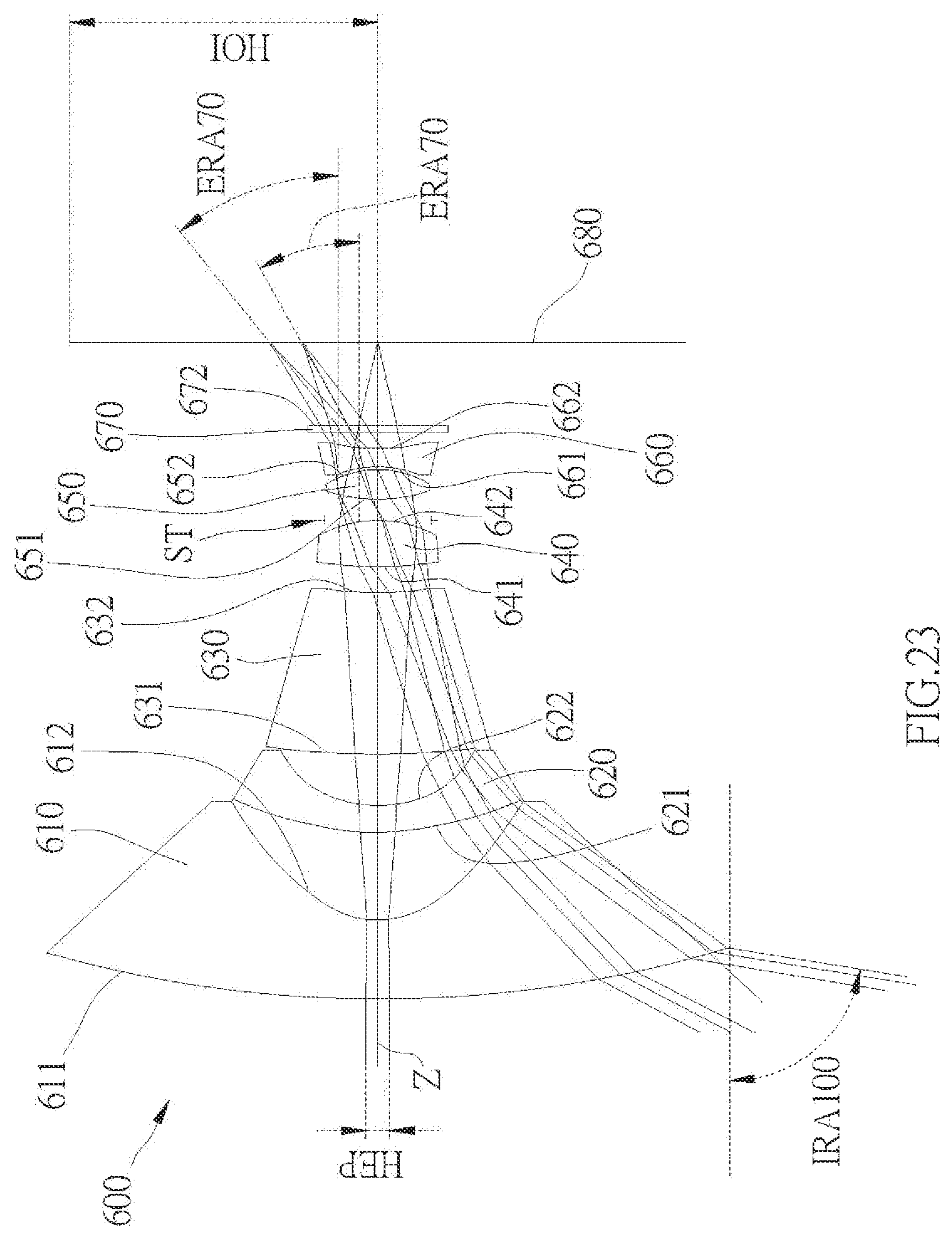
FIG. 23 is a schematic view of a lens arrangement of the optical image capturing system according to a sixth embodiment of the present invention.
Figure 24:
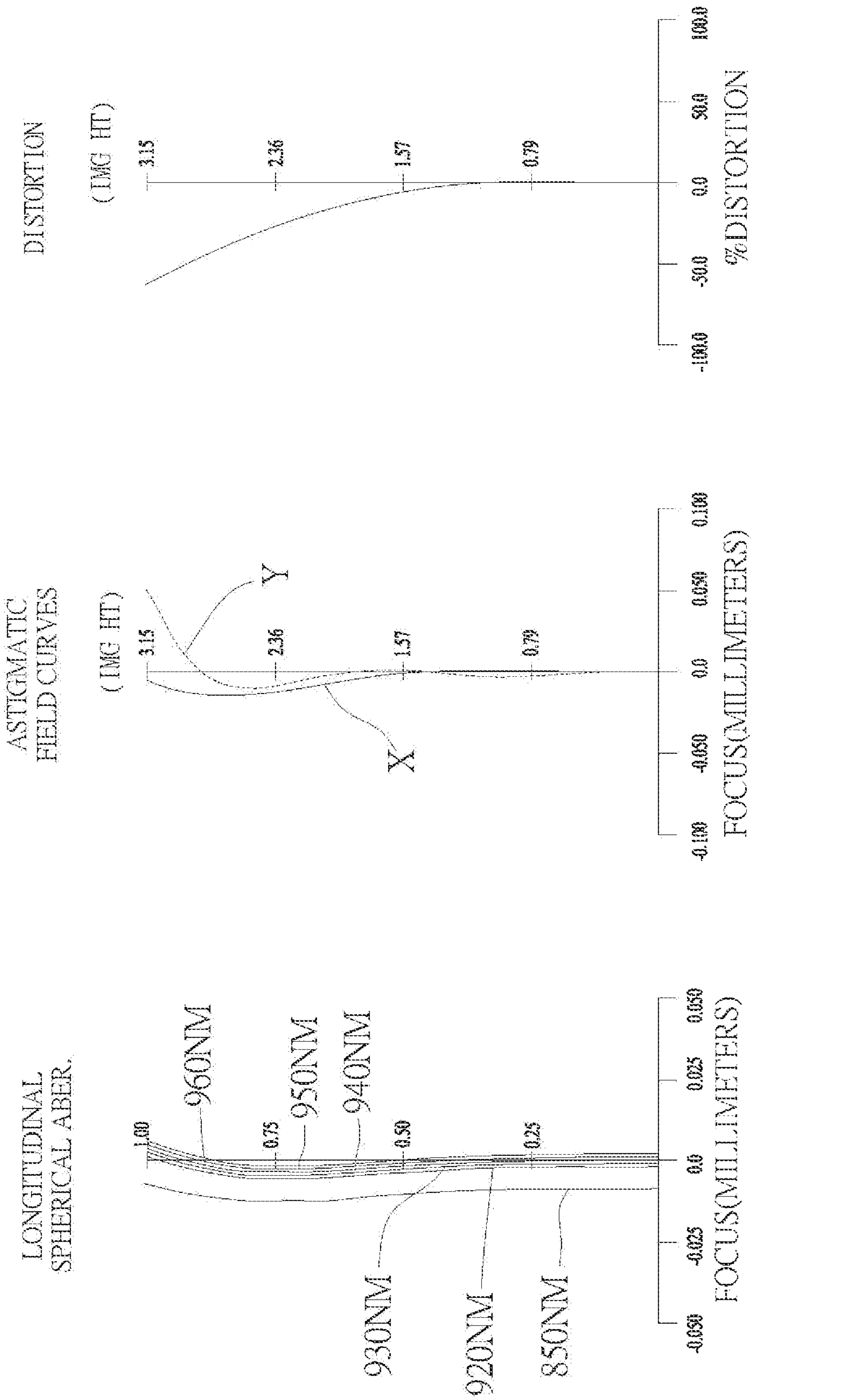
FIG. 24 shows curve diagrams of a longitudinal spherical aberration, an astigmatic field, and an optical distortion of the optical image capturing system in the order from left to right according to the sixth embodiment of the present invention.
Figure 25:
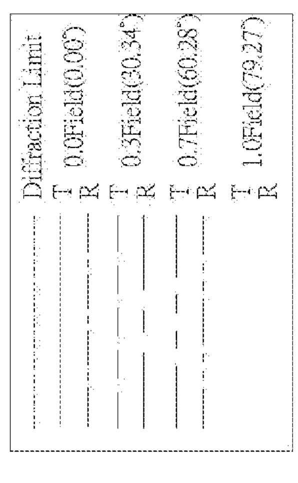
FIG. 25 shows a feature map of modulation transformation of the optical image capturing system according to the sixth embodiment of the present invention in infrared spectrum.
Figure 25:
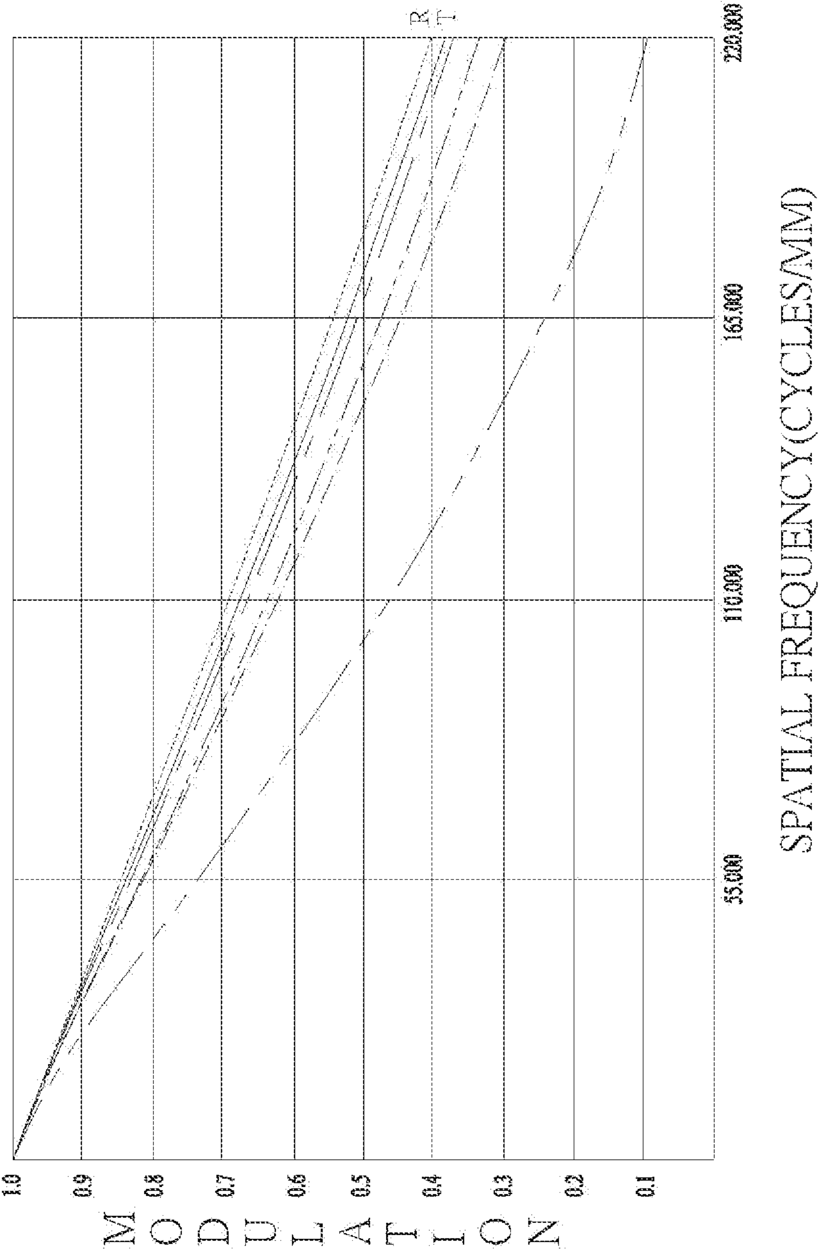

An optical image capturing system 600 according to a sixth embodiment of the present invention is illustrated in FIG. 23 to FIG. 25. FIG. 23 is a schematic view of a lens arrangement of the optical image capturing system 600 according to the sixth embodiment of the present invention. FIG. 24 shows curve diagrams of a longitudinal spherical aberration, an astigmatic field, and an optical distortion of the optical image capturing system 600 in an order from left to right according to the sixth embodiment of the present invention. FIG. 25 shows a feature map of modulation transformation of the optical image capturing system 600 according to the sixth embodiment of the present invention in infrared spectrum. Referring to FIG. 23, the optical image capturing system 600 according to the sixth embodiment of the present invention includes, along an optical axis Z in an order from an object side to an image side, a first lens 610, a second lens 620, a third lens 630, a fourth lens 640, an aperture ST, a fifth lens 650, a sixth lens 660, an optical filter 670, and an image plane 680.

The first lens 610 is a convex-concave lens with negative refractive power, wherein an object-side surface 611, which faces the object side, of the first lens 610 is a convex surface and an image-side surface 612, which faces the image side, of the first lens 610 is a concave surface. At least one of the object-side surface 611 of the first lens 610 and the image-side surface 612 of the first lens 610 is aspheric. In the sixth embodiment, the object-side surface 611 of the first lens 610 and the image-side surface 612 of the first lens 610 are both aspheric. The first lens 610 is a filter lens made of plastic and includes at least one visible light absorbing ingredient, so that the first lens 610 could correspondingly absorb a visible light with a wavelength range from 400 nm to 700 nm and could allow a light with a wavelength range greater than 800 nm to pass through the first lens 610 correspondingly.

The second lens 620 is a convex-concave lens with negative refractive power, wherein an object-side surface 621, which faces the object side, of the second lens 620 is a convex surface and an image-side surface 622, which faces the image side, of the second lens 620 is a concave surface. At least one of the object-side surface 621 of the second lens 620 and the image-side surface 622 of the second lens 620 is aspheric. In the sixth embodiment, the object-side surface 621 of the second lens 620 and the image-side surface 622 of the second lens 620 are both aspheric. The second lens 620 is a filter lens made of plastic and includes the at least one visible light absorbing ingredient, so that the second lens 620 could correspondingly absorb the visible light with the wavelength range from 400 nm to 700 nm and could allow the light with the wavelength range greater than 800 nm to pass through the second lens 620 correspondingly.

The third lens 630 is a convex-concave lens with positive refractive power, wherein an object-side surface 631, which faces the object side, of the third lens 630 is a convex surface and an image-side surface 632, which faces the image side, of the third lens 630 is a concave surface. At least one of the object-side surface 631 of the third lens 630 and the image-side surface 632 of the third lens 630 is aspheric. In the sixth embodiment, the object-side surface 631 of the third lens 630 and the image-side surface 632 of the third lens 630 are both aspheric. The third lens 630 is made of plastic and does not include the at least one visible light absorbing ingredient.

The fourth lens 640 is a double convex lens with positive refractive power, wherein an object-side surface 641, which faces the object side, of the fourth lens 640 and an image-side surface 642, which faces the image side, of the fourth lens 640 are both convex surfaces. At least one of the object-side surface 641 of the fourth lens 640 and the image-side surface 642 of the fourth lens 640 is aspheric. In the sixth embodiment, the object-side surface 641 of the fourth lens 640 and the image-side surface 642 of the fourth lens 640 are both aspheric. The fourth lens 640 is a filter lens made of plastic and includes the at least one visible light absorbing ingredient, so that the fourth lens 640 could correspondingly absorb the visible light with the wavelength range from 400 nm to 700 nm and could allow the light with the wavelength range greater than 800 nm to pass through the fourth lens 640 correspondingly.

The fifth lens 650 is a double convex lens with positive refractive power, wherein an object-side surface 651 which faces the object side, of the fifth lens 650 and an image-side surface 652, which faces the image side, of the fifth lens 650 are both convex surfaces. At least one of the object-side surface 651 of the fifth lens 650 and the image-side surface 652 of the fifth lens 650 is aspheric. In the sixth embodiment, the object-side surface 651 of the fifth lens 650 and the image-side surface 652 of the fifth lens 650 are both aspheric. The fifth lens 650 is a filter lens made of plastic and includes the at least one visible light absorbing ingredient, so that the fifth lens 650 could correspondingly absorb the visible light with the wavelength range from 400 nm to 700 nm and could allow the light with the wavelength range greater than 800 nm to pass through the fifth lens 650 correspondingly.

The sixth lens 660 is a double concave lens with negative refractive power, wherein an object-side surface 661 which faces the object side, of the sixth lens 660 and an image-side surface 662, which faces the image side, of the sixth lens 660 are both concave surfaces. At least one of the object-side surface 661 of the sixth lens 660 and the image-side surface 662 of the sixth lens 660 is aspheric. In the sixth embodiment, the object-side surface 661 of the sixth lens 660 and the image-side surface 662 of the sixth lens 660 are both aspheric. The sixth lens 660 is made of plastic and does not include the at least one visible light absorbing ingredient.

An equation of aspheric surfaces is:

$$z = ch^2/\left[1+\left[1-(k+1)c^2h^2\right]^{0.5}\right] + A4h^4 + A6h^6 + A8h^8 + A10h^{10} + A12h^{12} + A14h^{14} + A16h^{16} + A18h^{18} + A20h^{20} + \ldots \quad (1)$$

where z is a position value along the optical axis Z at a height h with a surface vertex as a reference point; k is a conic constant; c is a reciprocal of a radius of curvature, and A4, A6, A8, A10, A12, A14, A16, A18, and A20 are high-order aspheric coefficients.

In the sixth embodiment, the first lens 610, the second lens 620, the fourth lens 640, and the fifth lens 650 respectively satisfy: $|\theta 1| \leq 62°$, $|\theta 2| \leq 52°$, $|\theta 3| \leq 42°$, wherein a definition of $|\theta 1|$, a definition of $|\theta 2|$, and a definition of $|\theta 3|$ are respectively the same as the definition of $|\theta 1|$, the definition of $|\theta 2|$, and the definition of $|\theta 3|$ according to the first embodiment of the present invention and are not repeated here.

Additionally, the first lens 610, the second lens 620, the fourth lens 640, and the fifth lens 650 respectively satisfy: TWL50−TWL40≤30 nm. In an embodiment, the first lens 610, the second lens 620, the fourth lens 640, and the fifth lens 650 respectively satisfy TWL50−TWL40≤20 nm. In another embodiment, the first lens 610, the second lens 620, the fourth lens 640, and the fifth lens 650 respectively satisfy TWL50−TWL40≤10 nm. A definition of TWL50 and a definition of TWL40 are the same as the definition of TWL50 and the definition of TWL40 according to the first embodiment of the present invention and are not repeated here.

Additionally, the first lens 610, the second lens 620, the fourth lens 640, and the fifth lens 650 respectively satisfy: |TA50−TA0|≤10%, wherein when the light with the wavelength range greater than 800 nm passes through the lens, TA50 is a transmittance of the light at an incident angle of 50 degrees and TA0 is a transmittance of the light at an incident angle of 0 degree.

Additionally, in the sixth embodiment, the first lens 610 satisfies: 28°≤IRA100≤90°, wherein HOI is a maximum height for image formation of the image plane 680 and IRA100 is an angle at which a lower light of the light enters the object-side surface 611 of the first lens 610 and corresponds to a position of 1.0*HOI on the image plane 680. The sixth lens 660 satisfies: 13°≤ERA70≤27°, wherein HOI is a maximum height for image formation of the image plane 680 and ERA70 is an angle at which a main light of the light exits the image-side surface 662 of the sixth lens 660 and corresponds to a position of 0.70*HOI on the image plane 680.

The first lens 610, the second lens 620, the third lens 630, the fourth lens 640, the fifth lens 650, and the sixth lens 660 respectively satisfy: 0.1 mm≤CT≤1.0 mm, wherein CT is a central thickness of the lens.

Additionally, the first lens 610, the second lens 620, and the fourth lens 640, and the fifth lens 650 respectively have an anti-reflective coating, wherein the anti-reflective coating allows the light with the wavelength range greater than 800 nm to pass through the first lens 610, the second lens 620, and the fourth lens 640, and the fifth lens 650 correspondingly. A material of the anti-reflective coating includes magnesium fluoride ($MgF_2$), silicon dioxide ($SiO_2$), zinc sulfide (ZnS), titanium dioxide ($TiO_2$), aluminum oxide ($Al_2O_3$), and silicon nitride ($Si_3N_4$). The material of the anti-reflective coating is selected for interfering a light wave being reflected from a surface of the lens, thereby reducing a reflection and raising a light transmittance.

The optical filter 670 is adjacent to the sixth lens 660. In an embodiment, the optical filter 670 has the at least one visible light absorbing ingredient, so that the optical filter 670 correspondingly absorbs the visible light with the wavelength range from 400 nm to 700 nm likewise and allows the light with the wavelength range greater than 800 nm to pass through the optical filter 670 correspondingly.

In the sixth embodiment, the first lens 610, the second lens 620, the third lens 630, and the fourth lens 640 respectively have a light filtering coating and/or the optical filter 670 has a light filtering coating, wherein the light filtering coating correspondingly absorbs a light with a wavelength range greater than 900 nm.

The optical filter 670 satisfies: |TA50−TA0|≤10%, wherein when the light with a wavelength range greater than 800 nm passes through the optical filter 670, TA50 is a transmittance of the light at the incident angle of 50 degrees and TA0 is a transmittance of the light at the incident angle of 0 degree.

The optical filter 670 satisfies: 13°≤ERA70≤27°, wherein HOI is a maximum height for image formation of the image plane 680 and ERA70 is an angle at which the main light of the light exits an image-side surface 672, which faces the image side, of the optical filter 670 and corresponds to a position of 0.70*HOI on the image plane 680.

Additionally, the optical filter 670 satisfies: 0.1 mm≤CT≤1.0 mm, wherein CT is a central thickness of the optical filter 670.

In an embodiment, the optical filter 670 has the anti-reflective coating, wherein the anti-reflective coating allows the light with the wavelength range greater than 800 nm to pass through the optical filter 670 correspondingly.

The parameters of the lenses of the sixth embodiment are listed in Table 22 and Table 23.

TABLE 22

| f = 1.5917 mm; f/HEP = 2.4; HAF = 79.94 deg; HOI = 3.15 mm | | | | | | | |
|---|---|---|---|---|---|---|---|
| Surface | Element | Radius of curvature (mm) | Thickness (mm) | Refractive index | Abbe number | Focal length (mm) | Maximum effective half diameter L |
| 0 | Object | ∞ | ∞ | | | | |
| 1 | 1st lens | 30.67468651 | 2.504 | 1.5440 | 55.9604 | −4.796 | 10.177 |
| 2 | | 2.34234870 | 2.716 | | | | 4.218 |
| 3 | 2nd lens | 6.37883472 | 0.853 | 1.5440 | 55.9604 | −23.31 | 4.164 |
| 4 | | 4.04815895 | 1.602 | | | | 2.838 |
| 5 | 3rd lens | 58.25438770 | 5.052 | 1.6420 | 22.4561 | 169.16 | 2.812 |
| 6 | | 120.16366411 | 0.787 | | | | 1.559 |
| 7 | 4th lens | 9.68546080 | 1.455 | 1.5440 | 55.9604 | 4.6063 | 1.430 |
| 8 | | −3.28133597 | 0.302 | | | | 1.319 |
| 9 | Aperture | ∞ | 0.356 | | | | |
| 10 | 5th lens | 4.27206517 | 0.916 | 1.5440 | 55.9604 | 3.1457 | 1.154 |
| 11 | | −2.65314743 | 0.085 | | | | 1.205 |
| 12 | 6th lens | −3.16477936 | 0.576 | 1.6420 | 22.4561 | −3.223 | 1.207 |
| 13 | | 6.56793489 | 0.509 | | | | 1.392 |
| 14 | Optical filter | ∞ | 0.210 | 1.5168 | 64.1600 | | |
| 15 | | ∞ | 2.577 | | | | |
| 16 | Image plane | ∞ | 0.000 | | | | |

TABLE 23

| Aspheric coefficients of the sixth embodiment | | | | | | |
|---|---|---|---|---|---|---|
| Surface | 1 | 2 | 3 | 4 | 5 | 6 |
| k | 5.003754E+00 | −8.913117E−01 | −5.740806E+00 | 3.119574E−01 | 3.000000E+02 | 3.000000E+02 |
| A4 | −1.971356E−05 | −3.336536E−03 | −4.528049E−04 | 7.047157E−03 | 4.719190E−03 | 1.934324E−02 |
| A6 | −2.632787E−07 | 1.442485E−04 | 1.287589E−05 | −4.582703E−05 | −5.901376E−04 | −7.819845E−04 |
| A8 | 3.086637E−10 | −3.944457E−06 | 7.161676E−07 | −3.499635E−06 | 8.847152E−05 | 7.198687E−04 |
| A10 | −1.974553E−12 | 6.827218E−08 | 2.303260E−08 | 1.687929E−06 | −1.773695E−05 | −4.821666E−04 |
| A12 | 0.000000E+00 | 0.000000E+00 | 0.000000E+00 | 0.000000E+00 | 2.562524E−06 | 1.636456E−04 |
| A14 | 0.000000E+00 | 0.000000E+00 | 0.000000E+00 | 0.000000E+00 | −2.469468E−07 | −2.787717E−05 |
| A16 | 0.000000E+00 | 0.000000E+00 | 0.000000E+00 | 0.000000E+00 | 8.726806E−09 | 1.579421E−06 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |
| Surface | 7 | 8 | 10 | 11 | 12 | 13 |
| k | 4.495120E+00 | −2.107635E−01 | −1.303679E+00 | 2.262627E−02 | −1.839106E−02 | 7.519771E+00 |
| A4 | 7.902810E−03 | −2.614545E−04 | −2.616674E−03 | 3.302019E−04 | 1.444039E−02 | 2.487275E−02 |
| A6 | −3.431488E−03 | −1.873227E−03 | −1.997880E−03 | 2.434911E−03 | −1.373741E−02 | −1.554804E−02 |
| A8 | −5.685335E−04 | 1.589066E−04 | 1.362216E−03 | −2.182946E−05 | 5.128055E−03 | 4.265566E−03 |
| A10 | 8.690000E−06 | −6.306690E−06 | −4.749770E−04 | −6.218870E−04 | −1.564045E−03 | −7.990340E−04 |
| A12 | −5.516130E−19 | −5.767068E−19 | 0.000000E+00 | 0.000000E+00 | −5.169899E−19 | 1.078596E−04 |
| A14 | −1.102330E−21 | −1.127525E−21 | 0.000000E+00 | 0.000000E+00 | −1.688552E−21 | −2.150633E−05 |
| A16 | −3.412244E−24 | −3.281647E−24 | 0.000000E+00 | 0.000000E+00 | −3.420181E−24 | −3.420181E−24 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

The detailed parameters of the sixth embodiment shown in FIG. 23 are listed in Table 22, wherein units for the radius of curvature, the thickness, a distance, the focal length, and the maximum effective half diameter are millimeters (mm). Surfaces 0-16 represent the surfaces of all elements in the system in sequence from the object side to the image side. Table 23 is the list of coefficients of the aspheric surfaces of the sixth embodiment, wherein k represents the conic constant in the equation of the aspheric surfaces, and A4-A20 represent the aspheric coefficients from the fourth order to the twentieth order of each aspheric surface.

According to the data as shown in Table 22, data of intersecting angles between the optical axis Z and normal line vectors of the object sides of the lenses including the first lens 610, the second lens 620, the fourth lens 640, and the fifth lens 650 respectively located at control points of 0.50*L, 0.70*L, and 0.95*L and data of intersecting angles between the optical axis Z and normal line vectors of the image sides of the lenses including the first lens 610, the second lens 620, the fourth lens 640, and the fifth lens 650 respectively located at control points of 0.50*L, 0.70*L, and 0.95*L are further obtained as shown in Table 24; the angle at which the lower light of the light enters the object-side surface 611 of the first lens 610 and corresponds to the position of 1.0*HOI on the image plane 680 and the angles at which the main light of the light exits the image-side surface 662 of the sixth lens 660 and on the optical filter 670 and corresponds to the position of 0.70*HOI on the image plane 680 are obtained as shown in Table 25.

TABLE 24

The parameters of θ1, θ2, and θ3 of the object-side surfaces of the lenses including the first lens 610, the second lens 620, the fourth lens 640, and the fifth lens 650 and the parameters of θ1, θ2, and θ3 of the image-side surfaces of the lenses including the first lens 610, the second lens 620, the fourth lens 640, and the fifth lens 650

| | 1st lens | | 2nd lens | |
|---|---|---|---|---|
| Surface | 1 | 2 | 3 | 4 |
| Maximum effective half diameter (mm) | 10.177 | 4.218 | 4.164 | 2.838 |
| L length % | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface |
| 0.50*L(θ3) | 9.423° | 40.313° | 14.245° | 24.786° |
| 0.70*L(θ2) | 12.752° | 49.872° | 17.175° | 39.028° |
| 0.95*L(θ1) | 16.508° | 60.469° | 25.328° | 58.650° |
| | 4th lens | | 5th lens | |
| Surface | 7 | 8 | 10 | 11 |
| Maximum effective half diameter (mm) | 1.430 | 1.319 | 1.154 | 1.205 |
| L length % | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface |
| 0.50*L(θ3) | 4.701° | 11.637° | 7.526° | 13.057° |
| 0.70*L(θ2) | 6.450° | 16.612° | 10.214° | 18.267° |
| 0.95*L(θ1) | 5.428° | 23.613° | 13.018° | 25.182° |

TABLE 25

IRA100 of the first lens 610, ERA70 of the sixth lens 660, and ERA70 of the optical filter 670

| Item | Parameter | |
|---|---|---|
| HOI | 3.150 mm | |
| IRA100 | 79.940° | Object-side surface of the first lens |
| ERA70 | 27.250° | Image-side surface of the sixth lens |
| ERA70 | 27.250° | Optical filter |

Seventh Embodiment

Figure 26:
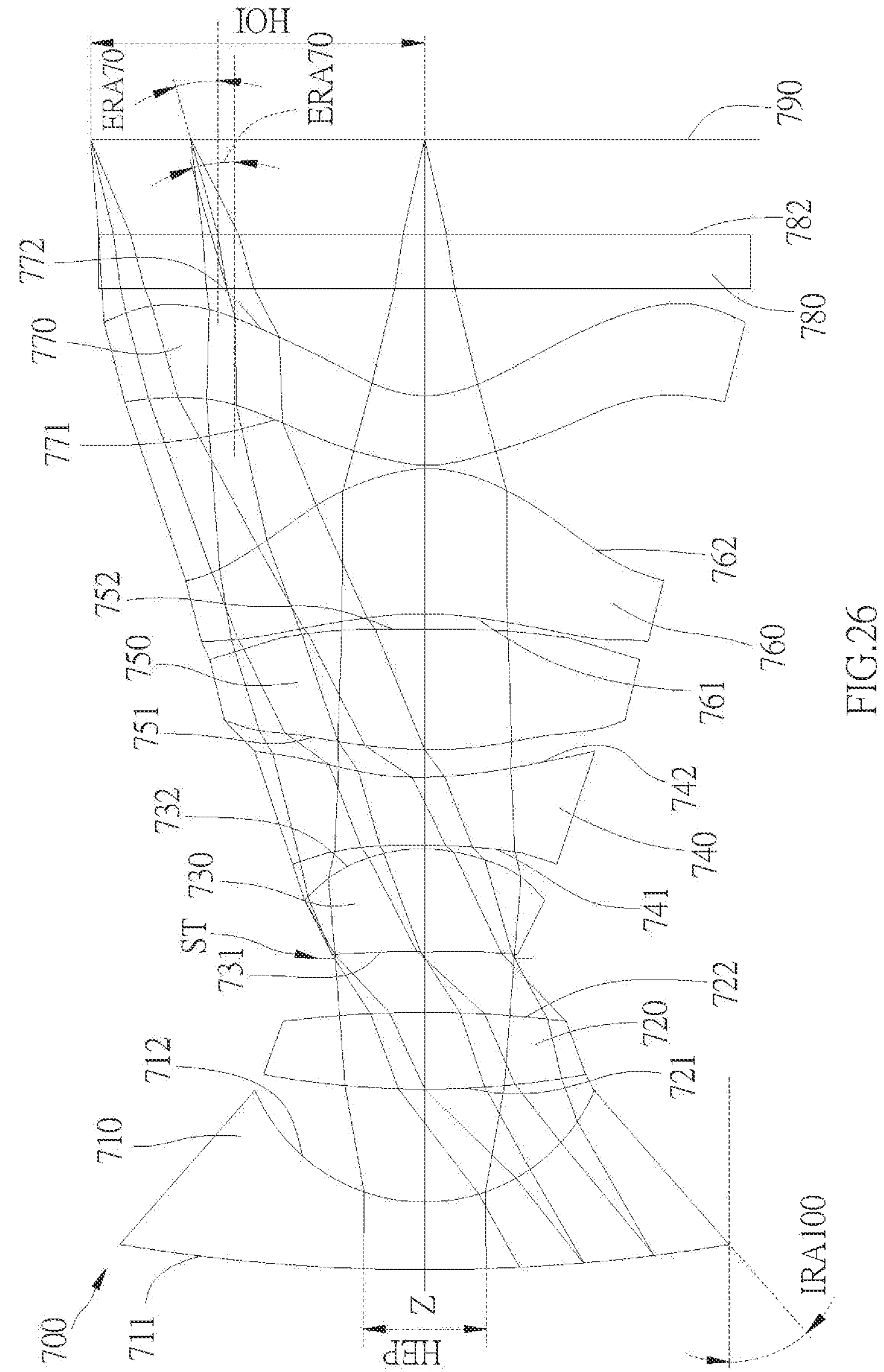
FIG. 26 is a schematic view of a lens arrangement of the optical image capturing system according to a seventh embodiment of the present invention.
Figure 27:
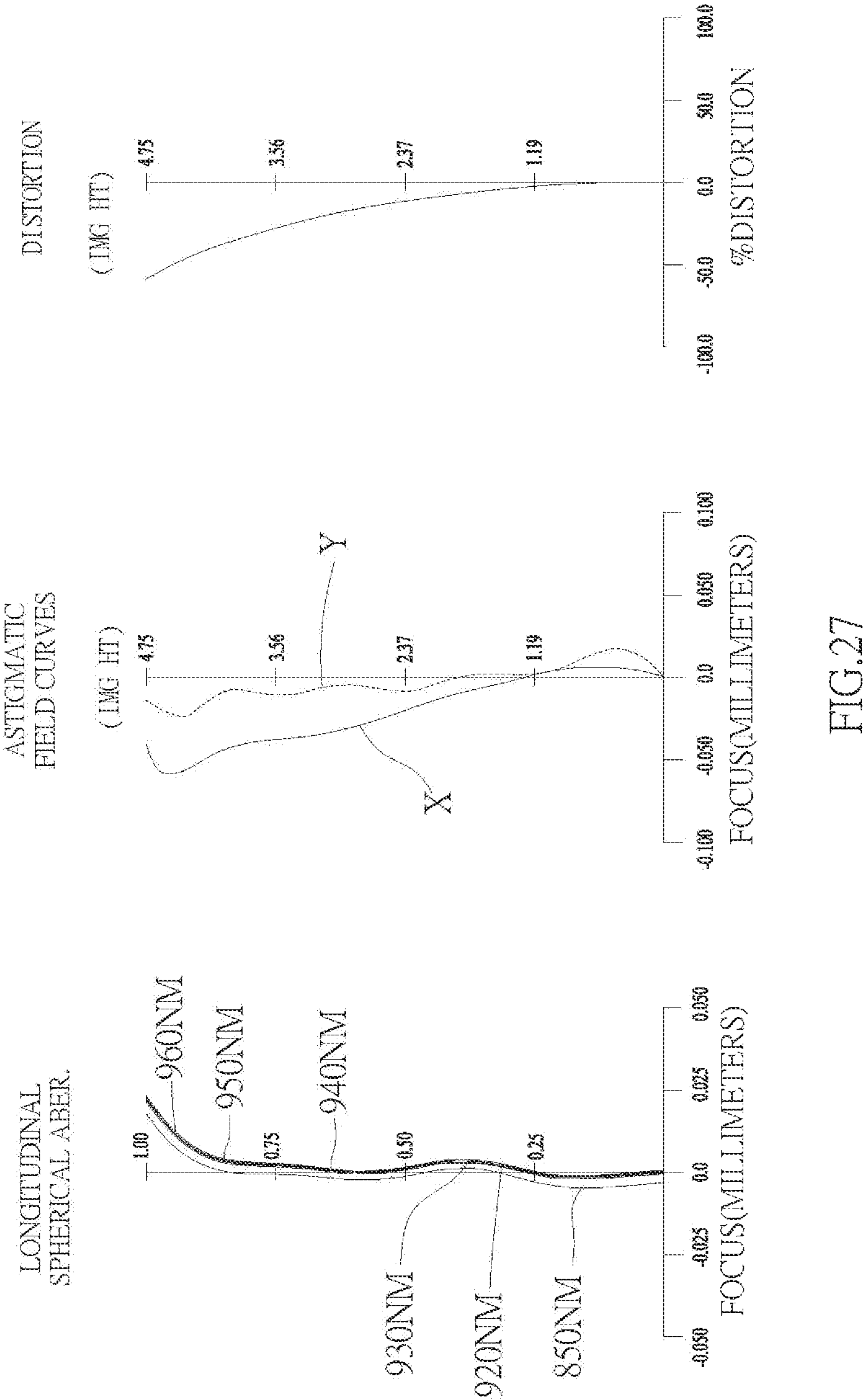
FIG. 27 shows curve diagrams of a longitudinal spherical aberration, an astigmatic field, and an optical distortion of the optical image capturing system in the order from left to right according to the seventh embodiment of the present invention.
Figure 28:
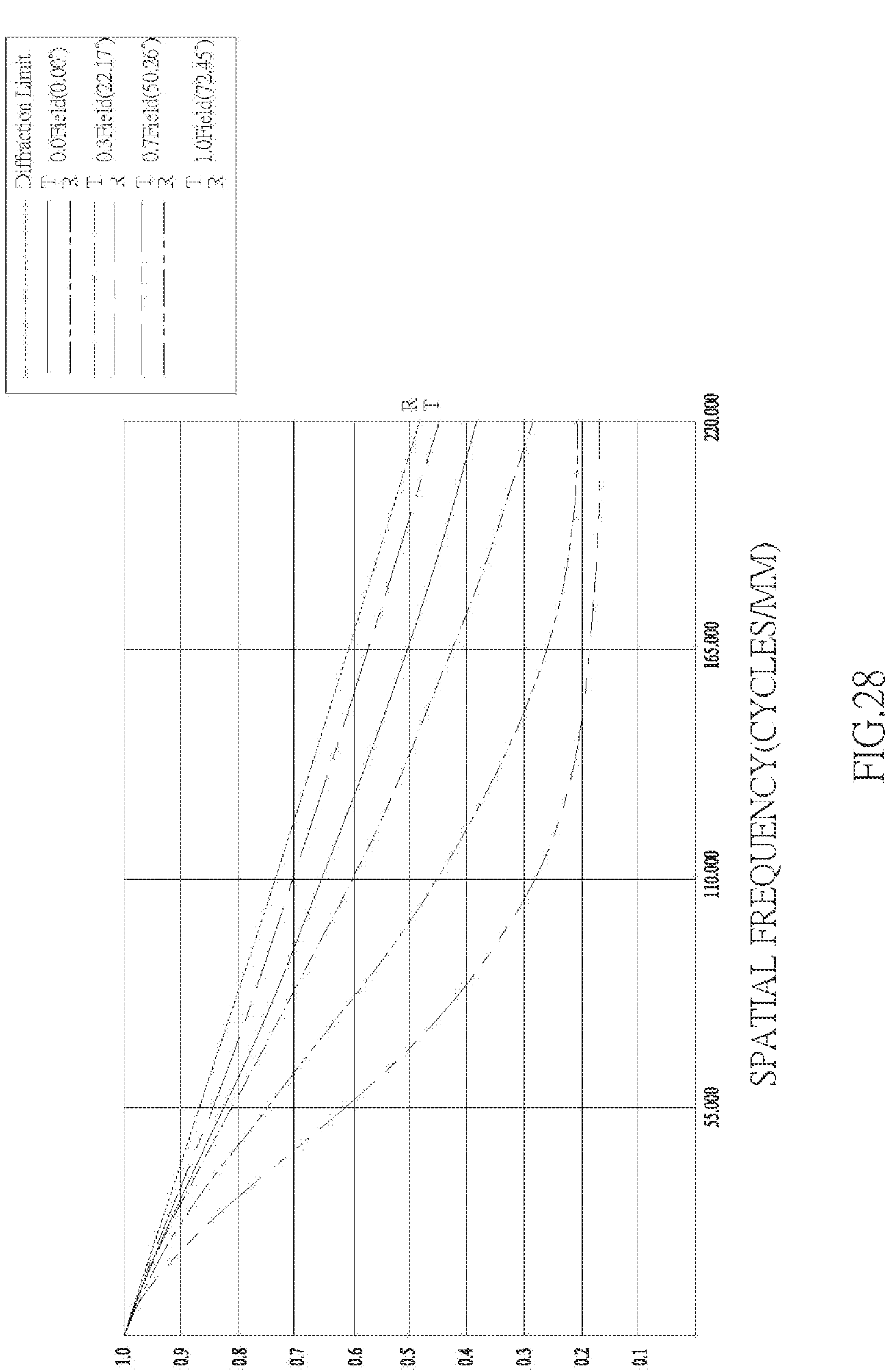
FIG. 28 shows a feature map of modulation transformation of the optical image capturing system according to the seventh embodiment of the present invention in infrared spectrum.

An optical image capturing system 700 according to a seventh embodiment of the present invention is illustrated in FIG. 26 to FIG. 28. FIG. 26 is a schematic view of a lens arrangement of the optical image capturing system 700 according to the seventh embodiment of the present invention. FIG. 27 shows curve diagrams of a longitudinal spherical aberration, an astigmatic field, and an optical distortion of the optical image capturing system 700 in an order from left to right according to the seventh embodiment of the present invention. FIG. 28 shows a feature map of modulation transformation of the optical image capturing system 700 according to the seventh embodiment of the present invention in infrared spectrum. Referring to FIG. 26, the optical image capturing system 700 according to the seventh embodiment of the present invention includes, along an optical axis Z in an order from an object side to an image side, a first lens 710, a second lens 720, an aperture ST, a third lens 730, a fourth lens 740, a fifth lens 750, a sixth lens 760, a seventh lens 770, an optical filter 780, and an image plane 790.

The first lens 710 is a convex-concave lens with negative refractive power, wherein an object-side surface 711, which faces the object side, of the first lens 710 is a convex surface and an image-side surface 712, which faces the image side, of the first lens 710 is a concave surface. At least one of the object-side surface 711 of the first lens 710 and the image-side surface 712 of the first lens 710 is aspheric. In the seventh embodiment, the object-side surface 711 of the first lens 710 and the image-side surface 712 of the first lens 710 are both aspheric. The first lens 710 is made of plastic and does not include at least one visible light absorbing ingredient.

The second lens 720 is a double convex lens with positive refractive power, wherein an object-side surface 721, which faces the object side, of the second lens 720 and an image-side surface 722, which faces the image side, of the second lens 720 are both convex surfaces. At least one of the object-side surface 721 of the second lens 720 and the image-side surface 722 of the second lens 720 is aspheric. In the seventh embodiment, the object-side surface 721 of the second lens 720 and the image-side surface 722 of the second lens 720 are both aspheric. The second lens 720 is a filter lens made of plastic and includes the at least one visible light absorbing ingredient, so that the second lens 720 could correspondingly absorb a visible light with a wavelength range from 400 nm to 700 nm and could allow a light with a wavelength range greater than 800 nm to pass through the second lens 720 correspondingly.

The third lens 730 is a double convex lens with positive refractive power, wherein an object-side surface 731, which faces the object side, of the third lens 730 and an image-side surface 732, which faces the image side, of the third lens 730 are both convex surfaces. At least one of the object-side surface 731 of the third lens 730 and the image-side surface 732 of the third lens 730 is aspheric. In the seventh embodiment, the object-side surface 731 of the third lens 730 and the image-side surface 732 of the third lens 730 are both aspheric. The third lens 730 is a filter lens made of plastic and includes the at least one visible light absorbing ingredient, so that the third lens 730 could correspondingly absorb the visible light with the wavelength range from 400 nm to 700 nm and could allow the light with the wavelength range greater than 800 nm to pass through the third lens 730 correspondingly.

The fourth lens 740 is a double concave lens with negative refractive power, wherein an object-side surface 741, which faces the object side, of the fourth lens 740 and an image-side surface 742, which faces the image side, of the fourth lens 740 are both concave surfaces. At least one of the object-side surface 741 of the fourth lens 740 and the image-side surface 742 of the fourth lens 740 is aspheric. In the seventh embodiment, the object-side surface 741 of the fourth lens 740 and the image-side surface 742 of the fourth lens 740 are both aspheric. The fourth lens 740 is a filter lens made of plastic and includes the at least one visible light absorbing ingredient, so that the fourth lens 740 could correspondingly absorb the visible light with the wavelength range from 400 nm to 700 nm and could allow the light with the wavelength range greater than 800 nm to pass through the fourth lens 740 correspondingly.

The fifth lens 750 is a double convex lens with positive refractive power, wherein an object-side surface 751, which faces the object side, of the fifth lens 750 and an image-side surface 752, which faces the image side, of the fifth lens 750 are both convex surfaces. At least one of the object-side surface 751 of the fifth lens 750 and the image-side surface 752 of the fifth lens 750 is aspheric. In the seventh embodiment, the object-side surface 751 of the fifth lens 750 and the image-side surface 752 of the fifth lens 750 are both aspheric. The fifth lens 750 is a filter lens made of plastic and includes the at least one visible light absorbing ingredient, so that the fifth lens 750 could correspondingly absorb the visible light with the wavelength range from 400 nm to 700 nm and could allow the light with the wavelength range greater than 800 nm to pass through the fifth lens 750 correspondingly.

The sixth lens 760 is a concave-convex lens with positive refractive power, wherein an object-side surface 761, which faces the object side, of the sixth lens 760 is a concave surface and an image-side surface 762, which faces the image side, of the sixth lens 760 is a convex surface. At least one of the object-side surface 761 of the sixth lens 760 and the image-side surface 762 of the sixth lens 760 is aspheric. In the seventh embodiment, the object-side surface 761 of the sixth lens 760 and the image-side surface 762 of the sixth lens 760 are both aspheric. The sixth lens 760 is a filter lens made of plastic and includes the at least one visible light absorbing ingredient, so that the sixth lens 760 could correspondingly absorb the visible light with the wavelength range from 400 nm to 700 nm and could allow the light with the wavelength range greater than 800 nm to pass through the sixth lens 760 correspondingly.

The seventh lens 770 is a convex-concave lens with negative refractive power, wherein an object-side surface 771, which faces the object side, of the seventh lens 770 is a convex surface and an image-side surface 772, which faces the image side, of the seventh lens 770 is a concave surface. At least one of the object-side surface 771 of the seventh lens 770 and the image-side surface 772 of the seventh lens 770 is aspheric. In the seventh embodiment, the object-side surface 771 of the seventh lens 770 and the image-side surface 772 of the seventh lens 770 are both aspheric. The seventh lens 770 is a filter lens made of plastic and includes the at least one visible light absorbing ingredient, so that the seventh lens 770 could correspondingly absorb the visible light with the wavelength range from 400 nm to 700 nm and could allow the light with the wavelength range greater than 800 nm to pass through the seventh lens 770 correspondingly.

An equation of aspheric surfaces is:

$$z = ch^2/\left[1+\left[1-(k+1)c^2h^2\right]^{0.5}\right] + A4h^4 + A6h^6 + A8h^8 + A10h^{10} + A12h^{12} + A14h^{14} + A16h^{16} + A18h^{18} + A20h^{20} + \ldots \tag{1}$$

where z is a position value along the optical axis Z at a height h with a surface vertex as a reference point; k is a conic constant; c is a reciprocal of a radius of curvature, and A4, A6, A8, A10, A12, A14, A16, A18, and A20 are high-order aspheric coefficients.

In the seventh embodiment, the second lens 720, the third lens 730, the fourth lens 740, the fifth lens 750, the sixth lens 760, and the seventh lens 770 respectively satisfy: $|\theta 1|\leq 62°$, $|\theta 2|\leq 52°$, $|\theta 3|\leq 42°$, wherein a definition of $|\theta 1|$, a definition of $|\theta 2|$, and a definition of $|\theta 3|$ are respectively the same as the definition of $|\theta 1|$, the definition of $|\theta 2|$, and the definition of $|\theta 3|$ according to the first embodiment of the present invention and are not repeated here.

Additionally, the second lens 720, the third lens 730, the fourth lens 740, the fifth lens 750, the sixth lens 760, and the seventh lens 770 respectively satisfy: TWL50-TWL40≤30 nm. In an embodiment, the second lens 720, the third lens 730, the fourth lens 740, the fifth lens 750, the sixth lens 760, and the seventh lens 770 respectively satisfy TWL50–TWL40≤20 nm. In another embodiment, the second lens 720, the third lens 730, the fourth lens 740, the fifth lens 750, the sixth lens 760, and the seventh lens 770 respectively satisfy TWL50–TWL40≤10 nm. A definition of TWL50 and a definition of TWL40 are the same as the definition of TWL50 and the definition of TWL40 according to the first embodiment of the present invention and are not repeated here.

Additionally, the second lens 720, the third lens 730, the fourth lens 740, the fifth lens 750, the sixth lens 760, and the seventh lens 770 respectively satisfy: |TA50-TA0|≤10%, wherein when the light with the wavelength range greater than 800 nm passes through the lens, TA50 is a transmittance of the light at an incident angle of 50 degrees and TA0 is a transmittance of the light at an incident angle of 0 degree.

Additionally, in the seventh embodiment, the first lens 710 satisfies: 28°≤IRA100≤90°, wherein HOI is a maximum height for image formation of the image plane 790 and IRA100 is an angle at which a lower light of the light enters the object-side surface 711 of the first lens 710 and corresponds to a position of 1.0*HOI on the image plane 790. The seventh lens 770 satisfies: 13°≤ERA70≤27°, wherein HOI is a maximum height for image formation of the image plane 790 and ERA70 is an angle at which a main light of the light exits the image-side surface 772 of the seventh lens 770 and corresponds to a position of 0.70*HOI on the image plane 790.

The first lens 710, the second lens 720, the third lens 730, the fourth lens 740, the fifth lens 750, the sixth lens 760, and the seventh lens 770 respectively satisfy: 0.1 mm≤CT≤1.0 mm, wherein CT is a central thickness of the lens.

Additionally, the second lens 720, the third lens 730, the fourth lens 740, the fifth lens 750, the sixth lens 760, and the seventh lens 770 respectively have an anti-reflective coating, wherein the anti-reflective coating allows the light with the wavelength range greater than 800 nm to pass the second lens 720, the third lens 730, the fourth lens 740, the fifth lens 750, the sixth lens 760, and the seventh lens 770 correspondingly. A material of the anti-reflective coating includes magnesium fluoride ($MgF_2$), silicon dioxide ($SiO_2$), zinc sulfide (ZnS), titanium dioxide ($TiO_2$), aluminum oxide ($Al_2O_3$), and silicon nitride ($Si_3N_4$). The material of the anti-reflective coating is selected for interfering a light wave being reflected from a surface of the lens, thereby reducing a reflection and raising a light transmittance.

The optical filter 780 is adjacent to the seventh lens 770. In an embodiment, the optical filter 780 has the at least one visible light absorbing ingredient, so that the optical filter 780 correspondingly absorbs the visible light with the wavelength range from 400 nm to 700 nm likewise and allows the light with the wavelength range greater than 800 nm to pass through the optical filter 780 correspondingly.

In the seventh embodiment, the second lens 720, the third lens 730, the fourth lens 740, the fifth lens 750, the sixth lens 760, and the seventh lens 770 respectively have a light filtering coating and/or the optical filter 780 has a light filtering coating, wherein the light filtering coating correspondingly absorbs a light with a wavelength range greater than 900 nm.

The optical filter 780 satisfies: |TA50−TA0|≤10%, wherein when the light with the wavelength range greater than 800 nm passes through the optical filter 780, TA50 is a transmittance of the light at the incident angle of 50 degrees and TA0 is a transmittance of the light at the incident angle of 0 degree.

The optical filter 780 satisfies: 13°≤ERA70≤27°, wherein HOI is a maximum height for image formation of the image plane 790 and ERA70 is an angle at which the main light of the light exits an image-side surface 782, which faces the image side, of the optical filter 780 and corresponds to a position of 0.70*HOI on the image plane 790.

Additionally, the optical filter 780 satisfies: 0.1 mm≤CT≤1.0 mm, wherein CT is a central thickness of the optical filter 780.

In an embodiment, the optical filter 780 has the anti-reflective coating, wherein the anti-reflective coating allows the light with the wavelength range greater than 800 nm to pass through the optical filter 780 correspondingly.

The parameters of the lenses of the seventh embodiment are listed in Table 26 and Table 27.

TABLE 26 f = 3.6055 mm; f/HEP = 2.05; HAF = 72.8721 deg; HOI = 4.75 mm

| Surface | Element | Radius of curvature (mm) | Thickness (mm) | Refractive index | Abbe number | Focal length (mm) | Maximum effective half diameter L |
|---|---|---|---|---|---|---|---|
| 0 | Object | ∞ | 470 | | | | |
| 1 | $1^{st}$ lens | 28.02998952 | 0.900 | 1.5928 | 68.5250 | −5.094 | 4.336 |
| 2 | | 2.70000000 | 1.504 | | | | 2.412 |
| 3 | $2^{nd}$ lens | 13.42518839 | 1.018 | 1.6709 | 19.2331 | 10.635 | 2.290 |
| 4 | | −15.05868197 | 0.709 | | | | 2.020 |
| 5 | Aperture | ∞ | 0.085 | | | | |
| 6 | $3^{rd}$ lens | 90.74509483 | 1.369 | 1.5440 | 55.9604 | 4.8275 | 1.326 |
| 7 | | −2.69909875 | 0.050 | | | | 1.717 |
| 8 | $4^{th}$ lens | −28.70662635 | 0.900 | 1.6709 | 19.2331 | −5.188 | 1.887 |
| 9 | | 4.05335899 | 0.372 | | | | 2.419 |
| 10 | $5^{th}$ lens | 6.28940682 | 1.600 | 1.5440 | 55.9604 | 9.274 | 2.854 |
| 11 | | −23.59976942 | 0.190 | | | | 3.055 |
| 12 | $6^{th}$ lens | −5.49608098 | 1.940 | 1.5440 | 55.9604 | 4.8636 | 3.177 |
| 13 | | −2.01306160 | 0.050 | | | | 3.399 |
| 14 | $7^{th}$ lens | 2.59321823 | 0.927 | 1.6709 | 19.2331 | −8.687 | 4.265 |
| 15 | | 1.54000851 | 1.416 | | | | 4.561 |
| 16 | Optical filter | ∞ | 0.710 | 1.5168 | 64.1600 | | |
| 17 | | ∞ | 1.260 | | | | |
| 18 | Image plane | ∞ | 0.000 | | | | |

TABLE 27

Aspheric coefficients of the seventh embodiment

| Surface | 1 | 2 | 3 | 4 | 6 | 7 |
|---|---|---|---|---|---|---|
| k | 0.000000E+00 | 0.000000E+00 | 2.259202E+01 | −3.352560E+02 | 5.000000E+02 | −1.222152E+00 |
| A4 | 0.000000E+00 | 0.000000E+00 | −1.882110E−04 | −9.622054E−03 | 4.086035E−04 | −2.159014E−02 |
| A6 | 0.000000E+00 | 0.000000E+00 | −9.534877E−04 | 7.342028E−03 | −2.761185E−02 | 2.978133E−02 |
| A8 | 0.000000E+00 | 0.000000E+00 | 9.000339E−04 | −5.190808E−03 | 8.863669E−02 | −3.882373E−02 |
| A10 | 0.000000E+00 | 0.000000E+00 | −6.231098E−04 | 2.625815E−03 | −1.850517E−01 | 3.200523E−02 |
| A12 | 0.000000E+00 | 0.000000E+00 | 2.592970E−04 | −8.761436E−04 | 2.338246E−01 | −1.921503E−02 |
| A14 | 0.000000E+00 | 0.000000E+00 | −6.734230E−05 | 1.726350E−04 | −1.838747E−01 | 8.041299E−03 |
| A16 | 0.000000E+00 | 0.000000E+00 | 1.059837E−05 | −1.586541E−05 | 8.781362E−02 | −2.186962E−03 |

TABLE 27-continued

| Aspheric coefficients of the seventh embodiment | | | | | | |
|---|---|---|---|---|---|---|
| A18 | 0.000000E+00 | 0.000000E+00 | −9.386349E−07 | −8.710810E−08 | −2.334090E−02 | 3.421854E−04 |
| A20 | 0.000000E+00 | 0.000000E+00 | 3.693029E−08 | 9.236612E−08 | 2.648287E−03 | −2.329418E−05 |
| Surface | 8 | 9 | 10 | 11 | 12 | 13 |
| k | −3.344033E+02 | −9.415301E+00 | −5.181140E+01 | −2.562688E+01 | −2.726551E+01 | −3.791850E+00 |
| A4 | −3.826789E−02 | −1.214272E−02 | 1.967508E−02 | 6.172522E−03 | 4.440505E−04 | −1.491778E−02 |
| A6 | 3.145796E−02 | 2.510840E−03 | −1.400020E−02 | −1.784254E−03 | −5.998072E−04 | 3.010057E−03 |
| A8 | −3.021233E−02 | 1.007788E−03 | 6.070823E−03 | −5.870555E−04 | 3.199510E−04 | −4.331511E−04 |
| A10 | 2.144994E−02 | −1.170846E−03 | −1.818848E−03 | 2.674500E−04 | −2.844582E−04 | 3.209560E−05 |
| A12 | −1.106535E−02 | 4.954232E−04 | 3.569066E−04 | −5.288972E−05 | 1.137784E−04 | 5.761528E−06 |
| A14 | 3.994615E−03 | −1.172748E−04 | −4.431409E−05 | 7.205846E−06 | −2.175645E−05 | −1.459778E−06 |
| A16 | −9.391749E−04 | 1.624990E−05 | 3.394740E−06 | −6.830429E−07 | 2.206743E−06 | 1.250002E−07 |
| A18 | 1.277782E−04 | −1.224300E−06 | −1.483985E−07 | 3.797772E−08 | −1.163283E−07 | −5.022342E−09 |
| A20 | −7.579147E−06 | 3.835484E−08 | 2.859622E−09 | −8.722633E−10 | 2.533187E−09 | 8.381742E−11 |

| Surface | 14 | 15 |
|---|---|---|
| k | −3.728048E+00 | −3.614187E+00 |
| A4 | −5.307591E−03 | −4.839922E−03 |
| A6 | 6.572887E−04 | 5.501468E−04 |
| A8 | −2.502505E−05 | −3.843422E−05 |
| A10 | −1.086761E−05 | −4.169631E−06 |
| A12 | 1.937033E−06 | 8.953217E−07 |
| A14 | −1.650937E−07 | −6.813504E−08 |
| A16 | 8.214907E−09 | 2.724980E−09 |
| A18 | −2.214099E−10 | −5.591395E−11 |
| A20 | 2.432856E−12 | 4.475012E−13 |

The detailed parameters of the sixth embodiment shown in FIG. 26 are listed in Table 26, wherein units for the radius of curvature, the thickness, a distance, a focal length, and the maximum effective half diameter are millimeters (mm). Surfaces 0-18 represent the surfaces of all elements in the system in sequence from the object side to the image side. Table 27 is the list of coefficients of the aspheric surfaces of the seventh embodiment, wherein k represents the conic constant in the equation of the aspheric surfaces, and A4-A20 represent the aspheric coefficients from the fourth order to the twentieth order of each aspheric surface.

According to the data as shown in Table 26, data of intersecting angles between the optical axis Z and normal line vectors of the object sides of the lenses including the second lens 720, the third lens 730, the fourth lens 740, the fifth lens 750, the sixth lens 760, and the seventh lens 770 respectively located at control points of 0.50*L, 0.70*L, and 0.95*L and data of intersecting angles between the optical axis Z and normal line vectors of the image sides of the lenses including the second lens 720, the third lens 730, the fourth lens 740, the fifth lens 750, the sixth lens 760, and the seventh lens 770 respectively located at control points of 0.50*L, 0.70*L, and 0.95*L are further obtained as shown in Table 28; the angle at which the lower light of the light enters the object-side surface 711 of the first lens 710 and corresponds to the position of 1.0*HOI on the image plane 790 and the angles at which the main light of the light exits the image-side surface 772 of the seventh lens 770 and on the optical filter 780 and corresponds to the position of 0.70*HOI on the image plane 790.

TABLE 28

The parameters of θ1, θ2, and θ3 of the object-side surfaces of the lenses including the second lens 720, the third lens 730, the fourth lens 740, the fifth lens 750, the sixth lens 760, and the seventh lens 770 and the parameters of θ1, θ2, and θ3 of the image-side surfaces of the lenses including the second lens 720, the third lens 730, the fourth lens 740, the fifth lens 750, the sixth lens 760, and the seventh lens 770

| | $2^{nd}$ lens | | $3^{rd}$ lens | | $4^{th}$ lens | |
|---|---|---|---|---|---|---|
| Surface | 3 | 4 | 6 | 7 | 8 | 9 |
| Maximum effective half diameter (mm) | 2.290 | 2.020 | 1.326 | 1.717 | 1.887 | 2.419 |
| L length % | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface |
| 0.50*L(θ3) | 5.044° | 3.481° | 5.044° | 3.481° | 5.637° | 10.039° |
| 0.70*L(θ2) | 6.977° | 4.848° | 6.977° | 4.848° | 11.157° | 9.962° |
| 0.95*L(θ1) | 8.114° | 6.819° | 8.114° | 6.819° | 18.881° | 10.453° |

TABLE 28-continued

The parameters of θ1, θ2, and θ3 of the object-side surfaces of the lenses including the second lens 720, the third lens 730, the fourth lens 740, the fifth lens 750, the sixth lens 760, and the seventh lens 770 and the parameters of θ1, θ2, and θ3 of the image-side surfaces of the lenses including the second lens 720, the third lens 730, the fourth lens 740, the fifth lens 750, the sixth lens 760, and the seventh lens 770

| | $5^{th}$ lens | | $6^{th}$ lens | | $7^{th}$ lens | |
|---|---|---|---|---|---|---|
| Surface | 10 | 11 | 12 | 13 | 14 | 15 |
| Maximum effective half diameter (mm) | 2.854 | 3.055 | 3.177 | 3.399 | 4.265 | 4.561 |
| L length % | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface | Intersecting angle θ between the normal line vector and the reference line Object-side surface | Intersecting angle θ between the normal line vector and the reference line Image-side surface |
| 0.50*L(θ3) | 8.582° | 4.591° | 10.231° | 31.822° | 20.753° | 23.545° |
| 0.70*L(θ2) | 7.000° | 14.090° | 9.139° | 32.314° | 11.887° | 10.782° |
| 0.95*L(θ1) | 18.060° | 14.767° | 2.623° | 17.619° | 5.958° | 19.842° |

TABLE 29

IRA100 of the first lens 710, ERA70 of the seventh lens 770, and ERA70 of the optical filter 780

| Item | Parameter | |
|---|---|---|
| HOI | 4.750 mm | |
| IRA100 | 72.870° | Object-side surface of the first lens |
| ERA70 | 16.410° | Image-side surface of the seventh lens |
| ERA70 | 16.410° | Optical filter |

In the first embodiment to the seventh embodiment, at least one of the lenses of the optical image capturing system in the first embodiment to the seventh embodiment has the at least one visible light absorbing ingredient and the optical filter, which is in a plane shape, could also have the at least one visible light absorbing ingredient. The optical image capturing system could directly perform wavefront modulation and an imaging specifically for the infrared. In this way, the optical image capturing system has a character of effectively absorbing the visible light and a character of a high transmittance of the infrared and could be applied to different kinds of infrared optical systems, thereby improving a light receiving efficiency and a working quality of the optical image capturing system.

It must be pointed out that the embodiments described above are only some preferred embodiments of the present invention. All equivalent structures which employ the concepts disclosed in this specification and the appended claims should fall within the scope of the present invention.

What is claimed is:

1. An optical image capturing system, along an optical axis from an object side to an image side, comprising:

at least one lens having refractive power, wherein at least one of an object-side surface, which faces the object side, of the at least one lens and an image-side surface, which faces the image side, of the at least one lens is aspheric; the at least one lens comprises at least one visible light absorbing ingredient; the at least one lens correspondingly absorbs a visible light with a wavelength range from 400 nm to 700 nm and allows a light with a wavelength range greater than 800 nm to correspondingly pass through; the at least one lens satisfies: $|θ1|<62°$; the optical axis intersects with either the object-side surface or the image-side surface of the at least one lens to form an intersection point; a vertical height L is defined as a distance from the intersection point to a maximum effective half diameter position in a direction perpendicular to the optical axis; two sides of the at least one lens respectively have an outer peripheral surface; the at least one lens defines an imaginary line being perpendicular to the optical axis and passing through two endpoints of the two outer peripheral surfaces; the imaginary line correspondingly meets two maximum boundary points of the object-side surface or correspondingly meets two maximum boundary points of the image-side surface, so that the maximum effective half diameter position is defined as an intersection of the imaginary line and one of the two maximum boundary points of the object-side surface or is defined as an intersection of the imaginary line and one of the two maximum boundary points of the image-side surface; an a1 point on the object-side surface or on the image-side surface is defined as a position where a distance between the a1 point and the intersection point in the direction perpendicular to the optical axis is 0.95 times the vertical height L; the a1 point has a reference line and a normal line vector, wherein the reference line passes through the a1 point and is correspondingly parallel to the optical axis; the normal line vector passes through the a1 point and is correspondingly perpendicular to the object-side surface or the image-side surface; θ1 is an intersecting angle formed between the reference line and the normal line vector; and an optical filter adjacent to the at least one lens.

2. The optical image capturing system as claimed in claim 1, wherein the at least one lens has two horizontal contour surfaces corresponding to a periphery of the object-side surface and has two horizontal contour surfaces corresponding to a periphery of the image-side surface; the two horizontal contour surfaces corresponding to the periphery of the object-side surface are respectively connected to the two endpoints of the two outer peripheral surfaces and the two maximum boundary points of the object-side surface; the two horizontal contour surfaces corresponding to the periphery of the image-side surface are respectively connected to the two endpoints of the two outer peripheral surfaces and the two maximum boundary points of the image-side surface; when the imaginary line correspondingly meets the two maximum boundary points of the object-side surface or correspondingly meets the two maximum boundary points of the image-side surface, the imaginary line overlaps with the two horizontal contour surfaces corresponding to the periphery of the object-side surface and passes through the two outer peripheral surfaces or the imaginary line overlaps with the two horizontal contour surfaces corresponding to the periphery of the image-side surface and passes through the two outer peripheral surfaces.

3. The optical image capturing system as claimed in claim 1, wherein the at least one lens satisfies: $|\theta 1| \leq 62°$; the optical axis intersects with either the object-side surface or the image-side surface of the at least one lens to form an intersection point; a vertical height L is defined as a distance from the intersection point to a maximum effective half diameter position in a direction perpendicular to the optical axis; the at least one lens has an optical effective area and an optical ineffective area, wherein the optical ineffective area surrounds a periphery of the optical effective area; the maximum effective half diameter position is defined as a very edge of the optical effective area being in contact with the optical ineffective area; an a1 point on the object-side surface or on the image-side surface is defined as a position where a distance between the a1 point and the intersection point in the direction perpendicular to the optical axis is 0.95 times the vertical height L; the a1 point has a reference line and a normal line vector, wherein the reference line passes through the a1 point and is correspondingly parallel to the optical axis; the normal line vector passes through the a1 point and is correspondingly perpendicular to the object-side surface or to the image-side surface; θ1 is an intersecting angle formed between the reference line and the normal line vector.

4. The optical image capturing system as claimed in claim 1, wherein the at least one lens satisfies: $|\theta 2| \leq 52°$; the optical axis intersects with either the object-side surface or the image-side surface of the at least one lens to form an intersection point; a vertical height L is defined as a distance from the intersection point to a maximum effective half diameter position in a direction perpendicular to the optical axis; two sides of the at least one lens respectively have an outer peripheral surface; the at least one lens defines an imaginary line being perpendicular to the optical axis and passing through two endpoints of the two outer peripheral surfaces; the imaginary line correspondingly meets two maximum boundary points of the object-side surface or correspondingly meets two maximum boundary points of the image-side surface, so that the maximum effective half diameter position is defined as an intersection of the imaginary line and one of the two maximum boundary points of the object-side surface or is defined as an intersection of the imaginary line and one of the two maximum boundary points of the image-side surface; an a2 point on the object-side surface or on the image-side surface is defined as a position where a distance between the a2 point and the intersection point in the direction perpendicular to the optical axis is 0.70 times the vertical height L; the a2 point has a reference line and a normal line vector, wherein the reference line passes through the a2 point and is correspondingly parallel to the optical axis; the normal line vector passes through the a2 point and is correspondingly perpendicular to the object-side surface or to the image-side surface; θ2 is an intersecting angle formed between the reference line and the normal line vector.

5. The optical image capturing system as claimed in claim 4, wherein the at least one lens has two horizontal contour surfaces corresponding to a periphery of the object-side surface and has two horizontal contour surfaces corresponding to a periphery of the image-side surface; the two horizontal contour surfaces corresponding to the periphery of the object-side surface are respectively connected to the two endpoints of the two outer peripheral surfaces and the two maximum boundary points of the object-side surface; the two horizontal contour surfaces corresponding to the periphery of the image-side surface are respectively connected to the two endpoints of the two outer peripheral surfaces and the two maximum boundary points of the image-side surface; when the imaginary line correspondingly meets the two maximum boundary points of the object-side surface or correspondingly meets the two maximum boundary points of the image-side surface, the imaginary line overlaps with the two horizontal contour surfaces corresponding to the periphery of the object-side surface and passes through the two outer peripheral surfaces or the imaginary line overlaps with the two horizontal contour surfaces corresponding to the periphery of the image-side surface and passes through the two outer peripheral surfaces.

6. The optical image capturing system as claimed in claim 1, wherein the at least one lens satisfies: $|\theta 2| \leq 52°$; the optical axis intersects with either the object-side surface or the image-side surface of the at least one lens to form an intersection point; a vertical height L is defined as a distance from the intersection point to a maximum effective half diameter position in a direction perpendicular to the optical axis; the at least one lens has an optical effective area and an optical ineffective area, wherein the optical ineffective area surrounds a periphery of the optical effective area; the maximum effective half diameter position is defined as a very edge of the optical effective area being in contact with the optical ineffective area; an a2 point on the object-side surface or on the image-side surface is defined as a position where a distance between the a2 point and the intersection point in the direction perpendicular to the optical axis is 0.70 times the vertical height L; the a2 point has a reference line and a normal line vector, wherein the reference line passes through the a2 point and is correspondingly parallel to the optical axis; the normal line vector passes through the a2 point and is correspondingly perpendicular to the object-side surface or to the image-side surface; θ2 is an intersecting angle formed between the reference line and the normal line vector.

7. The optical image capturing system as claimed in claim 1, wherein the at least one lens satisfies: $|\theta 3| < 42°$; the optical axis intersects with either the object-side surface or the image-side surface of the at least one lens to form an intersection point; a vertical height L is defined as a distance from the intersection point to a maximum effective half diameter position in a direction perpendicular to the optical axis; two sides of the at least one lens respectively have an outer peripheral surface; the at least one lens defines an imaginary line being perpendicular to the optical axis and passing through two endpoints of the two outer peripheral surfaces; the imaginary line correspondingly meets two maximum boundary points of the object-side surface or correspondingly meets two maximum boundary points of the image-side surface, so that the maximum effective half diameter position is defined as an intersection of the imaginary line and one of the two maximum boundary points of the object-side surface or is defined as an intersection of the imaginary line and one of the two maximum boundary points of the image-side surface; an a3 point on the object-side surface or on the image-side surface is defined as a position where a distance between the a3 point and the intersection point in the direction perpendicular to the optical axis is 0.50 times the vertical height L; the a3 point has a reference line and a normal line vector, wherein the reference line passes through the a3 point and is correspondingly parallel to the optical axis; the normal line vector passes through the a3 point and is correspondingly perpendicular to the object-side surface or to the image-side surface; θ3 is an intersecting angle formed between the reference line and the normal line vector.

8. The optical image capturing system as claimed in claim 7, wherein the at least one lens has two horizontal contour surfaces corresponding to a periphery of the object-side surface and has two horizontal contour surfaces corresponding to a periphery of the image-side surface; the two horizontal contour surfaces corresponding to a periphery of the object-side surface are respectively connected to the two endpoints of the two outer peripheral surfaces and the two maximum boundary points of the object-side surface; the two horizontal contour surfaces corresponding to a periphery of the object-side surface are respectively connected to the two endpoints of the two outer peripheral surfaces and the two maximum boundary points of the image-side surface; when the imaginary line correspondingly meets the two maximum boundary points of the object-side surface or correspondingly meets the two maximum boundary points of the image-side surface, the imaginary line overlaps with the two horizontal contour surfaces corresponding to the periphery of the object-side surface and passes through the two outer peripheral surfaces or the imaginary line overlaps with the two horizontal contour surfaces corresponding to the periphery of the image-side surface and passes through the two outer peripheral surfaces.

9. The optical image capturing system as claimed in claim 1, wherein the at least one lens satisfies: $|\theta 3| \leq 42°$; the optical axis intersects with either the object-side surface or the image-side surface of the at least one lens to form an intersection point; a vertical height L is defined as a distance from the intersection point to a maximum effective half diameter position in a direction perpendicular to the optical axis; the at least one lens has an optical effective area and an optical ineffective area, wherein the optical ineffective area surrounds a periphery of the optical effective area; the maximum effective half diameter position is defined as a very edge of the optical effective area being in contact with the optical ineffective area; an a3 point on the object-side surface or on the image-side surface is defined as a position where a distance between the a3 point and the intersection point in the direction perpendicular to the optical axis is 0.50 times the vertical height L; the a3 point has a reference line and a normal line vector, wherein the reference line passes through the a3 point and is correspondingly parallel to the optical axis; the normal line vector passes through the a3 point and is correspondingly perpendicular to the object-side surface or to the image-side surface; θ3 is an intersecting angle formed between the reference line and the normal line vector.

10. The optical image capturing system as claimed in claim 1, wherein the at least one lens satisfies: $TWL50-TWL40 \leq 30$ nm; TWL40 is a light wavelength with a transmittance of 40% as presented in a transmission curve of the at least one lens; TWL50 is a light wavelength with a transmittance of 50% as presented in the transmission curve of the at least one lens.

11. The optical image capturing system as claimed in claim 1, wherein the at least one lens satisfies: $13° \leq ERA70 \leq 30°$; the optical image capturing system has an image plane located on a side of the optical filter, wherein HOI is a maximum height for image formation of the image plane; ERA70 is an angle at which a main light of the light exits the image-side surface of the at least one lens and corresponds to a position of 0.70*HOI on the image plane.

12. The optical image capturing system as claimed in claim 1, wherein the at least one lens satisfies: $28° \leq IRA100 \leq 90°$; the optical image capturing system has an image plane located on a side of the optical filter, wherein HOI is a maximum height for image formation of the image plane; IRA100 is an angle at which a lower light of the light enters the object-side surface and corresponds to a position of 1.0*HOI on the image plane.

13. The optical image capturing system as claimed in claim 1, wherein the at least one lens satisfies: 0.1 mm$\leq$CT$\leq$1.0 mm; CT is a central thickness of the at least one lens.

14. The optical image capturing system as claimed in claim 1, wherein the at least one lens is made of plastic.

15. The optical image capturing system as claimed in claim 1, wherein the at least one lens has an anti-reflective coating; the anti-reflective coating allows the light with the wavelength range greater than 800 nm to pass through.

16. The optical image capturing system as claimed in claim 1, wherein the at least one lens and/or the optical filter have/has a light filtering coating; the light filtering coating correspondingly absorbs a light with a wavelength range greater than 900 nm.

17. The optical image capturing system as claimed in claim 1, further comprising an image sensing module, wherein the optical image capturing system has an image plane; the image sensing module is correspondingly located on a position of the image plane.

18. An optical image capturing system, along an optical axis from an object side to an image side, comprising:

at least one lens; and an optical filter adjacent to the at least one lens and comprising at least one visible light absorbing ingredient, wherein the optical filter correspondingly absorbs a visible light with a wavelength range from 400 nm to 700 nm and allows a light with a wavelength range greater than 800 nm to correspondingly pass through; the optical filter satisfies: $|TA50-TA0| \leq 10\%$; when the light with the wavelength range greater than 800 nm passes through the optical filter, TA50 is a transmittance of the light at an incident angle of 50 degrees and TA0 is a transmittance of the light at an incident angle of 0 degree.

19. The optical image capturing system as claimed in claim 18, wherein the optical filter satisfies: $13° \leq ERA70 \leq 27°$; the optical image capturing system has an image plane located on a side of the optical filter, wherein HOI is a maximum height for image formation of the image plane; ERA70 is an angle at which a main light of the light exits an image-side surface, which faces the image side, of the optical filter and corresponds to a position of 0.70*HOI on the image plane.

20. The optical image capturing system as claimed in claim 19, further comprising an image sensing module; the image sensing module is correspondingly located on a position of the image plane.

21. The optical image capturing system as claimed in claim 18, wherein the optical filter satisfies: 0.1$\leq$mm$\leq$CT$\leq$1.0 mm; CT is a central thickness of the optical filter.

22. The optical image capturing system as claimed in claim 18, wherein the optical filter is made of plastic.

23. The optical image capturing system as claimed in claim 18, wherein the optical filter has an anti-reflective coating; the anti-reflective coating allows the light with the wavelength range greater than 800 nm to pass through.

24. The optical image capturing system as claimed in claim 18, wherein the at least one lens and/or the optical filter have/has a light filtering coating; the light filtering coating correspondingly absorbs a light with a wavelength range greater than 900 nm.

25. An optical image capturing system, along an optical axis from an object side to an image side, comprising:

a plurality of lenses respectively having refractive power, wherein at least one of the plurality of lenses is a filter lens; the filter lens comprises at least one visible light absorbing ingredient; the filter lens correspondingly absorbs a visible light with a wavelength range from 400 nm to 700 nm and allows a light with a wavelength range greater than 800 nm to correspondingly pass through; the filter lens satisfies: $|\theta 1| \leq 62°$; the optical axis intersects with either an object-side surface, which faces the object side, or an image-side surface, which faces the image side, of the filter lens to form an intersection point; a vertical height L is defined as a distance from the intersection point to a maximum effective half diameter position in a direction perpendicular to the optical axis; two sides of the filter lens respectively have an outer peripheral surface; the filter lens defines an imaginary line being perpendicular to the optical axis and passing through two endpoints of the two outer peripheral surfaces; the imaginary line correspondingly meets two maximum boundary points of the object-side surface or correspondingly meets two maximum boundary points of the image-side surface, so that the maximum effective half diameter position is defined as an intersection of the imaginary line and one of the two maximum boundary points of the object-side surface or is defined as an intersection of the imaginary line and one of the two maximum boundary points of the image-side surface; an a1 point on the object-side surface or on the image-side surface is defined as a position where a distance between the a1 point and the intersection point in the direction perpendicular to the optical axis is 0.95 times the vertical height L; the a1 point has a reference line and a normal line vector, wherein the reference line passes through the a1 point and is correspondingly parallel to the optical axis; the normal line vector passes through the a1 point and is correspondingly perpendicular to the object-side surface or the image-side surface; θ1 is an intersecting angle formed between the reference line and the normal line vector.

26. The optical image capturing system as claimed in claim 25, wherein the filter lens has two horizontal contour surfaces corresponding to a periphery of the object-side surface and has two horizontal contour surfaces corresponding to a periphery of the image-side surface; the two horizontal contour surfaces corresponding to the periphery of the object-side surface are respectively connected to the two endpoints of the two outer peripheral surfaces and the two maximum boundary points of the object-side surface; the two horizontal contour surfaces corresponding to the periphery of the image-side surface are respectively connected to the two endpoints of the two outer peripheral surfaces and the two maximum boundary points of the image-side surface; when the imaginary line correspondingly meets the two maximum boundary points of the object-side surface or correspondingly meets the two maximum boundary points of the image-side surface, the imaginary line overlaps with the two horizontal contour surfaces corresponding to the periphery of the object-side surface and passes through the two outer peripheral surfaces or the imaginary line overlaps with the two horizontal contour surfaces corresponding to the periphery of the image-side surface and passes through the two outer peripheral surfaces.

27. The optical image capturing system as claimed in claim 25, wherein the filter lens satisfies: $|\theta 1| \leq 62°$; the optical axis intersects with either an object-side surface, which faces the object side, or an image-side surface, which faces the image side, of the filter lens to form an intersection point; a vertical height L is defined as a distance from the intersection point to a maximum effective half diameter position in a direction perpendicular to the optical axis; the filter lens has an optical effective area and an optical ineffective area, wherein the optical ineffective area surrounds a periphery of the optical effective area; the maximum effective half diameter position is defined as a very edge of the optical effective area being in contact with the optical ineffective area; an a1 point on the object-side surface or on the image-side surface is defined as a position where a distance between the a1 point and the intersection point in the direction perpendicular to the optical axis is 0.95 times the vertical height L; the a1 point has a reference line and a normal line vector, wherein the reference line passes through the a1 point and is correspondingly parallel to the optical axis; the normal line vector passes through the a1 point and is correspondingly perpendicular to the object-side surface or the image-side surface; θ1 is an intersecting angle formed between the reference line and the normal line vector.

28. The optical image capturing system as claimed in claim 25, wherein the filter lens satisfies: $|\theta 2| \leq 52°$; the optical axis intersects with either an object-side surface, which faces the object side, or an image-side surface, which faces the image side, of the filter lens to form an intersection point; a vertical height L is defined as a distance from the intersection point to a maximum effective half diameter position in a direction perpendicular to the optical axis; two sides of the filter lens respectively have an outer peripheral surface; the filter lens defines an imaginary line being perpendicular to the optical axis and passing through two endpoints of the two outer peripheral surfaces; the imaginary line correspondingly meets two maximum boundary points of the object-side surface or correspondingly meets two maximum boundary points of the image-side surface, so that the maximum effective half diameter position is defined as an intersection of the imaginary line and one of the two maximum boundary points of the object-side surface or is defined as an intersection of the imaginary line and one of the two maximum boundary points of the image-side surface; an a2 point on the object-side surface or on the image-side surface is defined as a position where a distance between the a2 point and the intersection point in the direction perpendicular to the optical axis is 0.70 times the vertical height L; the a2 point has a reference line and a normal line vector, wherein the reference line passes through the a2 point and is correspondingly parallel to the optical axis; the normal line vector passes through the a2 point and is correspondingly perpendicular to the object-side surface or the image-side surface; θ2 is an intersecting angle formed between the reference line and the normal line vector.

29. The optical image capturing system as claimed in claim 28, wherein the filter lens has two horizontal contour surfaces corresponding to a periphery of the object-side surface and has two horizontal contour surfaces corresponding to a periphery of the image-side surface; the two horizontal contour surfaces corresponding to the periphery of the object-side surface are respectively connected to the two endpoints of the two outer peripheral surfaces and the two maximum boundary points of the object-side surface; the two horizontal contour surfaces corresponding to the periphery of the image-side surface are respectively connected to the two endpoints of the two outer peripheral surfaces and the two maximum boundary points of the image-side surface; when the imaginary line correspondingly meets the two maximum boundary points of the object-side surface or correspondingly meets the two maximum boundary points of the image-side surface, the imaginary line overlaps with the two horizontal contour surfaces corresponding to the periphery of the object-side surface and passes through the two outer peripheral surfaces or the imaginary line overlaps with the two horizontal contour surfaces corresponding to the periphery of the image-side surface and passes through the two outer peripheral surfaces.

30. The optical image capturing system as claimed in claim 25, wherein the filter lens satisfies: $|\theta 2| \leq 52°$; the optical axis intersects with either an object-side surface, which faces the object side, or an image-side surface, which faces the image side, of the filter lens to form an intersection point; a vertical height L is defined as a distance from the intersection point to a maximum effective half diameter position in a direction perpendicular to the optical axis; the filter lens has an optical effective area and an optical ineffective area, wherein the optical ineffective area surrounds a periphery of the optical effective area; the maximum effective half diameter position is defined as a very edge of the optical effective area and being in contact with the optical ineffective area; an a2 point on the object-side surface or on the image-side surface is defined as a position where a distance between the a2 point and the intersection point in the direction perpendicular to the optical axis is 0.70 times the vertical height L; the a2 point has a reference line and a normal line vector, wherein the reference line passes through the a2 point and is correspondingly parallel to the optical axis; the normal line vector passes through the a2 point and is correspondingly perpendicular to the object-side surface or the image-side surface; θ2 is an intersecting angle formed between the reference line and the normal line vector.

31. The optical image capturing system as claimed in claim 25, wherein the filter lens satisfies: $|\theta 3| \leq 42°$; the optical axis intersects with either an object-side surface, which faces the object side, or an image-side surface, which faces the image side, of the filter lens to form an intersection point; a vertical height L is defined as a distance from the intersection point to a maximum effective half diameter position in a direction perpendicular to the optical axis; two sides of the filter lens respectively have an outer peripheral surface; the filter lens defines an imaginary line being perpendicular to the optical axis and passing through two endpoints of the two outer peripheral surfaces; the imaginary line correspondingly meets two maximum boundary points of the object-side surface or correspondingly meets two maximum boundary points of the image-side surface, so that the maximum effective half diameter position is defined as an intersection of the imaginary line and one of the two maximum boundary points of the object-side surface or is defined as an intersection of the imaginary line and one of the maximum boundary points of the image-side surface; an a3 point on the object-side surface or on the image-side surface is defined as a position where a distance between the a3 point and the intersection point in the direction perpendicular to the optical axis is 0.50 times the vertical height L; the a3 point has a reference line and a normal line vector, wherein the reference line passes through the a3 point and is correspondingly parallel to the optical axis; the normal line vector passes through the a3 point and is correspondingly perpendicular to the object-side surface or the image-side surface; θ3 is an intersecting angle formed between the reference line and the normal line vector.

32. The optical image capturing system as claimed in claim 31, wherein the filter lens has two horizontal contour surfaces corresponding to a periphery of the object-side surface and has two horizontal contour surfaces corresponding to a periphery of the image-side surface; the two horizontal contour corresponding to the periphery of the object-side surface surfaces are respectively connected to the two endpoints of the two outer peripheral surfaces and the two maximum boundary points of the object-side surface; the two horizontal contour surfaces corresponding to the periphery of the image-side surface are respectively connected to the two endpoints of the two outer peripheral surfaces and the two maximum boundary points of the image-side surface; when the imaginary line correspondingly meets the two maximum boundary points of the object-side surface or correspondingly meets the two maximum boundary points of the image-side surface, the imaginary line overlaps with the two horizontal contour surfaces corresponding to the periphery of the object-side surface and passes through the two outer peripheral surfaces or the imaginary line overlaps with the two horizontal contour surfaces corresponding to the periphery of the image-side surface and passes through the two outer peripheral surfaces.

33. The optical image capturing system as claimed in claim 25, wherein the filter lens satisfies: $|\theta 3| \leq 42°$; the optical axis intersects with either an object-side surface, which faces the object side, or an image-side surface, which faces the image side, of the filter lens to form an intersection point; a vertical height L is defined as a distance from the intersection point to a maximum effective half diameter position in a direction perpendicular to the optical axis; the filter lens has an optical effective area and an optical ineffective area, wherein the optical ineffective area surrounds a periphery of the optical effective area; the maximum effective half diameter position is defined as a very edge of the optical effective area being in contact the optical ineffective area; an a3 point on the object-side surface or on the image-side surface is defined as a position where a distance between the a3 point and the intersection point in the direction perpendicular to the optical axis is 0.50 times the vertical height L; the a3 point has a reference line and a normal line vector, wherein the reference line passes through the a3 point and is correspondingly parallel to the optical axis; the normal line vector passes through the a3 point and is correspondingly perpendicular to the object-side surface or the image-side surface; θ3 is an intersecting angle formed between the reference line and the normal line vector.

34. The optical image capturing system as claimed in claim 25, wherein the filter lens satisfies: $|TA50-TA0| \leq 10\%$; when the light with the wavelength range greater than 800 nm passes through the filter lens, TA50 is a transmittance of the light at an incident angle of 50 degrees and TA0 is a transmittance of the light at an incident angle of 0 degree.

35. The optical image capturing system as claimed in claim 25, wherein the filter lens satisfies: 0.1 mm≤CT≤1.0 mm; CT is a central thickness of the filter lens; the filter lens is made of plastic.

36. The optical image capturing system as claimed in claim 25, wherein the filter lens has an anti-reflective coating; the anti-reflective coating allows the light with the wavelength range greater than 800 nm to pass through.

37. The optical image capturing system as claimed in claim 25, further comprising an image sensing module, wherein the optical image capturing system has an image plane; the image sensing module is correspondingly located on a position of the image plane.

* * * * *